March 12, 1935.  W. D. FOSTER ET AL  1,993,735
FILM HANDLING APPARATUS
Filed April 4, 1929   15 Sheets-Sheet 1
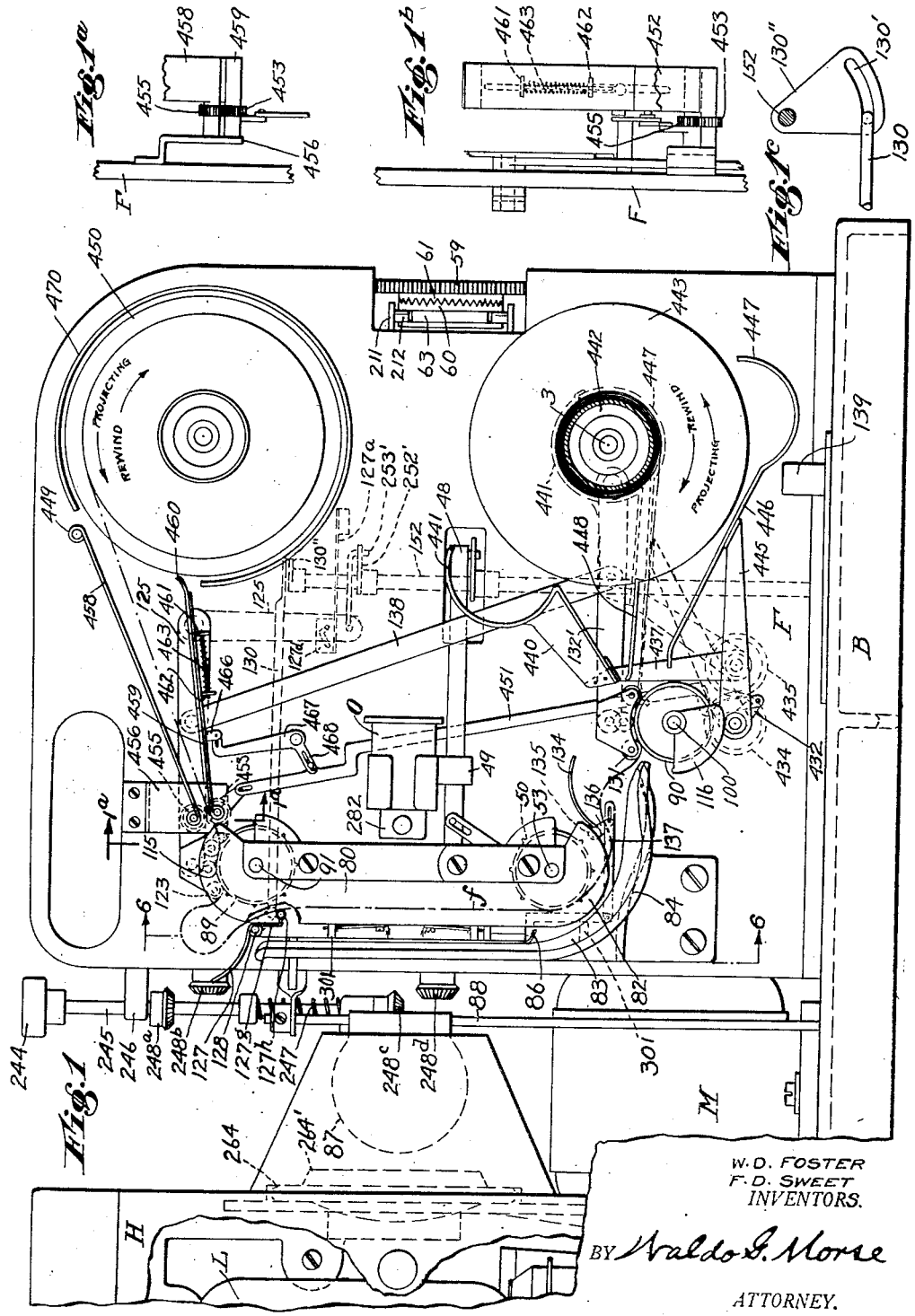
W. D. FOSTER
F. D. SWEET
INVENTORS.
BY Waldo G. Morse
ATTORNEY.

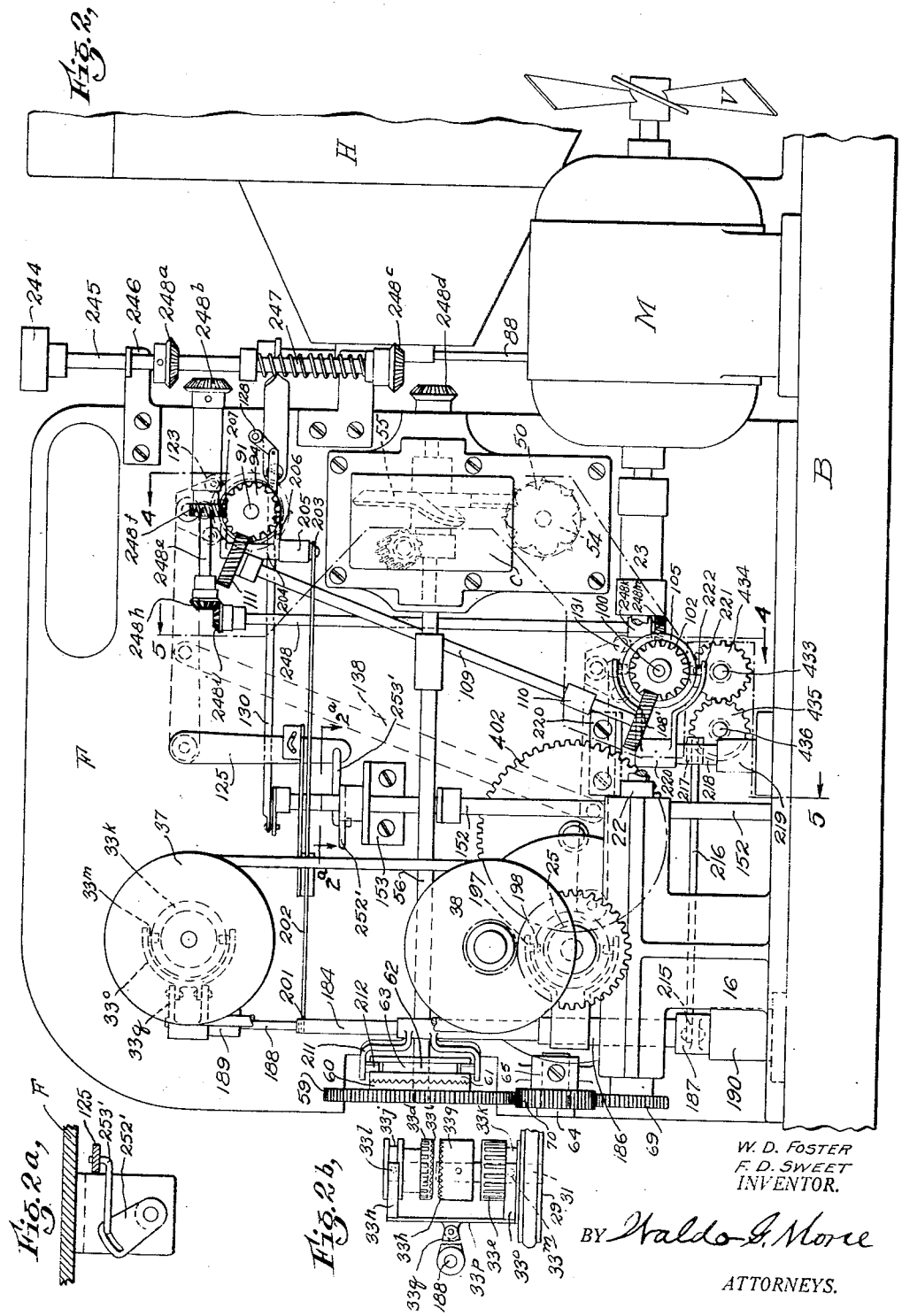

March 12, 1935.  W. D. FOSTER ET AL  1,993,735
FILM HANDLING APPARATUS
Filed April 4, 1929  15 Sheets-Sheet 3
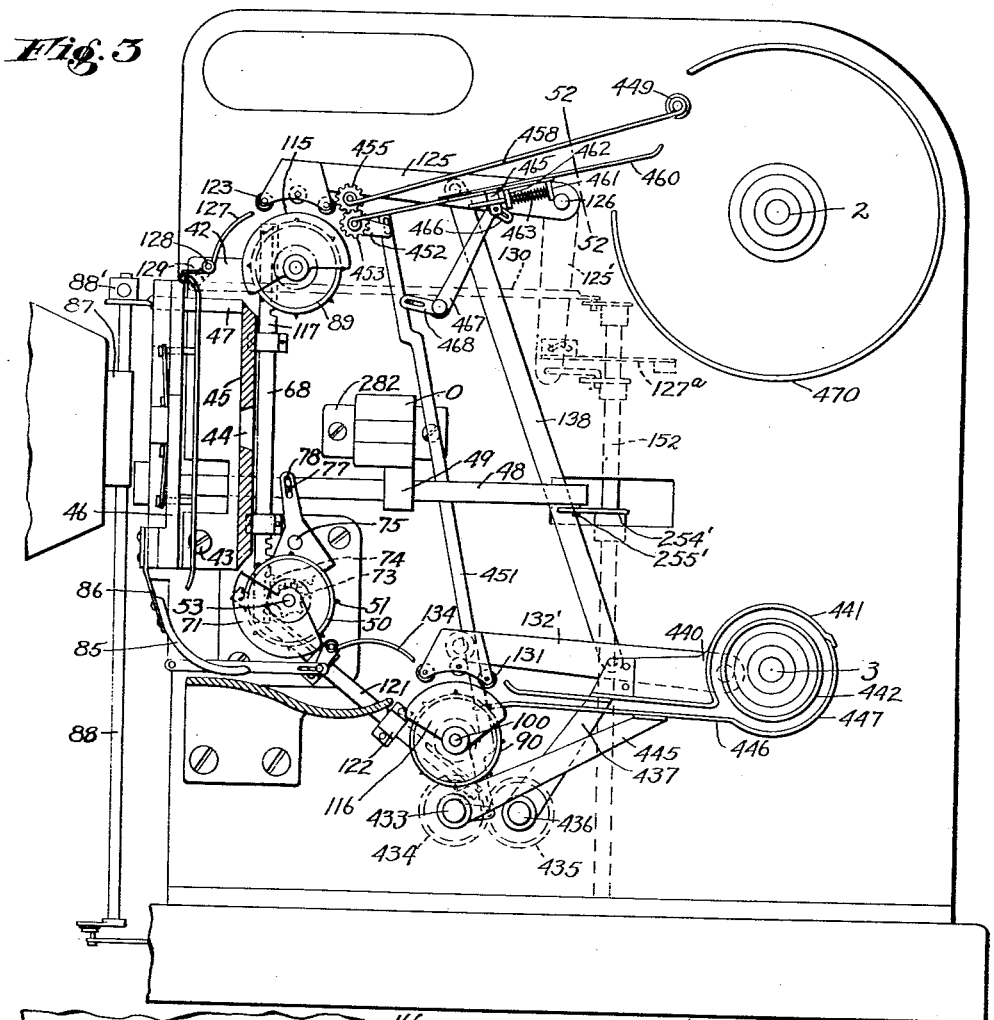
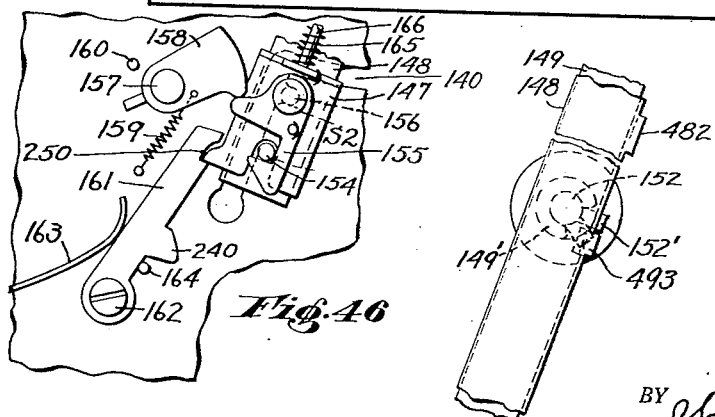
INVENTORS
W. D. FOSTER.
F. D. SWEET.
BY Waldo G. Morse
ATTORNEY

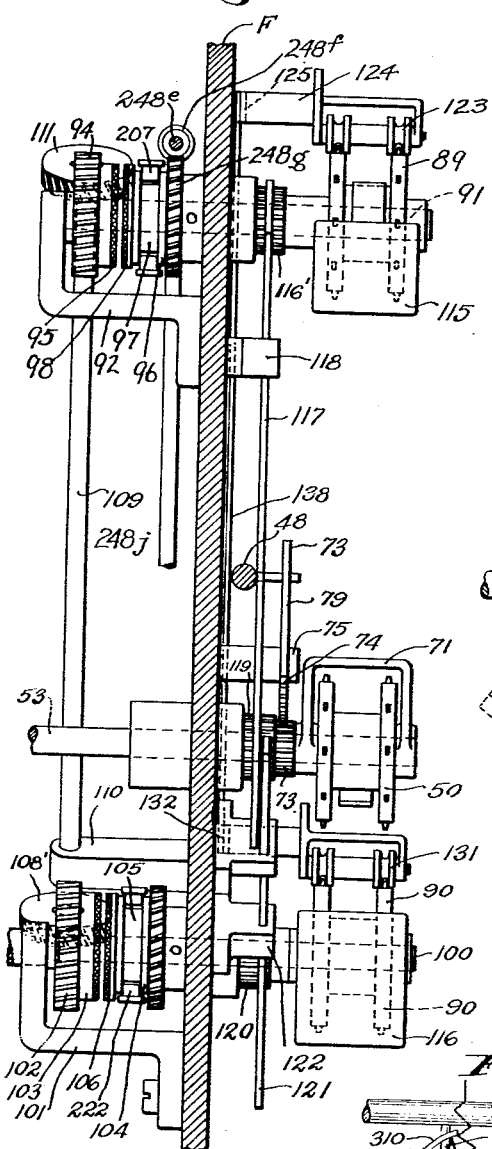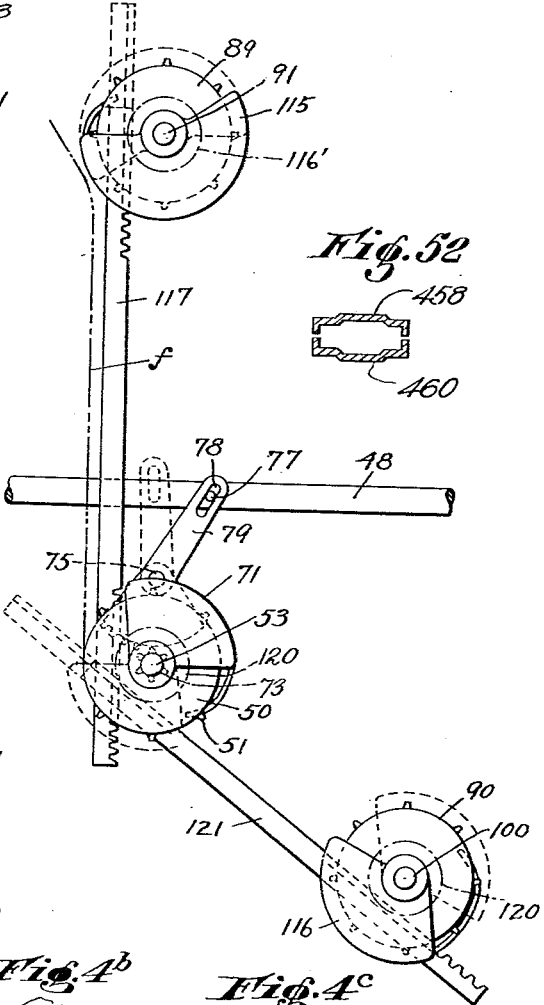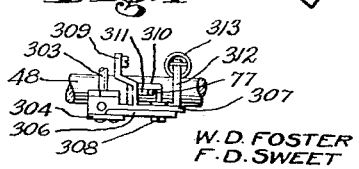

March 12, 1935. W. D. FOSTER ET AL 1,993,735
FILM HANDLING APPARATUS
Filed April 4, 1929 15 Sheets-Sheet 5
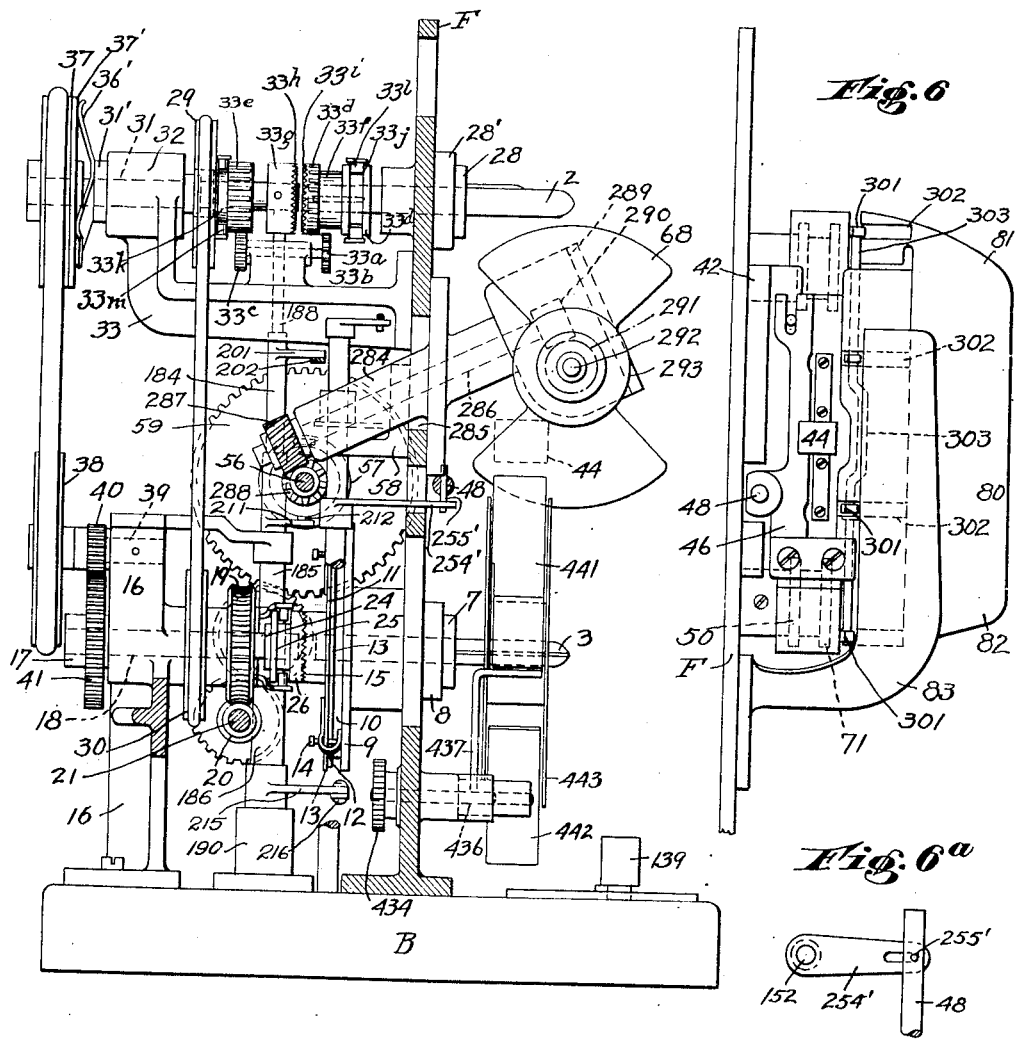
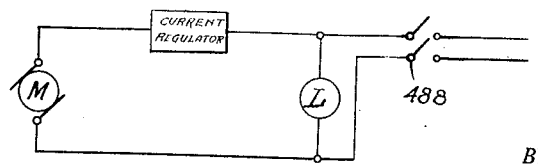
W. D. FOSTER.
F. D. SWEET.
INVENTORS
BY Waldo G. Morse
ATTORNEY

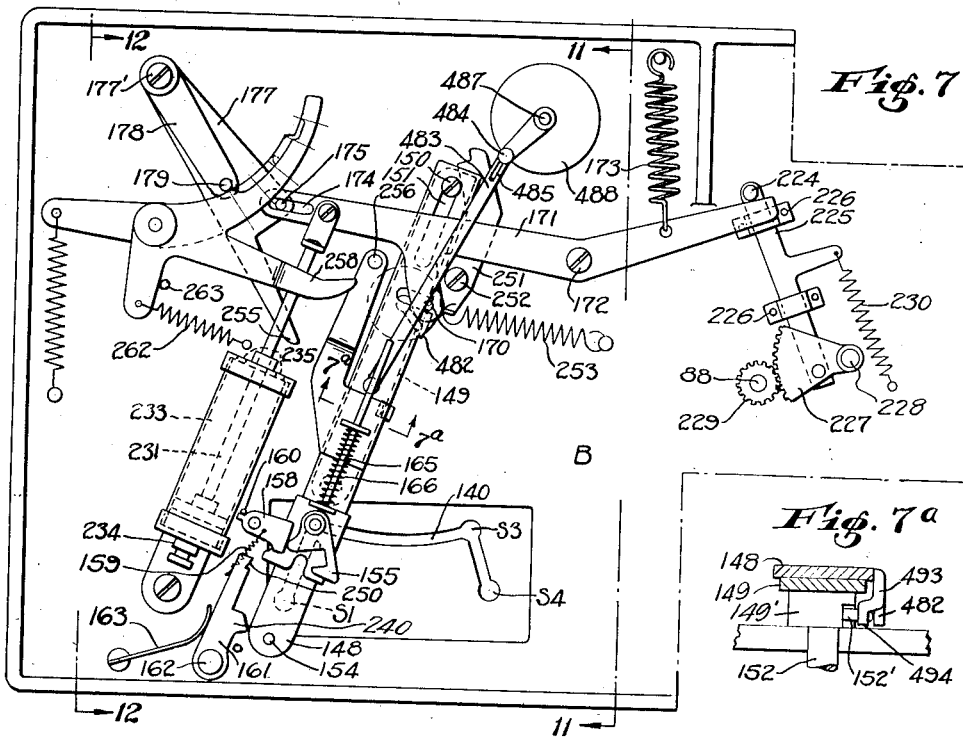
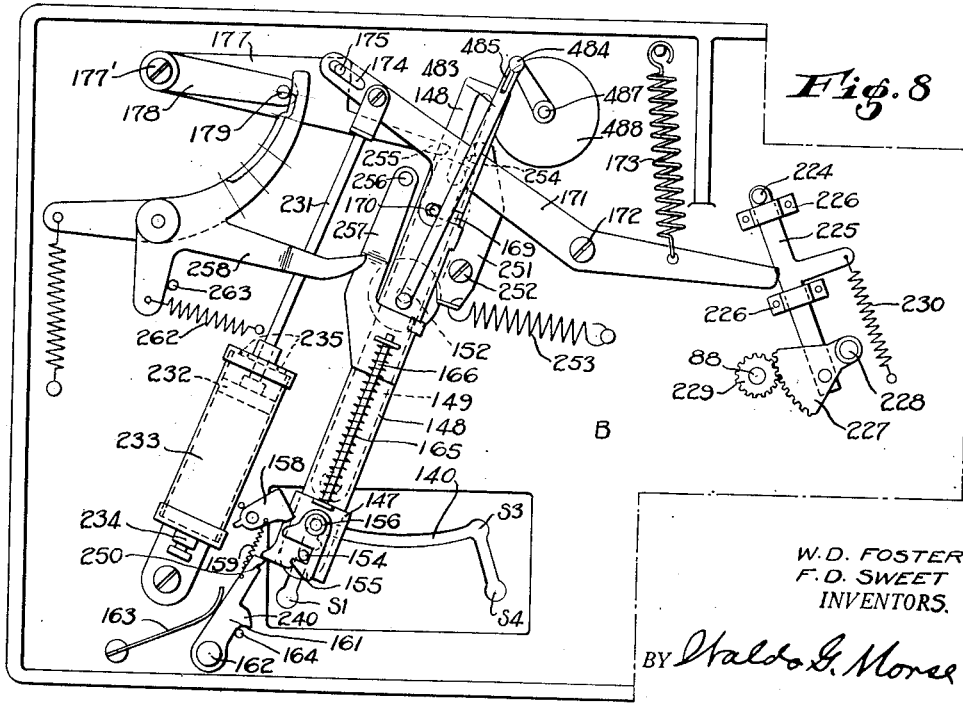

W. D. FOSTER
F. D. SWEET
INVENTORS

ATTORNEY

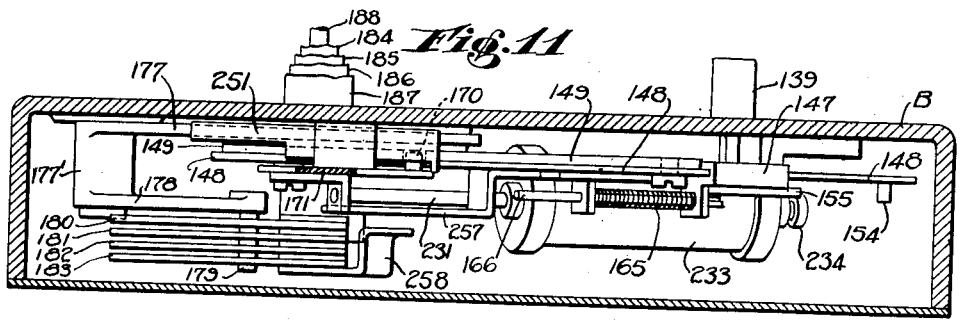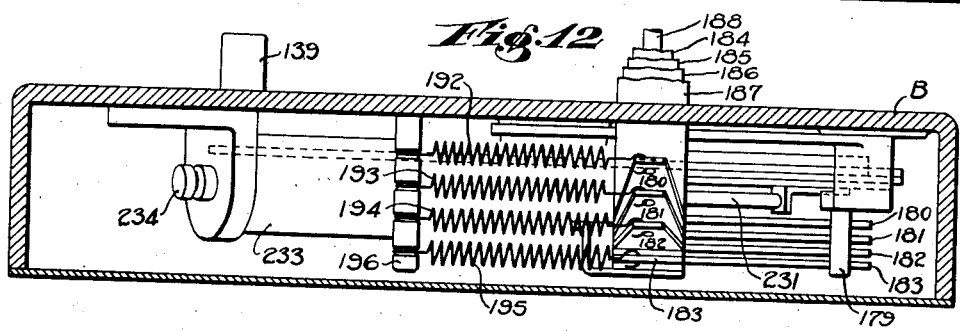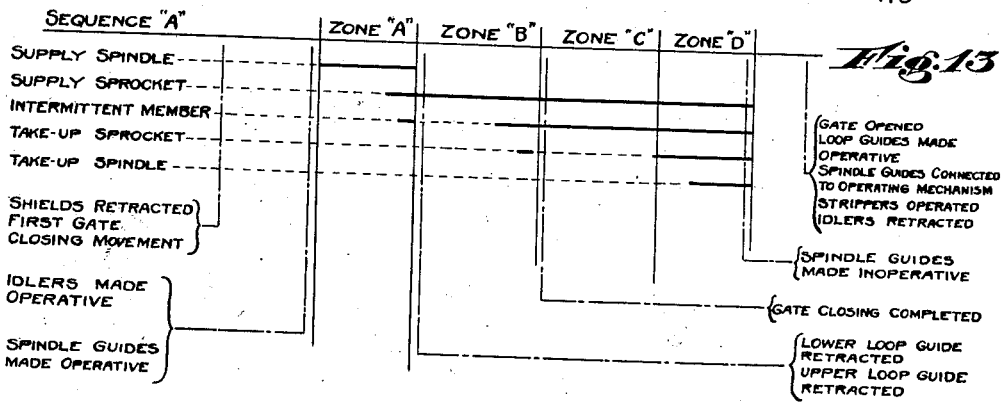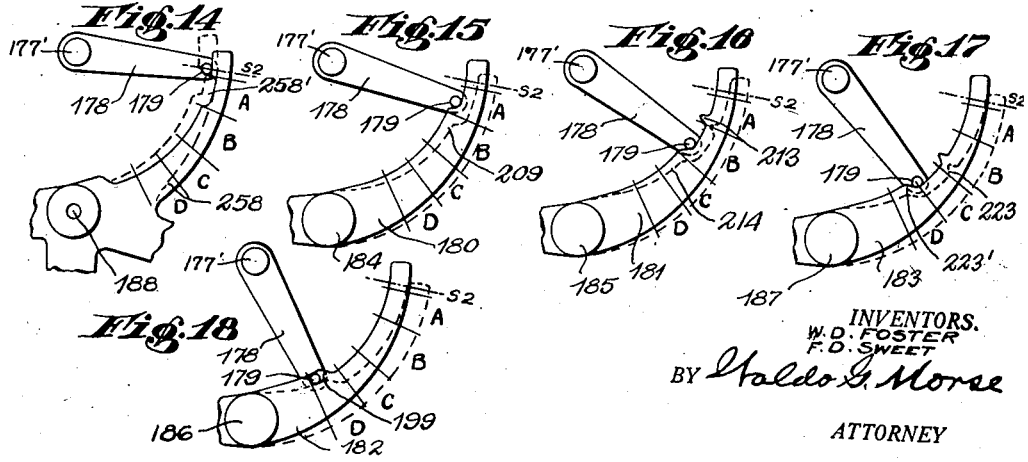

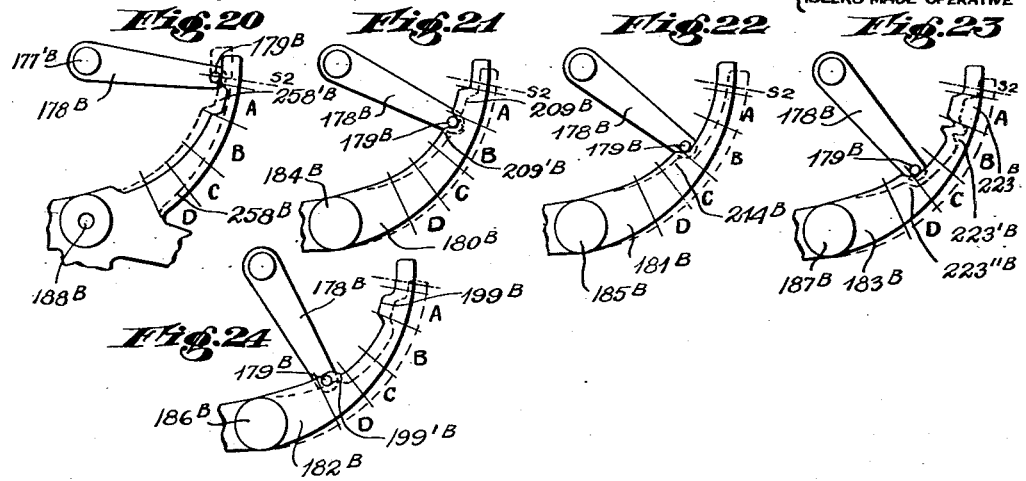
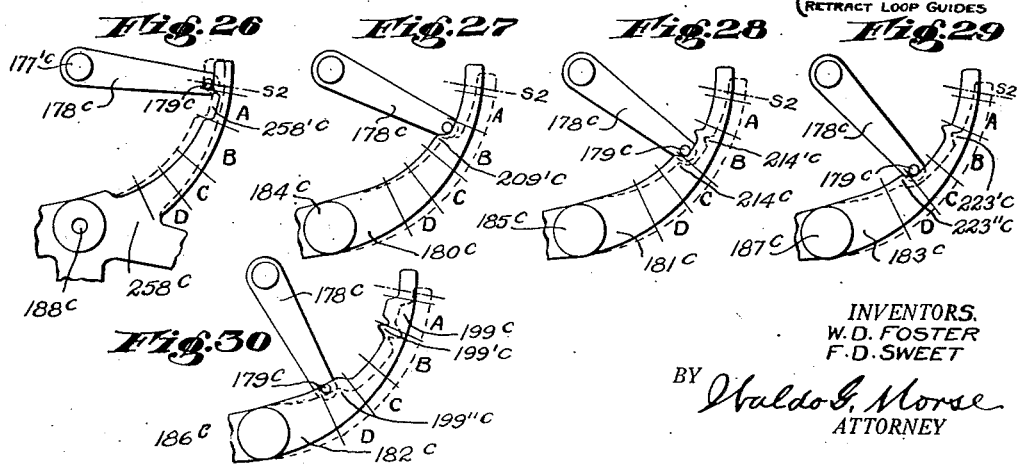

March 12, 1935.　　W. D. FOSTER ET AL　　1,993,735
FILM HANDLING APPARATUS
Filed April 4, 1929　　15 Sheets-Sheet 10
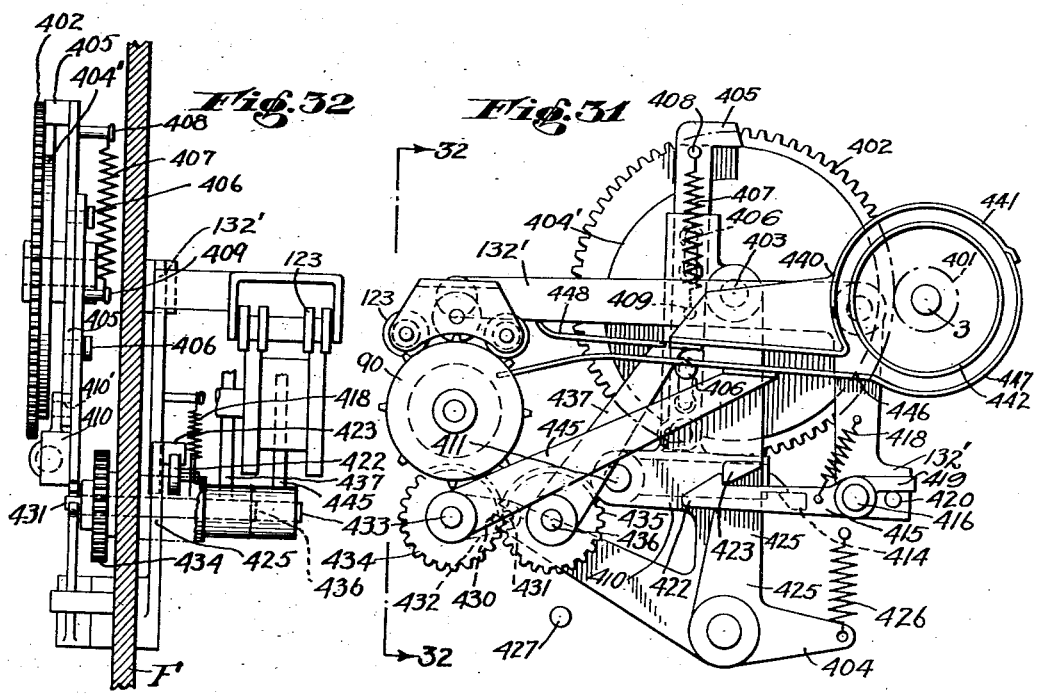
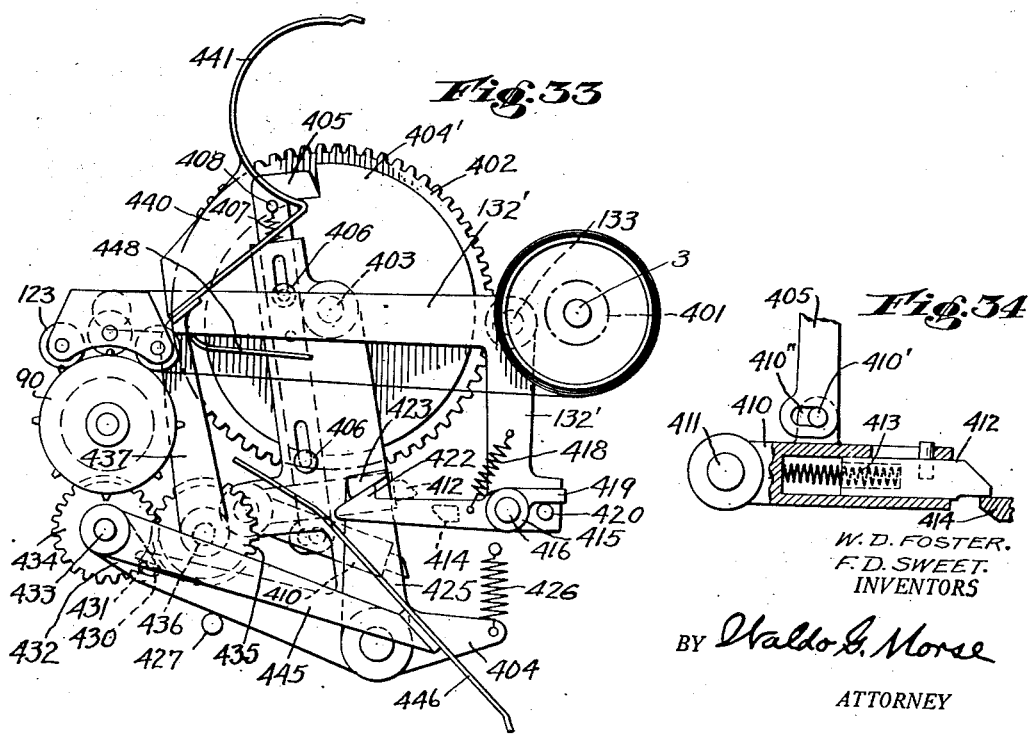
W. D. FOSTER.
F. D. SWEET.
INVENTORS
BY Waldo G. Morse
ATTORNEY

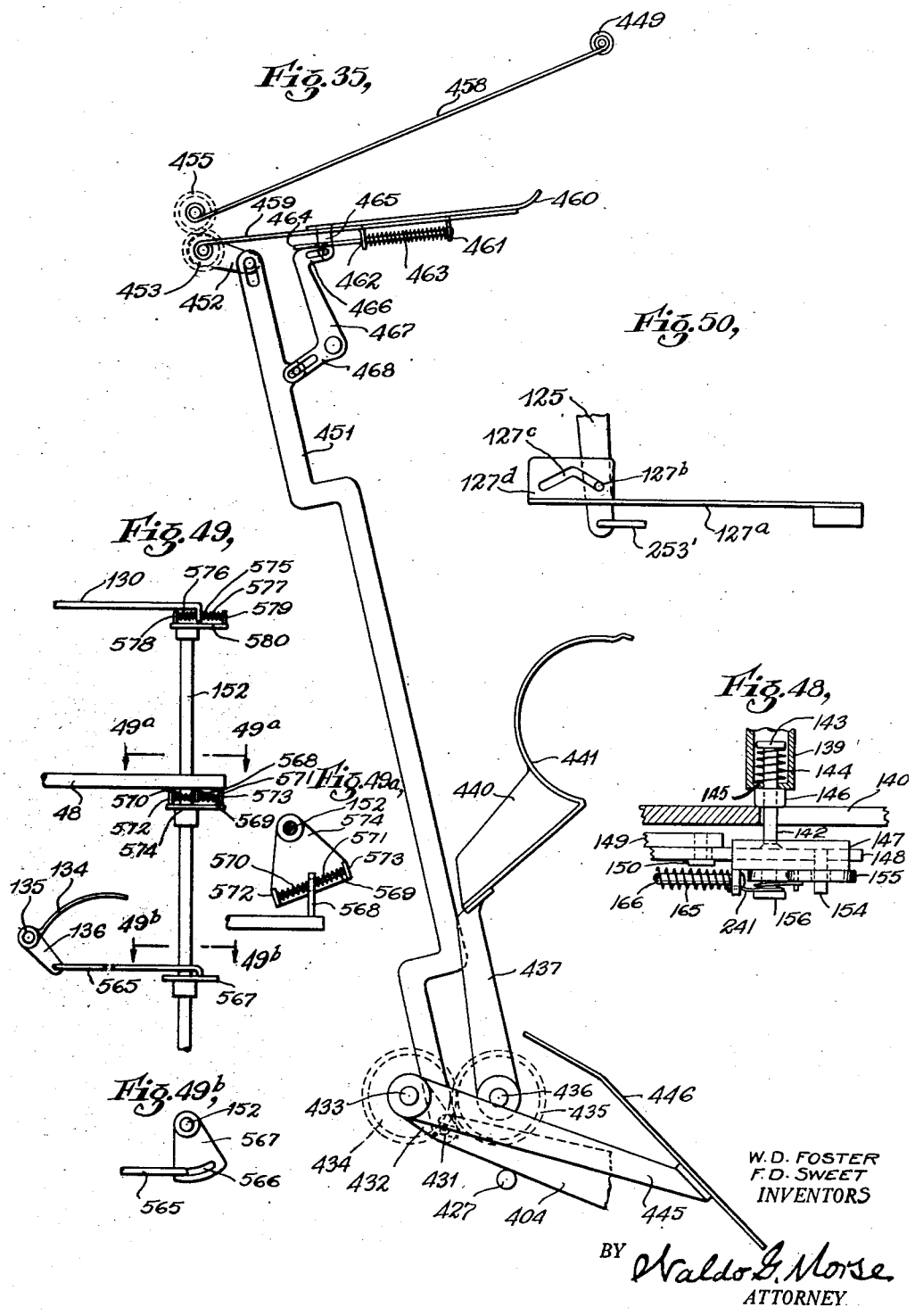

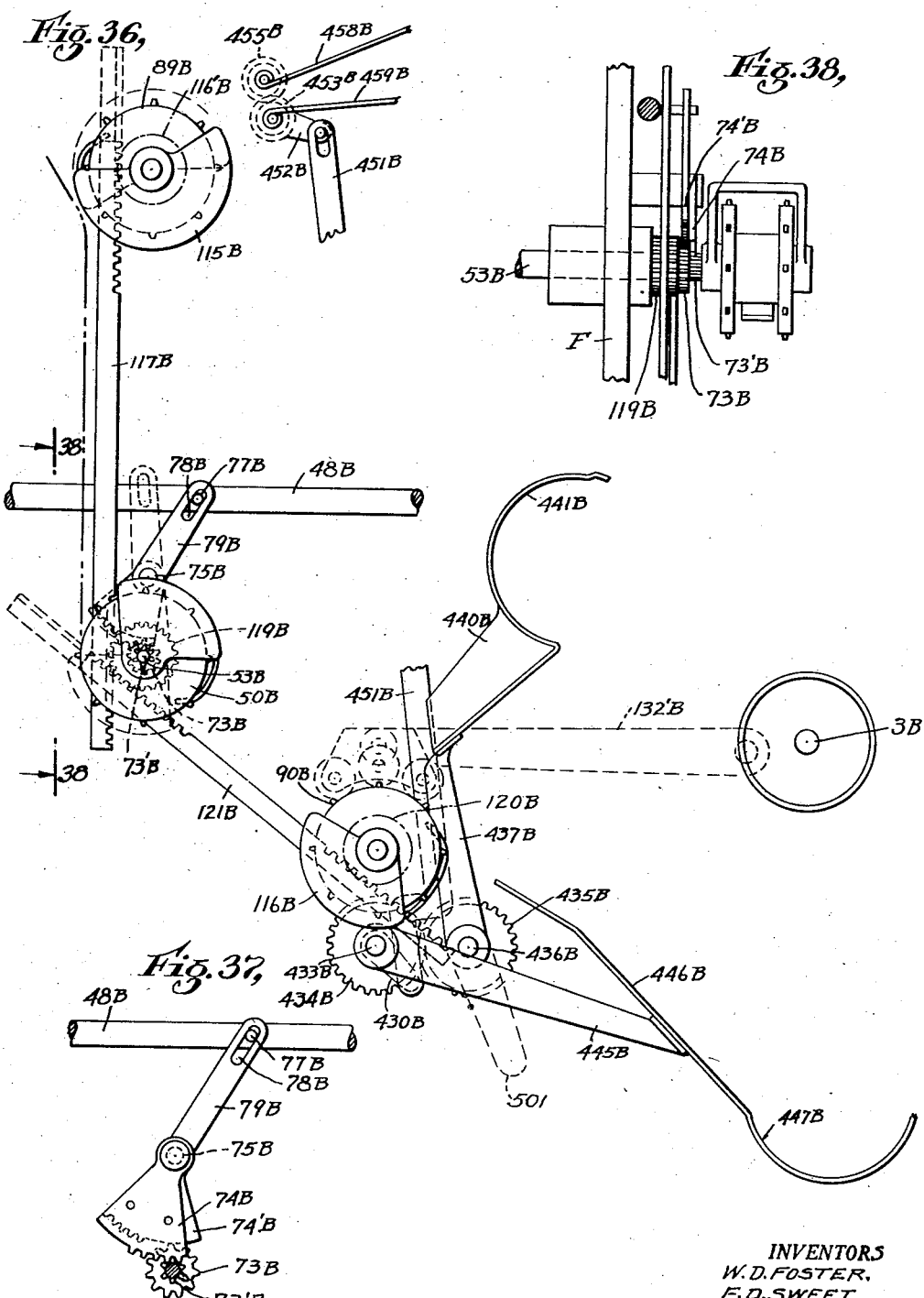

March 12, 1935.　　W. D. FOSTER ET AL　　1,993,735
FILM HANDLING APPARATUS
Filed April 4, 1929　　15 Sheets-Sheet 13

INVENTORS
W. D. FOSTER
F. D. SWEET
BY Waldo G. Morse
ATTORNEY.

March 12, 1935.                W. D. FOSTER ET AL                1,993,735
                                FILM HANDLING APPARATUS
                                Filed April 4, 1929         15 Sheets-Sheet 14
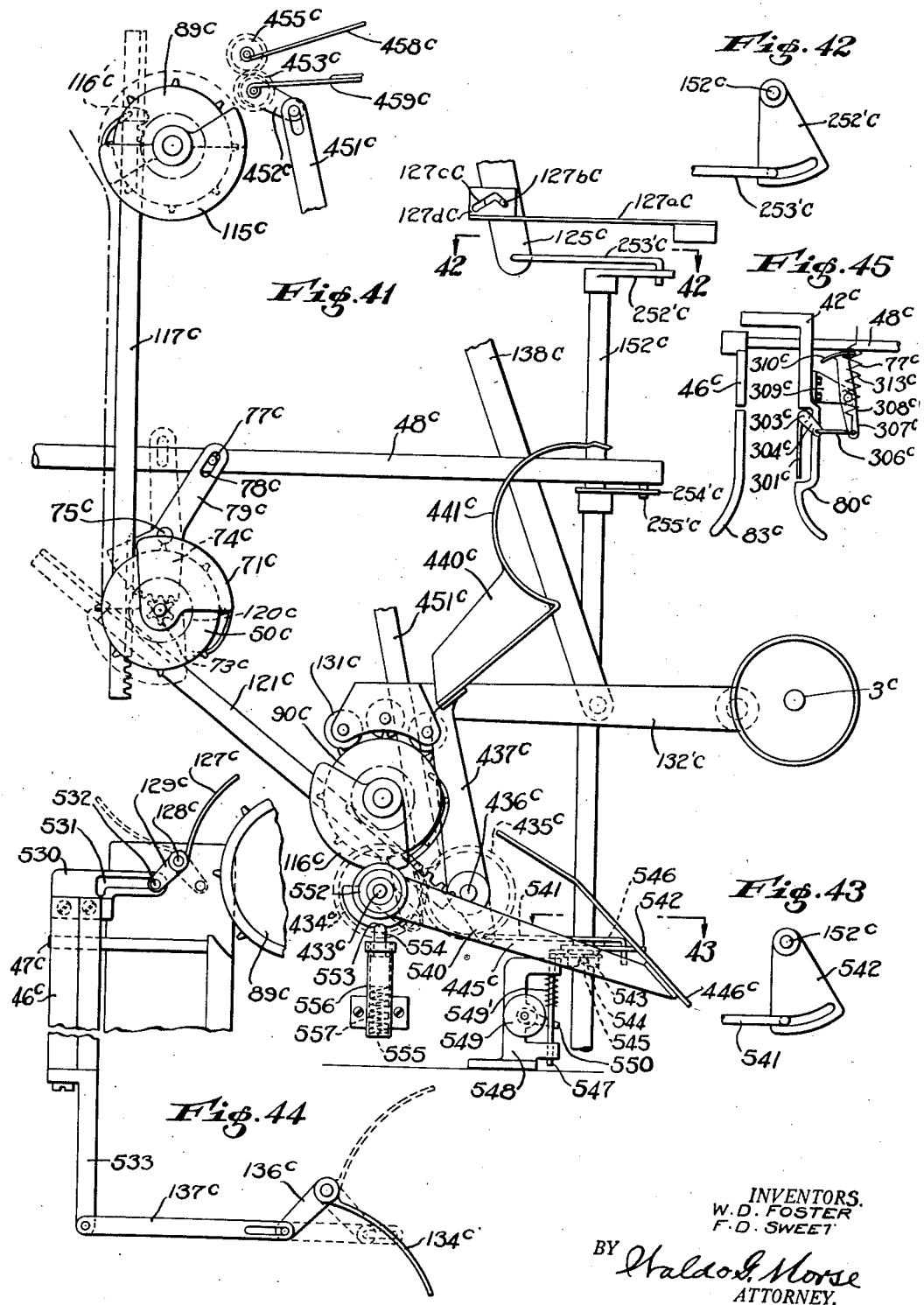

Patented Mar. 12, 1935

1,993,735

UNITED STATES PATENT OFFICE 1,993,735

FILM HANDLING APPARATUS

Warren Dunham Foster, Washington Township, Bergen County, N. J., and Frederick Davenport Sweet, New York, N. Y., assignors, by direct and mesne assignments, to Kinatome Patents Corporation, New York, N. Y., a corporation of New York Application April 4, 1929, Serial No. 352,525

159 Claims. (Cl. 88—17)

The present invention relates broadly to the art of photography, and more particularly to improvements in apparatus adapted for the handling of films, whether for the projection or taking of successive pictures, or for the reproduction or recordation upon films of images representing sound, as in film playing phonographs, or for the reproduction or recordation of such images in conjunction with images of things. It will readily be understood, however, that the present invention is applicable to many other types of apparatus for handling material and to many other uses.

An object of the present invention is to provide means whereby a film may be automatically placed in full operative relation with the film handling mechanism and the necessary loops of slack film formed as the film is moved from the supply carrier to the take-up carrier in a direction and through a path corresponding to that followed by the film during the normal operation of the apparatus.

An object of the present invention is to provide an entirely automatic film handling apparatus, suitable for use by amateur operators or others who desire to devote a minimum of time, effort, and skill to the operation of the apparatus. To place in complete operation apparatus constructed according to the present invention the user merely places a reel of film in any position upon the supply spindle and moves a single control button. As the result of these two manual operations, the apparatus itself propels the film from the supply reel to the take-up reel and attaches it thereon and during the course of such travel places the film in operative contact with all of the mechanisms necessary for the subsequent normal feeding thereof and creates in the film the necessary loops of slack whereby compensation may be secured for the differences in character of movement of the continuously moving feeding members and the intermittently moving feeding member.

Such single movement of the one control button is moreover effective for actuating the motor and light circuit. If he desires, the user may move the one control button to another station whereby he may display a single picture or successive still pictures or to a third station whereby he may remove the film from the apparatus and substitute another and to a fourth station whereby the film is re-wound by the apparatus without removal therefrom, all such operations being performed entirely automatically, the necessary electrical circuits being controlled in an appropriate manner and all operations carried out without further human attention.

A further object of the present invention is to provide entirely mechanical and positive means, operable without putting any especial strain or tension upon the film, whereby all of the above results may be obtained.

An object of the present invention is the provision of means whereby the film may be propelled from the supply spindle to the continuous sprocket associated therewith and placed in operative contact with such sprocket without attention on the part of the operator. Another object is the provision of improved automatic means whereby the film after it has been propelled from said supply spindle through the apparatus to the take-up sprocket may be firmly attached to the carrier positioned upon the take-up spindle.

It has been proposed to provide a guiding member to direct the film from the take-up sprocket to the take-up carrier which guiding member must be initially positioned by an isolated hand operation and is removed from operative position by pressure from the film itself after the mass of film wound upon the hub of the carrier plus the diameter of the hub of the particular carrier which may happen to have been used reaches a certain diameter. The present invention provides guiding members which are automatically brought into and removed from operative position in proper timed relation to the actuation of all of the other operations of the apparatus and to the progress of the film therethrough, both such movements being definitely timed and being carried out without placing any burden whatever upon the film. Since such guides are moved by power and not by the film, they may be made of such sturdy construction that they are not easily bent or otherwise damaged or rendered inoperative. According to one form of the present invention, a predetermined number of revolutions of the take-up spindle is effective for removing such guiding members from operative position, the actuation of the take-up spindle in turn having been definitely timed in relation to the actuation of all other of the film feeding members and the movement of the gate and other guides. According to another form of the invention, the guide is removed from operative position by the automatically operated mechanism which actuates each of the feeding members and times such actuation and operates the gate and other guides. According to a third form of the invention, the movement of such take-up guide to inoperative position is accomplished by a simple, independent automatic mechanism, itself definitely timed and actuated by the automatic mechanism which controls the actuation of all feeding members and the operation of the gate and other guides. In all forms of the invention, the movement of such take-up guide to operative position is automatically accomplished in proper timed relation to the opening of the gate and the movement of the other guiding members.

In a preferred modification of the present invention, manually operable control means for such take-up guide are provided as an alternative to automatic operation.

A further object of the present invention is to provide similar guiding means cooperating with the supply spindle whereby the free end of a film positioned thereupon may be directed to the co-operating feeding member. A further object is to control such supply spindle guiding means in the appropriate timed or sequential relation to the operation of the take-up guiding means and to the actuation of all feeding members and the operation of all other guides and the gate. Such supply spindle guiding means include a fixed section surrounding the carrier upon the supply spindle and cooperating with the operable portion of the guiding means whereby the free end of a film upon such carrier, no matter what the position of such free end, will be directed between the operable guiding members and to the feeding members.

A further object is the provision of an interlocked actuating mechanism for the loop-producing means and such take-up and supply spindle guides.

A further object is to provide means whereby a supply spindle may be operated in one direction to propel a film therefrom and in the other direction to rewind the film thereupon.

A further object includes the provision of means whereby the film may be directed from and to the feeding members in connection with the initial positioning of the film and means whereby such directing means are automatically withdrawn to permit the production of loops of slack in the film.

A further object is the provision of control moved to a partially closed position, whereby mechanism for the gate whereby the gate is the propelled end of the film is directed therethrough but not impeded in such passage, in the proper timed or sequential relation to the movement of the guiding means or members, the actuation of the feeding members and spindles, and the operation of the loop producing mechanism. A related object is the operation of lateral positioning and locking means in such timed or sequential relation to the partial or complete closing of the gate and the actuation of the feeding members and spindles and the operation of the loop producing mechanism.

A further object is the provision of an improved form of such lateral positioning and locking means particularly suited to apparatus in which a film is first propelled into operative position relative to the various feeding members.

A further object is the provision of means whereby the film may be propelled into operative position relative to each toothed feeding member, automatically attached to a second feeding means, and by the operation of such second means placed in full operative relation with such toothed member, such method increasing the certainty of obtaining proper feeding results and decreasing the likelihood of damage to the film.

An object is the provision of means whereby the film may be first positioned in operative relation to the continuous feeding members and thereafter positioned in operative relation with the intermittent feeding member, and the loop-producing, film attaching, and film shielding mechanisms actuated in the desired timed or sequential relation to such successive positionings and to the operation of each other.

An object is to provide improved actuating mechanism for the shields which protect the film from the teeth of the feeding members and to operate such mechanism in the appropriate timed or sequential relation to the loop producing and the other mechanisms of the apparatus.

A further object is the provision of improved actuating mechanism for the members which hold the film in operative relation with the feeding members, such actuating mechanism being appropriately interconnected with the mechanism actuating the feeding means and operating the guiding means and the gate.

A further object is the provision of improved propelling, guiding and shielding means for a film, and the provision of control mechanism for each and all of such means and the parts component thereof and associated therewith assuring the actuation and operation of each and all of the same in timed or sequential relation to the actuation and operation of the other elements of the film handling mechanism.

Included also among the objects of the present invention, is the control of mechanism for the production of an unsupported loop of slack film, and the component and associated parts of such mechanism, in timed or sequential relation to the actuation of the other elements of the film handling apparatus.

An object of the present invention is to actuate each of the above mentioned elements and all of the elements of the apparatus in that timed sequential or otherwise related manner which will result in the completely automatic actuation and operation of the apparatus.

We prefer to illustrate our invention as applied to a film handling apparatus of the type disclosed and claimed in the copending applications of Barton Allen Proctor, Serial Number 54,910, filed September 8, 1925, now Patent 1,894,963, and in his application Serial Number 348,633, filed March 20, 1929, now Patent Number 1,944,037, a continuation in part of said first mentioned application, although it will be readily understood that our invention may be applied to other types of apparatus and subjected to control other than that of the sequential and unitary type disclosed in said applications and herein. We prefer also to illustrate our invention as making use of the sequential type of slack producing mechanism shown and claimed in the copending application of Warren Dunham Foster, Serial Number 347,959, filed March 18, 1929, which is a continuation in part of the application of said Foster, Serial Number 57,392, filed September 19, 1925. It will be readily understood, however, that use may be made of any other suitable type of loop or slack creating or guiding mechanism and that we are not in any way limited to the particular mechanism illustrated in any of said co-pending applications.

It will also be understood that many of the features of the present invention may be utilized in connection with the tension control system of feeding as disclosed and claimed in the co-pending application of Clarkson Ulysses Bundick and Barton Allen Proctor, Serial Number 44,482, filed July 18, 1925, and that many features thereof may be applied to apparatus in which the film is moved continuously in conjunction with optical rectification of the image.

Other objects advantages and characteristics of the present invention are apparent in the following description, the attached drawings, and the subjoined claims. Although we are showing one preferred embodiment of our invention, it will be readily understood that we are not limited to this particular construction as changes can readily be made without departing from the spirit of our invention or the scope of our broader claims.

In the drawings:

Figure 1 is a right side elevation of the machine, certain parts of the lamp housing being broken away and certain parts being omitted for clarity;

Figure 1a is a view taken on the line 1a—1a of Figure 1; and Figure 1b is a plan view of the same;

Figure 1c is an enlarged detail view of the actuating arm for the upper loop guide;

Figure 2 is a left side elevation of the machine, certain parts being omitted for clarity;

Figure 2a is a detail view of the control link for the film idlers and their associated parts;

Figure 2b is a detail plan view of the double clutch for the supply spindle;

Figure 3 is a partial side elevation broken away to show actuating parts in film threading position, certain parts being omitted for clarity;

Figure 4 is an enlarged skeleton view, taken on the line 4—4 of Figure 2, looking in the direction of the arrows, showing the clutches for the feeding sprockets, and the stripping shields cooperating with all feeding members and the means for operating the same;

Figure 4a is a side enlarged skeleton view of such shields and the means for operating the same;

Figure 4b is a view of a portion of the mechanism for actuating the film positioning and locking fingers, such fingers being in the inoperative position and Figure 4c is a side view of the same;

Figure 4d is an enlarged detail view of a portion of the power connection.

Figure 5 is a cross section on a line 5—5 of Figure 2 looking in the direction of the arrows, certain parts being omitted for clarity;

Figure 6 is a partial view, taken on the line 6—6 of Figure 1, showing the right side only to illustrate the gate; Figure 6a is a detail view of the gate rod crank lever and associated parts;

Figure 7 is a partial bottom plan view showing actuating levers in "projection-in-motion" position, with the control mechanism at Station S1 and with the manual control button at Station 0, cut of operative contact with the mechanism and about to be moved into such operative contact;

Figure 7a is an enlarged detail view taken on the line 7a—7a of Figure 7 looking in the direction of the arrows;

Figure 8 is a partial bottom plan view showing actuating levers in the "intermediate" position S0, having been manually brought to such position from Station S1;

Figure 11 is an enlarged view, taken upon the line 11—11 of Figure 7, looking in the direction of the arrows, certain parts being omitted for clarity;

Figure 12 is an enlarged view, taken upon the line 12—12 of Figure 7, looking in the direction of the arrows, certain parts being omitted for clarity;

Figure 13 is a diagram illustrating the timed or sequential operation of certain elements of the apparatus when constructed in accordance with the form thereof known for convenience as form "A";

Figure 14 is an enlarged detail view of a portion of the supply spindle clutch control mechanism, constructed according to form "A";

Figure 15 is an enlarged detail view of a portion of the supply sprocket clutch control mechanism, constructed according to form "A";

Figure 16 is an enlarged detail view of a portion of the intermittent or feeding sprocket control mechanism, constructed according to form "A";

Figure 17 is an enlarged detail view of a portion of the take-up sprocket control mechanism, constructed according to form "A";

Figure 18 is an enlarged detail view of a portion of the take-up spindle control mechanism, constructed according to form "A";

Figure 19 is a diagram illustrating the timed or sequential operation of certain elements of the apparatus when constructed in accordance with a preferred modification, such modification being known for convenience as form "B";

Figure 20 is an enlarged detail view of a portion of the supply spindle clutch control mechanism, constructed according to form "B";

Figure 21 is an enlarged detail view of a portion of the supply sprocket control mechanism, constructed according to form "B";

Figure 22 is an enlarged detail view of a portion of the intermittent or feeding sprocket control mechanism, constructed according to form "B";

Figure 23 is an enlarged detail view of a portion of the take-up sprocket control mechanism, constructed according to form "B";

Figure 24 is an enlarged detail view of a portion of the take-up spindle control mechanism, constructed according to form "B";

Figure 25 is a diagram illustrating the timed or sequential operation of certain elements of the apparatus when constructed in accordance with a preferred modification, such modification being known for convenience as form "C";

Figure 26 is an enlarged detail view of a portion of the supply spindle clutch control mechanism, constructed according to form "C";

Figure 27 is an enlarged detail view of a portion of the supply sprocket control mechanism, constructed according to form "C";

Figure 28 is an enlarged detail view of a portion of the intermittent or feeding sprocket control mechanism, constructed according to form "C";

Figure 29 is an enlarged detail view of a portion of the take-up sprocket control mechanism, constructed according to form "C";

Figure 30 is an enlarged detail view of a portion of the take-up spindle control mechanism, constructed according to form "C";

Figure 31 is an enlarged detail view of the take-up guiding mechanism in operative position the frame being omitted for sake of clarity;

Figure 32 is a view taken on the line 32—32 of Figure 31 looking in the direction of the arrows and showing a portion of the frame of the apparatus;

Figure 33 is a view corresponding to Figure 31, the parts being in inoperative position;

Figure 34 is an enlarged detail view of a portion of the operating trigger and primary latch controlled thereby;

Figure 35 is a skeleton view of the guiding mechanism associated with the take-up spindle, the guiding mechanism associated with the supply spindle, and the operative connection therebetween;

Figure 36 is an enlarged skeleton view, corresponding in part to Figure 33, of guiding mechanism associated with the spindles, in the inoperative position, such mechanism being operated in accordance with form "B" of the invention, and of the control mechanism for the shielding members associated with the feeding members whereby such shielding members are sequentially operated;

Figure 37 is an enlarged detail view of a portion of such actuating mechanism;

Figure 38 is a partial view looking in the direction of the arrows taken on line 38—38 of Figure 36;

Figure 9:
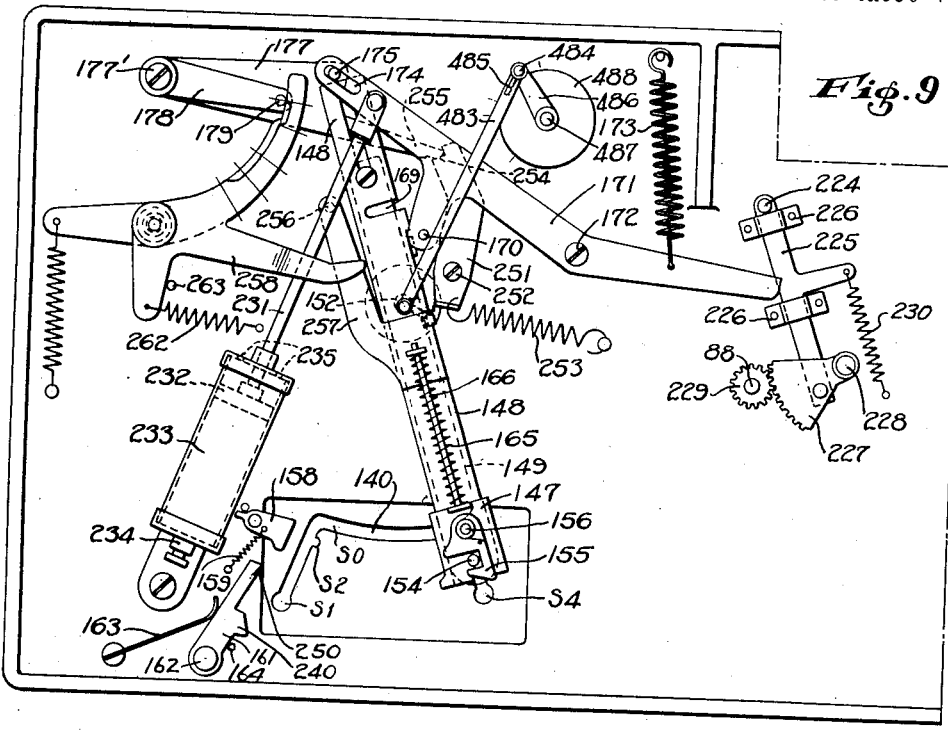
Figure 9 is a partial bottom plan view showing actuating levers in "film threading or changing" position, with the control button at Station S3.
Figure 10:
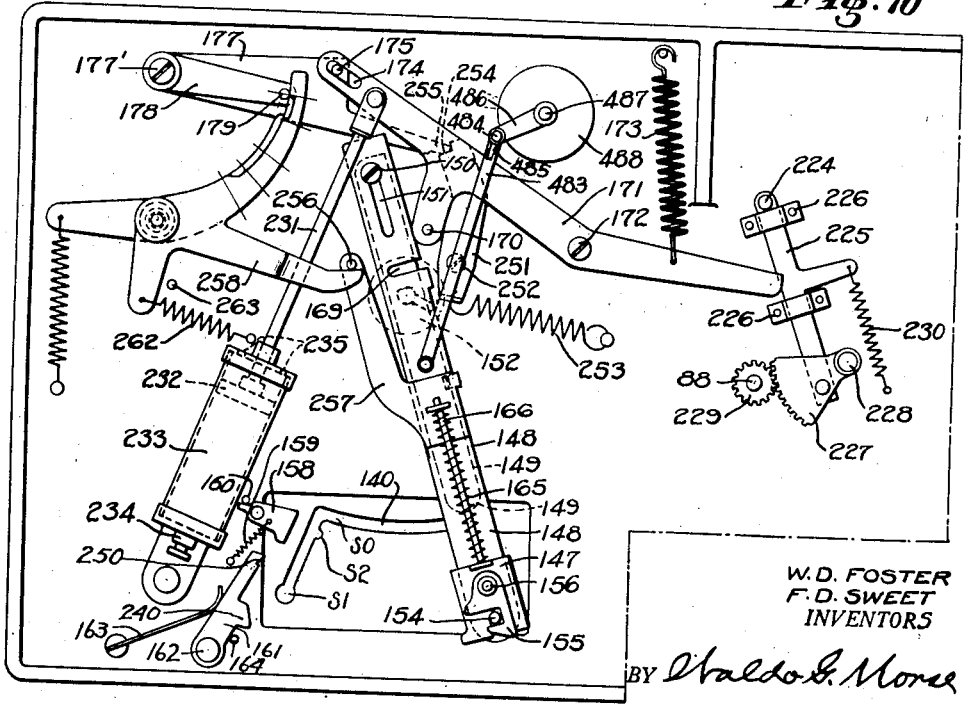
Figure 10 is a partial bottom plan view showing actuating levers in "rewind position", with the control button at Station S4.

Figure 41 is an enlarged skeleton view, corresponding in part to Figures 33 and 36, of the guiding mechanism associated with the spindles, constructed according to form "C" of the invention, such guiding mechanism being either manually or automatically operable and being operated in direct connection with the gate closing mechanism, and of the control mechanism for the shielding members whereby such members are operated during the last portion of the gate closing movement;

Figure 42 is a view taken on the line 42—42 of Figure 41, looking in the direction of the arrows;

Figure 43 is a view taken on the line 43—43 of Figure 41, looking in the direction of the arrows;

Figure 44 is an enlarged detail sectional view of means whereby the upper and lower loop guides are actuated directly by the movable section of the gate;

Figure 45 shows an improved form of lateral positioning and locking mechanism and gate structure;

Figure 46 (Sheet 3) is an enlarged detail view of the control mechanism at station S2 whereby a still picture may be projected;

Figure 47 (Sheet 3) is an enlarged detail view of a portion of the control mechanism showing means for securing a dwell between the initial and final gate closing movements;

Figure 48 (Sheet 11) is a side view broken away in part of the structure shown in Figure 46;

Figure 49 (Sheet 11) is a view of a preferred modification of the mechanism for actuating the upper and lower loop guides in sequential relation;

Figure 49a is a view taken on the line 49a—49a of Figure 49, looking in the direction of the arrows;

Figure 49b is a view taken on the line 49b—49b of Figure 49 looking in the direction of the arrows;

Figure 50 (Sheet 11) is an enlarged detail view of a portion of the mechanism for actuating the film retaining members, when constructed according to a preferred modification;

Figure 51 (Sheet 5) is a wiring diagram of the apparatus.

Figure 52 is a cross section along the line 52—52 of Figure 3.

Figure 53 shows control mechanism of our invention operated in accordance with the copending application of Warren Dunham Foster, now Patent Number 1,943,303.

In carrying out the present invention, there may be provided an apparatus comprising a supporting base B having mounted thereon a lamp L and resistance containing housing H and a supporting frame F upon which are mounted the operating parts of the film feeding and controlling mechanism per se.

Preferably carried by the frame F and projecting from one side thereof in predetermined spaced relationship is a pair of reel receiving spindles 2 and 3, the spindle 2 being adapted for the holding of a reel of film during the feeding movement thereof and adapted to effect rewinding of the film at the conclusion of the feeding movement, while the spindle 3 is adapted to be positively driven during the feeding movement for coiling the film as required.

The spindle 3, which will hereafter be referred to as the driving or take-up spindle, is journaled for rotation in a suitable bearing 7 in an enlarged boss 8 in the frame F. A friction driving member 9 is secured to the left hand end of the spindle as viewed in Figure 5. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14. Projecting rearwardly from the disk 11 is a circular series of closely spaced teeth 15 adapted to be engaged by a clutch hereinafter described in detail by means of which the driving spindle 3 may be rotated through the friction surfaces just described.

Projecting from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located on one side of the frame F. This shaft at its forward end is mounted in spaced bearings 22 carried by the bracket 16 and is connected to a driving motor M preferably through a flexible coupling 23 of any desired or usual construction. By reason of this mechanism, it will be apparent that when the motor M is operated, the shaft 18 will be positively driven through the worm and wheel before referred to. For transmitting this rotational movement from the shaft 18 to the spindle 3 at will there is provided a collar 24 mounted upon the inner end of the shaft 18 for rotational movement therewith and longitudinal movement relatively thereto and including an extension, having therein a groove 25, and terminating in closely spaced teeth 26. By moving such collar 24 to the right, as viewed in Figure 5, the teeth are projected to bring them into engagement with the corresponding teeth 15 whereby a positive drive is immediately established for the driving spindle. This clutch will hereinafter be referred to as the driving spindle or take-up spindle clutch.

The spindle 2, which will hereinafter be designated the rewinding spindle, or, when the context makes such phrasing desirable, as the delivery or supply spindle, is mounted similarly to the driving spindle 3 in a bearing 28 carried by the frame F, an enlarged boss 28' being provided coaxial with such bearing and spindle. Extending in alignment with the rewinding spindle 2 is a shaft 31 suitably journalled in a bearing 32 carried by a bracket 33 illustrated as secured to the frame F. For driving the shaft 31 there may be provided a collar 31' pinned to the shaft 31 and bearing against a flat spring 36' which forces a fibre disk 37' against a face of a pulley 37. The pulley 37 is mounted in line with a similar pulley 38 mounted on the outer end of a stub shaft 39 secured in the bracket 16. Also mounted on the shaft 39 is a spur gear 40 adapted to be driven by a similar, but preferably larger, gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18.

It will readily be understood by those skilled in the art that this provision of a yielding drive for the shaft 31 especially in combination with the belt and pulley drive, prevents the forward or "leader" end of the film which is attached to the take-up spindle 3 being torn loose therefrom at the conclusion of the rewinding cycle.

Loosely mounted upon the shaft 31 is the pulley 29 which is connected by a suitable belt with the pulley 30 pinned to the shaft 18, or, if desired, a gear may be substituted for such pulley 29 and power delivered thereto from the shaft 18 by a gear train. By reason of such construction, during the operation of the motor, the pulley 29 is constantly in motion in the same direction, as the shaft 18, namely in a feeding direction, and the shaft 31 is constantly in motion in a contrary or rewinding direction.

For operatively connecting at will either the shaft 31 or the pulley 29 to the spindle 2, the following mechanism may be employed:

Mounted in an upward extension of the bracket 33 is the shaft 33a to the ends of which are pinned the spur gears 33b and 33c meshing respectively with the spur gears 33d and 33e. Such gear 33d is attached to the left hand end of the collar 33f which is mounted upon the left hand extension of the spindle 2, as viewed in Figure 5, for rotation therewith and longitudinal movement relatively thereto. Such gear 33e is attached to the right hand side of the pulley 29 for revolution therewith. Pinned to the shaft 31, is the collar 33g in the right hand side of which are cut closely spaced teeth 33h for cooperation with the closely spaced teeth 33i formed in the left hand side of the gear 33d, as viewed in Figure 5. Cooperating with the groove 33j in the collar formed with or attached to the gear 33d and with the depression 33k between the gear 33e and the pulley 29, are the fingers 33l and 33m, which, as clearly seen in Figure 2b, are carried by the forked arms 33n and 33o yoked together by the bar 33p loosely attached to the arm 33q which in turn is attached to the supply spindle control rod 188 later described.

By reason of this construction, it will be evident that movement to the right from the neutral of the yoke 33p and the fingers 33m and 33l from the position shown in Figure 5 so that the gear 33d meshes with the gear 33b will communicate the rotation of the pulley 29 to the spindle 2 and will serve to rotate such spindle in the same direction as such pulley and the take-up spindle 3 are rotated, namely, in a feeding direction. Movement of the yoke 33p to the extreme left as viewed in Figure 5 will be effective for destroying the connection between the gears 33b and 33d and for bringing the teeth 33i into contact with the teeth 30h, thereby placing the spindle 2 in direct operative connection with the shaft 31 and rotating it thereby in a contrary direction from that in which it was previously rotated, namely, in a rewinding direction.

We prefer so to construct the gate that the film may be initially positioned in respect thereto either by the operation of a feeding member which propels the free end of the film between the sections of the gate or by a single lateral manual movement of the film relative to the gate. We prefer also to make use of the construction shown by the said Proctor in his above mentioned co-pending applications by reason of which it is possible at any time to stop the operation of the apparatus, open the gate and move the guiding elements associated therewith to inoperative position and manually remove the film from the gate by a movement at right angles to its path of travel therethrough.

Mounted on the frame F adjacent the motor M, we may place a gate section 42 preferably secured in any desired manner as by screws 43 against movement relatively to the frame. This section is preferably formed with an aperture 44 through which light may be projected as well understood in the art, and with a film guiding depression 45 extending lengthwise of the section and intersection the aperture 44 for the travel of the film, such despression preferably being of great depth relatively to the thickness of the film. Cooperating with the section 42 is a relatively movable section 46 preferably guided by a pin 47 projecting outwardly from the section 42, and secured to one end of the gate opening rod 48 slidable through a suitable opening in the gate section 42 and a suitable bearing 49 on the frame F. The usual spring pressed pressure plate is provided. By reason of this construction, it will be apparent that when the rod 48 is moved to the left as viewed in Figure 1 it will be effective for moving the section 46 away from the section 42 thus relieving the pressure between the sections and permitting the removal of one film or the insertion of another film, such insertion being accomplished either by propulsion or by a manual lateral movement, while movement in the opposite direction will bring the sections into cooperative relation. An idler 127h may be mounted at the upper end of the section 42 for cooperation with the film below the upper loop, later described.

For effecting the desired intermittent feeding motion of a film in position in the gate, there may be provided a feeding sprocket 50 having film engaging teeth 51 adapted to engage usual perforations substantially peripherally positioned in the film f. This sprocket is mounted on a shaft 53 extending transversely through the frame F and carrying at its opposite end a star wheel 54. This star wheel, which may be of any well known construction, is adapted to be intermittently driven by means of a sectional cam 55 secured adjacent one end of a shutter shaft 56 journalled at one end of a grease casing C within which are mounted the cam 55 and star wheel 54, and at its opposite end may be journaled in a suitable bearing carried by a bracket projecting from the frame F as shown in Patent Number 1,894,963.

Mounted loosely upon the shaft 56 adjacent the opposite end thereof, (Figure 2) is a gear 59 upon the inner surface of which are mounted the closely spaced teeth 60 which engage with the teeth 61 which project forwardly from the collar 62 mounted in a long bearing upon the shaft 56 for rotational movement therewith and longitudinal movement relative thereto, such collar including the groove 63.

Intermediate the gate section 42 and the objective lens O the shutter 68 may be positioned. This shutter may be mounted as in a casting adapted to be secured directly to one side of the main frame F and over a shaft receiving extension 284 passing through an opening 285 in the frame. Mounted in the extension 284 is a shaft 286 carrying at one end a spiral gear 287 adapted to mesh with a suitable gear 288 on the shaft 56, preferably positioned with the casing C. The opposite end of the shaft 286 extends into an enlargement 289 and is provided with a spiral gear 290 meshing with a suitable gear 291 on a longitudinally extending shaft 292. The shaft 292 at one end carries the shutter 68 which may be secured in position by the driving disk 293. The casting 283 may be shaped to receive the objective lens holder 282, or such holder, as illustrated in Figure 1, may be attached directly to the frame F. It will be understood that the lubrication for the shafts 286 and 292 and the gears 287, 288, 290 and 291 is provided by the solidified oil or other suitable lubricant which fills the box C in which the cam 55 and the star wheel 54 are mounted.

Secured to the end of the driving shaft 21, and in line with the gear 59, is a gear 69 which through the gear 70 mounted upon the shaft 64 supported in the bracket 65 is effective for driving the shutter shaft 56 from the drive shaft. By reason of this construction, it will be apparent that when the collar 62 and the teeth 61 are moved to the left as viewed in Figure 2 the shutter shaft 56 is rotated by the motor M.

As is clearly shown in Figures 4 and 4a, cooperating with the sprocket 50 and normally occupying the position illustrated in Figure 1 of the drawings, is a stripping shield 71 mounted loosely upon the sprocket shaft 53. Secured to the inner side of the shield 71 is a pinion 73 with which meshes an arcuate rack 74 having a pivotal mounting 75 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 4a for the purpose of opening the relatively separable gate sections, will effect rotation of the rack in a counter-clockwise direction as viewed in this figure, thereby rotating the shield in a clockwise direction. This rotational movement of the shield will be effective for engaging the film f and stripping the same from the sprocket preparatory to the removal of the film from the apparatus. During the application by lateral movement of a new film or during rewinding, it will remain in this position, preferably covering all of the teeth of the sprocket which are exposed during the feeding of the film. Thus the threading operation of the film is greatly expedited, and the film completely protected from all teeth during such changing operation or during rewinding.

For further assisting the manual, lateral threading movement, the relatively fixed gate section 42 is provided with a projecting guide 80 having a generally curved contour for gradually guiding the film over the fixed gate section, the guide having a curved and inclined end 81 for insuring passage of the film over the sprocket and an oppositely inclined and curved end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower extending end 84 having a function corresponding to that of the curved end 82 of the guide member 80, and described in detail hereinafter. Supported from one end of the movable gate section by the spring 86 is a shoe 85 curved to generally conform to the curvature of the sprocket 50, the contour of the inner surface accommodating the teeth 51 of the sprocket. These guides and shoe cooperate in a manner, as will be readily apparent from the drawings, to permit a film to be positioned between the gate members by moving the same along its normal direction of travel through the gate or, if desired, by moving it laterally relatively to such direction, and to be removed, if desired, prior to the completion of its feeding movement by a similar lateral movement in the opposite direction. The movement of the shoe 85, later described, is effective to place the film in operative position relative to the sprocket 50. This greatly lessens the time required for threading new film into position, and assists in the automatic operation of the apparatus.

When the apparatus is utilized for so-called "still" projection of pictures and during film threading or rewinding, it is necessary or desirable to provide means in the path of travel of the light rays for protecting the film against danger of injury by reason of undue temperature conditions. For effectively shielding the film during such period, there is provided a trap or shield 87 composed of suitable material such as copper screen of suitable mesh carried by a shaft 88 having one end journaled in a bearing 88' projecting from the frame F and having its other end suitably journaled in the supporting base B. This shaft is adapted to be periodically operated in accordance with the character of operation of the machine.

In order bodily to position the film in proper lateral relation to the film moving means and to the gate, we provide a positioning mechanism of the type disclosed and originally claimed in the copending application of Barton Allen Proctor, Serial Number 187,980, filed April 30, 1927, now Patent Number 1,944,033, and now broadly claimed in his copending application, Serial Number 348,633, filed March 20, 1929, now Patent 1,944,037, which is a continuation in part of said application and in part of his copending application, Serial Number 54,910, filed September 8, 1925, now Patent Number 1,894,963. An improved form of such mechanism is later herein described.

As will be apparent from Figures 1, 6, 4b and 4c, there are provided film positioning fingers 301 of such nature that when retracted they lie entirely within the recess 302 within the area of the fixed gate section. Suitably attached to such fingers, is the connecting rod 303 to which movement is applied through the arm 304, in an opening 305 of which there is inserted the link 306 which in turn is attached to the lever 307 having a pivotal mounting 308 carried by the bracket 309 projecting from the gate section 42. The end of the lever 307 opposite to that to which the link 306 is attached is turned substantially at right angles to the body portion to provide an annular portion 310 which is substantially arcuate and adapted to receive a relatively long slot 311 in which the pin 77 moves. The link 306 is preferably continued beyond the plane of the lever 307 to provide a post 312 for cooperation with the tension spring 313 so positioned as to snap the lever 307 in one direction or the other, after it has been moved a predetermined distance in such direction, the elongated slot 311 constituting a lost motion connection between the parts.

By reason of this construction, it will be apparent that when the rod 48 is moved to the left as viewed in the drawings, it will be effective for rotating the lever 307 in a counter-clockwise direction and effecting thereby similar rotational movements of the fingers 301 from the locking position shown in Figure 1 to the inoperative position shown in Figures 6, 4b and 4c. As such fingers 301 are moved into a position substantially normal to the longitudinal axis of the rod 303 and within the limits of the gate section 42, the gate section 46 is moved relatively to the section 42 thus opening the gate and permitting the removal of a previously displayed film and the lateral insertion of another. Movement of the rod to the right, however, will perform the opposite function. The fingers 301 will be rotated to the left, as viewed in Figure 4b, immediately with the beginning of the closing movement of the gate, and will at once sweep completely into the gate and into the film path generally and into proper lateral position relative to the feeding sprockets any film which may have been positioned within the general area of the gate or near to the sprockets. Such bodily positioning will take place well in advance of the completion of the closing movement of the gate and of the completion of the movement of the shoes and guides relatively to the sprockets, thus insuring the proper positioning of the film and precluding the possibility of an edge of the film being caught by the side of the gate or the perforations in the film being other than in proper lateral alignment with the teeth of the sprockets.

As previously stated, we prefer to apply our invention to a loop setting or slack creating apparatus of the type disclosed and claimed in the copending application of Warren Dunham Foster, Serial Number 347,959 filed March 18, 1929, which is a continuation in part of the copending application of said Foster, Serial Number 57,392, filed September 19, 1925, now Patent Number 1,943,303. It will be readily understood, however, that many features of our invention may be applied to any other suitable loop forming or loop guiding or slack producing apparatus, or to the tension control system of feeding.

Conveniently positioned above and below the gate, we place the conventional continuous sprockets 89 and 90, the former hereafter called the supply sprocket, to draw film from the supply reel, and the latter, hereafter called the take-up sprocket, to take film away from the intermittent or feeding sprocket 50 and move it toward the take-up reel.

The supply sprocket 89 we preferably position within the curved upward portion of the guide member 80 so that if the film is removed from the apparatus by a movement lateral to its ordinary course of travel therethrough, it will be easily guided from such sprocket. As is clearly shown in Figure 4, we mount such sprocket 89 upon the shaft 91, which is supported by the main frame and by the bracket 92. Loosely mounted upon the shaft 91, we place the spiral gear 94 to the right side of which is attached the serrated disk 95. Further to the right, we mount upon the shaft 91 for longitudinal movement relative thereto and rotational movement therewith the clutch collar 96 with the annular depression 97 for cooperation with the clutch fingers later described and terminating to the left in the serrated disk 98 for appropriate engagement with the serrated disk 95.

For actuating the take-up sprocket 90, similar mechanism may be provided. As is likewise clearly shown in Figure 4, we mount such sprocket 90 upon the shaft 100 which is supported by the main frame and by the bracket 101. Loosely mounted upon the shaft 100, we place the spiral gear 102 to the right side of which is attached the serrated disk 103. Further to the right, we mount upon the shaft 100 for longitudinal movement relative thereto and rotational movement therewith the clutch collar 104 with the annular depression 105 for cooperation with the clutch fingers later described and terminated to the left in the serrated disk 106 for appropriate engagement with the serrated disk 103.

As is clearly shown in Figure 4d, upon the hub of gear 102, the spiral gear 108 may be cut, or such gear may be attached to gear 102 in any desired manner. The gear 108 is supported by the bracket 101 and meshes with a suitable gear 107 pinned to the power shaft 21. Engaging with the gear 102 is the gear 108', such gear being pinned to the shaft 109 which is mounted in the bracket 110 supported by the frame F. To the opposite end of such shaft, there is pinned the gear 111 which drives the gear 94.

Suitable housings, not shown, may be supplied for all gears by a casing, not shown. If desired, the entire apparatus may be mounted in a cabinet.

As is clearly shown in Figures 4 and 4a, we provide stripping and protective shields 115 and 116 cooperating with the continuously driven sprockets 89 and 90, and similar in operation to the shield 71 which cooperates with the feeding sprocket 50.

The shield 115 is mounted upon the shaft 91, and has pinned to its inner or left hand extension, as viewed in Figure 4, a pinion 116' which meshes with a toothed bar 117 supported as in the bearing 118 and at its opposite end engaging with the pinion 119 which is mounted for movement with the pinion 73.

Similarly, the shield 116 is mounted upon the shaft 100 and has pinned to its inner extension, viewed as above, the pinion 120 which meshes with a toothed bar 121, supported as in the bearing 122, and at its opposite end engaging with the pinion 119 which is mounted for movement with the pinion 73.

Each shield terminates in an inwardly curved extension, narrower than the axial distance between the teeth of the sprocket, thus, as is common in the motion picture art, stripping the film from the sprocket during the feeding operation, and hence preventing it from following the teeth too far. It will be recognized that such stripping is entirely different from the primary function of such shields—to wit, the bodily removal of the film from the feeding members and its complete protection therefrom.

The operation of such shields will be obvious from Figure 4a. As the rod 48 is moved, in the manner previously described it will be effective for operating the shield 71, and, with it, the shields 115 and 116. Thus the movement of the rod 48 to the left as viewed in Figure 4a will be effective to move all shields from the full line positions to those shown in dotted line, in timed relation to the opening of the gate, thus removing the film from the teeth of the sprockets and completely shielding it therefrom.

Film guides and film retaining members cooperating with the gate and with the feeding mechanisms are provided.

A film retaining element, preferably consisting of three rollers or idlers 123, relieved, as is common in the motion picture art, is mounted upon the right of the arm 124, as viewed in Figure 4, which is mounted upon the plate 125 which is attached to and pivoted upon the stud 126 extending through the frame F and attached to the downwardly extending arm 125', such retaining element being held in cooperative relation with the supply sprocket 89 by the tension of the spring 127a.

An upper loop guiding element, preferably consisting of a curved plate 127, is pivotally mounted upon the pin 128, extending from the main frame adjacent the upper portion of the gate, and attached to an arm 129 to which is connected the link 130, such link being attached by a pin to the elongated slot 130' in the arm 130" attached to the gate control rod 152, as is clearly shown in Figure 1c.

A similar retaining element, preferably consisting of three rollers or idlers 131, relieved as is common in the motion picture art, is mounted upon the arm 132, which is mounted upon the plate 132', which plate is attached to and pivoted upon the stud 133 extending from the front of the frame F.

A lower loop guiding element, preferably consisting of a curved plate 134, is pivotally mounted upon the pin 135, extending from the main frame adjacent the lower portion of the gate. Attached to such plate 134 is the arm 136 which by means of a pin extending therefrom into an elongated slot 136' of the link 137 is attached to and moves with the movable gate section 46.

To actuate the film retaining element positioned adjacent the lower portion of the gate in timed relation with the film retaining element positioned adjacent the upper portion of the gate, the plates 125 and 132' are joined by the link 138.

By reason of such construction, it will be evident that when the plates 125 and 132' are moved upwardly, as viewed in Figure 2, by means later described, the film retaining rollers 123 and 131 will likewise be moved upwardly away from the sprockets 89 ad 90. By means later described, the loop guiding plates 127 and 134 will likewise be moved downwardly, thus completing the track or path for the film from the supply sprocket through the gate to the take-up sprocket, such movements of such elements being effective to facilitate the positioning of a new film or the edge-wise removal of one already displayed. Similarly, the downward movement of the plates 125 and 132' will be effective to bring the guiding elements 123 and 131 into cooperative relation with the sprockets 89 and 90 respectively, thus positioning the film thereupon and retaining it in cooperation therewith. By means later described the guiding plates 127 and 134 will be simultaneously moved upwardly and away from the film track, thus permitting the unimpeded production of the loops of slack film, in the manner later described.

Mechanism adapted automatically to position the film in correct relation to all of the feeding members including the take-up spindle and to guide the film as it is propelled from the supply spindle to the supply sprocket, is to a large extent shown in Figures 1, 1a, 1b, 3 and 31 to 35 inclusive.

Pinned to the inner portion of the take-up spindle 3 there may be provided the pinion 401 which meshes with the relatively large gear 402 loosely mounted upon the shaft 403 carried by the take-up operating control plate 404. Mounted upon the inner surface of such gear 402 is the cam plate 404' which is adapted to control the trigger 405 slidably mounted by pins 406 upon the plate 404 and urged downwardly by the spring 407 attached to the pins 408 and 409 affixed respectively to the trigger and to the plate 404. As is clearly shown in Figure 34, the lower end of the trigger 405 by means of a pin 410' working in the enlarged slot 410" is attached to a first latch 410 which latch by means of the pin 411 is loosely mounted upon the control plate 404. Such latch may consist of the toothed portion 412 urged outwardly by the light spring 413, the head of such trigger bearing against the protuberance 414 upon a second latch 415 which second latch is mounted upon the pin 416 affixed to the lower edge of the plate 132' and held upwardly as viewed in the drawings by the spring 418 one end of which is pinned to the plate 132' and the other end of which is pinned to the latch 415. The movement of such trigger is limited by the projection 419 bearing against the pin 420 upon the plate 132'. Downward movement of the trigger 405 will be effective, as clearly appears from the drawings, for moving the first latch 410 and the second latch 415 downwardly, thereby releasing the head 422 on the second latch and the detent 423 which is formed upon the arm 425 extending upwardly from and movable with the main control plate 404. Following such release, it is obvious that the left hand end of such main control plate 404 will move downwardly from the position shown in Figure 31 to the position shown in Figure 33, such movement being accomplished by the spring 426 and limited by the pin 427. Formed in the extreme left extension of the plate 404 is the slot 430 in which the pin 431 attached to the arm 432 operates, such arm being pinned to the shaft 433 to which also the gear 434 is pinned which gear meshes with the gear 435 pinned to the shaft 436. To such shaft is fixed the upwardly extending arm 437. Projecting forwardly from such arm 437 is the guiding element 440 which terminates to the right as viewed in the drawings in the circular surface 441 which is adapted to co-act with the hub 442 of the carrier 443 placed upon the take-up spindle 3. Attached to the shaft 433 is the arm 445 which carries at its forward end the guiding element 446 likewise terminating at its right hand portion with a circular plate 447. The guiding member 448, fixed to the frame F, cooperates with the guide 440.

Similar guiding members for the carrier 450 placed upon the spindle 2 are provided. As is clearly shown in Figure 35, such guiding members are operated by a link 451 extending from the previously described arm 432 to the arm 452 affixed to the gear 453 which meshes with the gear 455, in connection between the link 451 and the arm 452 being accomplished by a pin working in a relatively elongated slot. As is clearly shown in Figure 1a, such gears are suitably mounted upon the bracket 456 which extends from the main frame F. Attached to the gear 455 is the upper guide element 458 terminating to the right in the guide roller 449. Attached to the gear 453 is the main lower guide element 459. Carried upon such guide member 459, is the guide shoe 460, mounted upon the pins 461 and 462, such pins working through slots in the member 459. Between the pins 461 and 462 is the compression spring 463 coiled about the rod 464. Substantially horizontal movement of the guide 460 is obtained by a connection between such guide and the link 451, such connection comprising an arm 465 attached to guide shoe 460, a pin extending from such arm and working in a relatively long slot in an upper right angled extension 466 of the pivotally mounted link 467, a lower right angled extension 468 of such link being attached to the link 451 by a pin working in a relatively long slot. It will thus be evident that the movement of the arm 432 will be effective to bring together or apart the guide elements 458 and 459, and to move the shoe 460 toward or away from the spindle 2.

Embracing the periphery of the supply reel 450 there may be provided a guiding element 470 whereby the film upon the revolution of the reel 450 is prevented from leaving the reel except through the opening between the guiding elements 458 and 460.

In order to form a completely enclosed channel or track for the film, all guiding elements and the film retaining elements—including members 123, 127, 131, 134, 440, 446, 448, 458, 459 and 460—are preferably provided with both outer and inner sides or flanges which form contact with each other or with the appropriate portion of the apparatus, when such members are in the operative or guiding position, to form such enclosed channel. For clarity, such sides or flanges are largely omitted from the drawings. Their construction may be as indicated in Figure 52. Guiding element 470 may be provided with such an outer flange.

For controlling the operation of the apparatus in the manner desired, there is preferably provided a single control member in the form of a knob or button 139 projecting through a substantially U-shaped slot 140 in the supporting base B. This slot is so shaped as to provide five operating stations designated respectively S1, S2, S0, S3 and S4. The button 139 is adapted to be moved at will so that the control mechanism will occupy any one of these stations. With the control at the station S1, the respective parts of the apparatus are in such position as to insure the normal projection of pictures as usual motion pictures. With the control button at Station S2, there is obtained a so-called still or stereoptican projection, the movement of the button from the Station S1 to the Station S2 being effective for disengaging the respective driving mechanisms which are in operation during the projection of pictures in motion. With the control button at the intermediate position, Station S0, mechanical timing of the actuation of the control and guiding mechanisms becomes automatically operative. With the button in position at Station S3, the respective parts of the apparatus are in such position as to permit the positioning of a film therein or the removal of a film which has just been fed therethrough. It will be understood that the movement of the button from Station S0 to Station S3 automatically produces the required change in the operating position of the parts. With the button in position at Station S4, the respective parts of the apparatus are in such position as to permit rewinding of the film by means of the motor M. The movement of the button from Station S3 to Station S4 automatically produces the required change in operating conditions necessary for such rewinding.

The control mechanism actuated by the control button 139 is to a large extent shown in Figures 7 to 23 inclusive of which Figures 7 to 10 inclusive illustrate the change in the position of the parts following the movement of the control button to the respective stations. The control button 139 is attached to the control mechanism in such manner that the connection therebetween is automatically destroyed or reestablished in accordance with the operating requirements of the apparatus. Such button may be mounted upon the pin 142 having a head 143 against one side of which bears one end of a compression spring 144 (Figure 48—Sheet 11). The opposite end of such spring bears against a flange 145 extending inwardly from the control button 139. By reason of this construction, it will be apparent that the button may be moved vertically on the pin 142 but that the spring 144 will normally be effective for urging the button downwardly. At its lower end, the button 139 has a collar 146 of a diameter substantially to conform to the contour of the slot 140 as enlarged at each of the respective operating stations except Station S0, whereby with the button in its lower position accidental movement from one of these stations is prevented. The lower end of the pin 142 is attached to the sleeve 147 which is slidably mounted upon the lever 148. Such lever 148 is mounted upon the lever 149. The headed pins 150, attached to the lever 149, extend through slots 151 adjacent each end of the lever 148. The lever 149 is operated in conjunction with a gate control rod 152 journalled in a bearing bracket 153 projecting from the rearward side of the main frame F. As is clearly shown in Figure 7A (Sheet 6) attached to such rod 152, is the pin 152' which operates through an opening in the collar 149' which is loosely mounted upon such rod 152 and is pinned to the rotating lever 149. By reason of this construction the lever 149 is restricted in movement to rotation only. The combined sliding and rotating lever 148 is effectively mounted on the rotating lever 149 for rotational movement simultaneously therewith and sliding movement independently thereof. Projecting downwardly from the lever 148 is a pin 154 with which the hook 155 pivoted upon the pin 156 attached to the sleeve 147 is adapted to cooperate.

Pivoted upon the pin 157 substantially in line with the portion of the slot 140 extending from station S3 to station S0 is the block 158, normally urged downwardly by the spring 159, upward movement being limited by the pin 160 with which the left hand projection of the block is adapted to contact. Positioned below such block is the pawl 161 pivoted as upon the pin 162 and urged to the right by the spring 163 against the pin 164. Urging the sleeve 147 downwardly as viewed in Figures 7 and 8, there is provided the spring 165 mounted about the rod 166 which may be supported in any desired manner by such sleeve and by the lever 148.

By reason of the above construction, it will be evident that when the combined rotating and sliding lever structure is rotated to the left as viewed in the above mentioned figures from the position S3 slightly beyond the position S0, the left projecting nose of the hook 155 will engage with the block 158 and will thereby be forced to the right from the position shown in Figure 9 to that shown in Figure 7, thus destroying the relationship between the control button 139 and the actuating lever 148 and permitting the power-operated portion of the control mechanism to complete the actuation of the apparatus wholly independently of the user.

At a point intermediate its length, the combined rotating and sliding lever 148 is furnished with the transversely extending recess 169 adapted to cooperate with the pin 170 projecting from the lever 171, pivoted upon the pin 172, the longer or left hand end of such lever, as viewed in Figure 7 or 8 being urged downwardly by the relatively powerful spring 173. In the slot 174 in one end of such lever 171 is mounted the pin 175 attached to the control plate 177 which by means of the collar 177' is attached for rotation to the control plate 178 in the other end of which plate is inserted the post 179 which operates the feeding control arms 180, 181, 183, and 258. To the first four mentioned of such arms are attached the coaxial upwardly extending sleeves 184, 185, 186 and 187 respectively, the rotation of which is effective to actuate the various feeding clutches. Such sleeves surround the control rod 188 which operates the rewinding and supply spindle clutch, such rod being operated by the control arm 258. Such sleeves and rod are journalled for rotation in the base of the machine and in the bearings 189 and 190 extending from the main frame.

As will be clearly seen from Figure 12, the the springs 192, 193, 194 and 195, attached suitably to control arms 180, 181, 182, and 183 respectively and to the post 196, are employed to hold such control arms in contact with the post 179, and the spring 262 performs the same function for control arm 258.

Reference to Figures 13, 14, 15, 16, 17, 18, and 2 will make clear the operation of the control arms and sleeves. Figures 14 to 18 inclusive are arranged in the order of operation of the respective parts, not of their physical arrangement.

The supply spindle clutch is controlled by the rod 188 and the control arm 258, as is shown in Figures 14 and 2.

At its free end, such control rod carries the previously described yoke and pins 33l and 33m cooperating with the grooves 33j and 33k. As the post 179 extending from the arm 178 is moved along the surface of the upwardly extending portion of the arm 258, it will enter the depression 258', thus permitting the rotation of the arm 258, in a counter clockwise direction as viewed in Figure 14, under the influence of the controlling spring 262 and thus moving the yoke to the right as viewed in Figure 5 and connecting the supply spindle 2 with the shaft 18 which drives the take-up spindle 3. As the post 179 moves further downwardly, out of the depression 258', it will again force the arm 258 and the yoke to inoperative position.

The supply sprocket clutch is controlled by arm 180 and sleeve 184, as shown in Figures 15 and 2.

Extending from the control sleeve 184 is the arm 201 which operates the link 202 which through the arm 203 is effective to rotate the rod 204 supported by the bearing 205. The forked arms 206, supporting in their outer extremities the fingers 207, extend from such rod 204, such fingers being positioned within the groove 97 of the feeding sprocket clutch collar. The rotation of the arm 178 in a clockwise direction as viewed in Figure 14 will force the post 179 into contact with the protuberance 209 of the arm 180, thus moving such arm to the dotted line position, and similarly rotating the control sleeve 184 and moving the control fingers 207 and the supply sprocket clutch collar 96 inwardly, as viewed in Figure 2, thus making such clutch operative. During further movement of the post 179, the arm 180 will remain in operative position. The contrary movement of the arm 178 will permit the arm 180 to return to inoperative position, after the post 179 has passed above the protuberance 209, as viewed in Figure 15.

The shutter or intermittent feeding clutch is controlled by the arm 181 and sleeve 185 as shown in Figures 16 and 5.

Extending from such sleeve 185 are the forked arms 211 from the ends of which project the clutch pins 212 which coact with the groove 63 of the collar 60. The rotation of the arm 178 in a clockwise direction as shown in Figure 16 will force the post 179 into contact with the protuberance 213 of the arm 181, thus moving such arm to the dotted line position, and similarly rotating the control sleeve 185 and moving the forked arms 211 and the pins 212 to the left as viewed in Figure 2, thus making the shutter or intermittent feeding clutch operative. Such further movement of the post 179 will cause the arm 181 to move back into the full line position of Figure 16, urged by the spring 193, thus declutching the intermittent shaft. As the post 179 is moved over the protuberance 214, it will again move the arm 181 to the right as viewed in Figure 16, thus again actuating the intermittent sprocket and shutter. The effect of the contrary movement of the arm 178 will be obvious.

The take-up sprocket clutch is controlled by the arm 183 and the sleeve 187, as shown in Figures 17 and 2.

To such sleeve 187, there may be attached the arm 215 from which the link 216 extends to the arm 217 attached to the shaft 218, suitably journalled in the bearing 219 and the bracket 220, and having attached thereto the arms 221 carrying the pins 222 which cooperate with the groove 105 in the driving portion of the take-up sprocket clutch. The rotation of the arm 178 will be without effect upon the control plate 183 until the post 179 engages the protuberance 223, thus forcing it into the dotted line position shown in Figure 17, rotating the sleeve 187 and forcing the pins 222 inwardly as viewed in Figure 2, thus actuating the take-up spindle clutch. Such further movement of the post 179 will cause the arm 183 to move back into the full line position of Figure 17, urged by the spring 195, thus declutching the take-up sprocket clutch. As the post 179 is moved over the protuberance 223', it will again move the arm 215 to the right as viewed in Figure 17 thus again actuating the take-up sprocket clutch. As the post 179 is moved in a contrary or upward direction, the control arm 183 will again occupy the full line position, thus rendering the take-up sprocket again inoperative.

The take-up spindle clutch is controlled by arm 182 and sleeve 186, as shown in Figures 18 and 2.

The forked arms 197 may extend from the sleeve 186 and carry pins 198 which engage the groove 25 of the take-up spindle clutch. The rotation of the arm 178 in a clockwise direction as viewed in Figure 18 will force the post 179 into contact with the protuberance 199 of the arm 182, thus moving such arm to the dotted line position, and similarly rotating the control sleeve 186, and moving the control fingers 198 inwardly as viewed in Figure 2, thus making the take-up spindle clutch operative. The effect of contrary movement of the arm 178 will be obvious.

Immediately prior to the normal projection of pictures in motion, it is necessary or desirable to move the shield or screen 87 from its normal light intercepting or protective position to a position out of the path of light. This is positively accomplished through the engagement of the right hand end of the lever 171, as viewed in Figures 7 to 10 inclusive, with the pin 224 extending from the bar 225 guided by the brackets 226 attached to the base B. The other end of such bar 225 is suitably attached to the arcuate rack 227 pivotally mounted upon the pin 228, the teeth of such rack engaging with the pinion 229 attached to the lower end of the shaft 88 which operates the heat screen. The spring 230 suitably attached to an extension of the bar 225 and the base will be effective normally to hold the heat screen in the closed position. It will be readily understood that the first portion of the movement of the combined pivoted sliding lever from the station S0 to the point opposite station S2 will be without effect upon the heat shield but that the heat shield will be moved to inoperative position during the travel from such point to station S1. Thus the heat shield is kept in cooperative relation with the film until the apparatus has been put into full operation.

In order definitely to time the travel of the control mechanism from station 0 to station 1 and hence to time the operation of the loop or slack creating mechanism, a dash pot is provided. Suitably connected to the arm 171, is the piston rod 231, the piston 232 working in the cylinder 233 which is pivotally attached to the base B. An adjustable port 234 is provided, whereby the escape of the air may be regulated at will. The usual escape openings 235 are provided in the opposite head of the cylinder.

Pivotally attached to the upward portion of the combined sliding and rotating lever 148 is the link 483 the other end of which by means of the pin 484 working in the elongated slot 485 is pivotally attached to the arm 486 pinned to the stem 487 of the snap switch 488, such switch controlling both the motor and light circuits of the apparatus.

To illustrate the actuation of the device to project motion pictures, it will be assumed that the user places the film upon the spindle 2 and moves the control button from station S3 to the intermediate station S0. (See Figure 13.) Such movement, as will be made fully apparent in a following portion of this specification, will have rotated the gate control rod 152 thereby having retracted the stripping shields 71, 115, and 116, moved the shoe 85 and the guiding rollers 123 and 131 toward the sprockets 50, 89 and 90, moved the guides 127 and 134 away from the sprockets 89 and 90, completely actuated the positioning fingers 301, partially closed the gate and moved the guiding elements 458 and 460 toward each other, forming a completely enclosed path or tunnel for the film, and similarly moved the guides 440 and 447 toward each other. The guide shoe 460 will be pressed against the film upon the supply reel 450, the light spring 463 bringing it into contact with the film irrespective of minor variations in diameter of the mass upon the reel and protecting the outer film from injury from the shoe. When the control button reaches station S0, as has previously been described, the mechanical control mechanism will become operative, and will move the sliding lever 148 from station S0 to station S1, necessarily at a uniform and predetermined speed, the actuating spring 173 being governed by the dash pot. Simultaneously therewith the control post 179 will move from the position in which it is shown in Figure 14 to that in which it is shown in Fig. ure 18. During its passage through the zone which is indicated as A in Figures 13 to 18 both inclusive, it will actuate the supply spindle, the supply sprocket, and the intermittent sprocket. Such actuation of the supply spindle will be effective to revolve the supply carrier in a feeding direction. Escape of the end of the film, except through the passage way framed by the guiding members 458 and 460 and 459 is prevented by the guiding ring 470, and the guiding shoe 460 is effective for picking up the free end of the film and guiding it into the passage way. What slight scratching effect, if any, is produced by the shoe is immaterial since the leader or forward end of the film is ordinarily not image bearing. Continued revolution of the supply carrier forces this free end of the film to the supply sprocket 90, with which it engages. Such sprocket feeds it on to the intermittent sprocket 50 with which it engages, such sprocket being operated for a relatively brief period merely to assure such engagement. At that moment, the post 179 becomes ineffective upon the supply spindle clutch and the intermittent sprocket clutch, since it passes beyond the above mentioned depression and protuberances, and the supply spindle and intermittent sprocket become motionless. The upper loop guide 127 will be withdrawn from guiding position, in the manner later described, and the gate is maintained partially open, with the positioning fingers in locking position. In zone B, in the manner previously described, such post 179 will continue to operate the supply sprocket only, which will thereupon draw a predetermined amount of film from the supply reel into a loop between such sprocket and the intermittent sprocket, and will thereafter actuate the intermittent sprocket whereby such sprocket propels the film to the take-up sprocket, and thereafter the take-up sprocket for an instant only whereby the film is engaged thereby. As the post 179 moves through zone C, the intermittent sprocket will be operated with the take-up sprocket motionless for a period approximately the same as that for which the supply sprocket was alone actuated in zone B and will draw down the loop of film which had been previously created between the intermittent sprocket and the supply sprocket. The continued operation of the supply sprocket, however, will replace such loop. This it will be evident that the two necessary loops of unsupported slack film will have been created, one adjacent the supply sprocket and one adjacent the take-up sprocket. During zone D, the post 179 will form contact with the protuberance governing the take-up sprocket, thus placing all sprockets in simultaneous operation, and shortly thereafter will form contact with the protuberance governing the take-up spindle. Thus the free end of the film will be fed to the carrier upon the take-up spindle, which will begin to revolve at approximately the time the film reaches such carrier.

As will be clearly seen from Figure 47 (Sheet 3), the movement of the sliding lever 148 will be effective to move the projection 482 thereon into contact with the pin 152' attached to the gate control rod 152 thus further rotating such rod. Such rotation commences in zone B and is first effective to move the arm 130'' whereby through the link 130 the upper loop guide 127 is moved to inoperative position and the final gate closing movement begins. Attached to the lower extension 127g of such guide is the roller 127h which, after the movement of the guide to inoperative position, bears lightly against the surface of the film affording sufficient resistance to its passage downwardly through the gate to insure the formation of the upper loop when the supply sprocket alone is actuated. The continued rotation of rod 152 in zone C is effective to complete the closing of the gate and to retract the lower loop guide 134 through the operation of the slotted link 137. When the gate is completely closed, the roller 127h rests within the surface of the movable section 46 and out of contact with the film.

Within zone D, the heat protective means will be withdrawn from shielding position.

As the film is fed forwardly by the simultaneous operation of all of the feeding sprockets it is forced through the passage way formed by the guiding elements 446 and 440 and around the hub 442 of the take-up carrier 443 upon the take-up spindle 3, the film being guided about the revolving hub by the circular guiding plates 441 and 447. The direction of the natural curl in the film is such as to be effective to make its leading end portion coil itself around the hub 442 as the film is advanced by the feeding sprockets. The continued powered operation of the driving spindle 3 and the carrier 443 thereupon will be effective to wrap the film about the hub 442 thus firmly attaching the end of the film thereto. After a predetermined number of revolutions of the spindle 3, the pinion 401 will have been effective to have completely revolved the relatively large gear 402 from the position shown in Figure 31 to that shown in Figure 33. The ratio of the pinion 401 to the gear 402 may be any which is found effective, it being preferred under some circumstances that such ratio be approximately 10 to 1 whereby the guiding elements are moved to inoperative position after ten revolutions of the hub 442. As the cam plate 404' is moved slightly beyond the position shown in Figure 31, the trigger 405 will be moved sharply downwardly by the spring 407 thus moving the latch 415 downwardly and permitting the detent 423 to be freed thereby and the operating plate 404 to move from the position shown in Figure 31 to that shown in Figure 33, such movement being effective for separating the guiding elements 447 and 441, and 446 and 440, and 458, 459 and 460, and also moving the gear 402 away from and out of connection with the pinion 401. It will thus be seen that the various guiding elements are moved to inoperative position without placing the slightest strain upon the film, and that they are so moved in definitely timed relation to the beginning of the operation of the take-up spindle, which in turn is actuated in a definitely timed relation to the actuation of the other feeding member and the closing of the gate.

Prior to the movement of the lever 148 downwardly from station S0, the sleeve 147 and the manual control button carried thereby, as has been previously described, are held by the engagement of the bottom of the sleeve 147 with the top of the pawl 161. As the lever 148 completes its downward movement to station S1, the pawl 161 will be forced to the left by engagement between the extension 240 thereupon and the side of the lever 148. At this point, such parts will be in the position shown in Figure 7. Thereupon the spring 165 will move the control sleeve 147 and the control button 139 downwardly. The hook 155 will pass first to the left of the pin 154 and thereafter, urged by the spring 241, will move to the right and engage therewith thus re-establishing the connection between the manually operable control button 139 and the control mechanism.

In the purpose of further illustration, it will be assumed that the user wishes to examine one picture at leisure. He will manually move the control button back toward station S0 and then slightly toward the right into the station S2, as is shown in Figure 46 (Sheet 3). At such point, the post 179 will be upon the line S2 in Figures 14 to 18 inclusive, all clutches then being inoperative and the heat shield being in light intercepting position.

To show additional still pictures, as is clearly shown in Figures 2, 4 and 4d, the user may move the knob 244 downwardly, thus depressing the rod 245 held by the bracket 246 against the compression of the spring 247 thus placing the gear 248a in contact with the gear 248b and the gear 248c in contact with the gear 248d. To such gear 248b is attached the shaft 248e, suitably supported from the rear of the frame F. To such shaft is pinned the gear 248f, which engages with a suitable gear 248g attached to the supply sprocket shaft 91, and the gear 248h which engages with the gear 248i attached to the upward end of the shaft 248j supported by the bearing 248k attached to the rear of the main frame. To the lower end of such shaft is attached the mitre gear 248m which meshes with a suitable gear 248n pinned to the take-up sprocket shaft 100. The gear 248d is pinned to the rear of the intermittent or shutter shaft 56. Thus he is able to rotate all feeding sprockets and the shutter. In returning to the operation of pictures in motion, it is impossible for him to move the control button from station S2 to station S1 without proceeding to the intermediate position station S0.

In moving from station S1 to station S2, the switch 488 will remain on, so that light is supplied for the still picture, but during the latter portion of the movement to station S0, the switch will snap off, thus rendering motor and light circuit inoperative.

It may be assumed that after the projection of a single image from the film or the repetitious projection thereof, or after the projection of pictures in motion, it is desired to change the film. Under such circumstances the control button will be manually moved from station S2 or station S1 to station S0. Such movement will be effective for rendering inoperative the various feeding clutches and for breaking the light and motor circuits. As is clearly shown in Figure 47, it will also be effective for bringing the extension 493 upon the sliding lever 148 into contact with the lower end of the pin 152' thereby locking such pin into contact with the collar 149' and, by further upward movement, rotating the rod 152 and thereby accomplishing the first gate opening movement. As is clearly shown in Figure 7a, such extension 493 terminates downwardly and to the left as viewed in such figure in an offset portion 494 which is effective for engaging with the pin 152' after such pin, by the downward movement of member 493, has been moved completely beyond the edge of the levers 148 and 149.

Movement of the control mechanism from station S1 to station S0 will be effective for again placing the spring 173 under tension and resetting the dash-pot. Such movement also will be effective for moving the combined swinging and sliding lever structure against the shouldered side of the detent 251, which is pivoted on the stud 252 under the influence of the spring 253, so that its projecting shoulder 254 will engage with the tooth 255 of the lever 177 before the pin and the slot have been removed from cooperative relation, thus holding locked in inoperative position all the clutch control means, dash-pot and spring and consequently the loop or slack creating mechanism. As the control button 139 is further rotated to the right as viewed in Figure 9, the pin 170 and the recess 169 will be completely removed from cooperative relation and the gate control rod 152 will be further rotated in a counter-clockwise direction.

Such rotation of the gate control rod is effective for opening the gate, for moving the film rollers and guides 123, 127, 131 and 134 and their associated parts to film threading position, and for so actuating the stripping shields 71, 115, and 116 as to effect the desired bodily removal of the film from the sprockets 50, 89 and 90 and the shielding of such sprockets so as to facilitate the threading of a new film into position or to permit the re-winding of a film. Such movement is also effective to move the positioning fingers 301 to inoperative position.

Adjacent its upper portion there is secured to the gate control rod 152 an arm 252' to which is attached a link 253' attached to the arm 125 previously described (Figure 2a). Movement of the control button from station S0 to station S3 will be effective for rotating the gate control rod in a counter clockwise direction as viewed in Figure 9 and moving the link 253' to the right as viewed in Figure 2 thus, as will be apparent by reference to Figure 50 (Sheet 11), moving the pin 127b over the center of the slot 127c in the upper right angled extension 127d of the spring 127a attached to the main frame F, and quickly raising the film retaining or idler rollers 123 and 127 to relatively distant relation to the sprockets 89 and 90 respectively. Such upward movement of the control plate 132' upon the pivot 133 will be effective to move the trigger 415 to the left as viewed in Figure 33 and its tooth 422 into engagement with the detent 423 affixed to the upwardly extending arm 425.

Such rotation of the gate control rod 152 in a counter-clockwise direction as viewed in Figure 9 will also be effective to move the arm 254' attached thereto to the left as viewed in Figure 1, thus through the medium of the pin 255' attached to the gate control rod 48 moving such rod to the left as so viewed, thus separating the gate sections, moving the positioning fingers to inoperative position, and actuating the stripping shields (Figures 4a and 6a). The accelerated motion provided by the spring 127a is effective for preventing interference between the idlers and the stripping shields. Such rotation of the rod 152 will also be effective, through the arm 130" attached thereto, the pin working in the elongated slot 130' therein, and the link 130 (Figure 1c) to move the upper loop idler to guiding position adjacent the supply sprocket 89. The lower loop guide 134 cooperating with the take-up sprocket 90 is directly operated by the movable section 46 of the gate.

If it is not desired to change a film, the control button may be moved from station S3 to station S4, or may be moved from station S1 or S2 to station S4 without stopping at an intermediate station. This movement will be effective for actuating the switch 488 and bringing the pin 256 attached to the plate 257 attached to the sliding and rotating lever 148 into engagement with the lever 258 and moving it from the position shown in Figure 9 to that shown in Figure 10, thus rotating the re-winding spindle control rod 188. The distance from station S3 to station S4 may be such that the actuating block 482 upon the sliding lever 148 does not come into operative contact with the pin 152'. Thus the rod 152 and the various parts controlled thereby remain motionless. At its free end, this control rod 188 carries the previously described yoke. The rotation of the control rod 188 as occasioned by the movement of the control button from station S3 to station S4 will be such as to move the teeth 33i into contact with the teeth 33h, thus connecting the spindle 2 in driven engagement with the shaft 31, this engagement being such that the film may be rewound by the continued operation of the motor M. Such rewinding operation will be facilitated by the attachment of the inner or "trailer" end of the film to the core of the supply carrier, or the button may be moved to station S4 before all of the film has been fed through the apparatus. It will be readily understood that any undue strain upon the film during or at the conclusion of the rewinding cycle is obviated not only by the slippage between the driving pulley 37 and the collar 31', but also by slippage between the belt and its pulleys 37 and 38 previously described.

From the foregoing, it will be apparent that the operation of a single control button performs in succession those necessary changes in the operating positions of the various parts for permitting any desired condition of operation of the apparatus. Upon movement of the control button from station S4 to station S3, the rewinding clutch will be disengaged and the lever 258 moved into inoperative position against the pin 263 by the action of the spring 262, and the switch 488 turned off.

With the control button 139 at station S3, it will be understood that the gate is completely open, the positioning and locking fingers 301 in inoperative position, the guiding elements 127 and 134 relatively close to the film path, the film retaining rollers 123 and 131 completely withdrawn from the sprockets 89 and 90 respectively, and the guiding elements associated with the supply and take-up spindles in open position. The user thereupon places the reel 450 upon the spindle 2. It is not necessary that the end of the film be placed in any particular relation to the guiding elements. The user thereupon moves the control button 139 from station S3 to station S0. These two acts are the only ones which are necessary to place the apparatus in complete operation. Such movement of the button toward station S0 is effective for rotating the gate operating rod 152 through the pin 152' attached thereto, thus partially closing the gate, rotating the stripping shields into inoperative position, bringing the film retaining elements 123 and 131 into relatively close relation with the appropriate sprockets, and operating the positioning and locking fingers 301. Such movement of the control button toward station S0 is likewise effective to move the combined swinging and guiding structure into engagement with the detent 251 and to swing it in a clockwise direction against the action of its controlling spring 253 thereby to release the tooth 255 of the lever 171 from the holding action of the detent, and permitting the lever 171 and its associated parts to be subsequently operated by the spring 173 whereby the necessary loops will be formed, the switch turned on, gate closing completed, the necessary guides actuated, and the apparatus placed in full operation.

It will be readily understood that, if desired, the motive means provided for the control mechanism may be the electrical means described in the co-pending applications of the said Foster. The actuation of the control mechanism for the purpose of rewinding the film or of controlling the gate and its associated parts may be accomplished in accordance with the automatic means set forth in said parent application Serial Number 57,392, filed September 19, 1925, now Patent Number 1,943,303, as is shown in Figure 52 of the drawings. In this figure, which corresponds to Figure 7 of this application, in the interests of simplicity the same reference characters as are used in the said patent and in Figure 7 hereof are applied in Figure 52, those of the patent having a double prime character added and those of Figure 7 hereof having a single prime character added. Instead of moving the control structure between the various positions between S4 and S0 by hand and between S1 and S0, S1 and S2, and S2 and S0 by hand, the automatic film controlled electrical apparatus of the said patent is shown. As set forth in the said patent, the control disc 160" may be rotated through the pin 161" and the pinion 162" by the rack bar 163', the pin 154" (corresponding to the pin 109 of the patent) connects the entire control structure with the driving means therefor. The solenoids 168", 169" and 218" impart the desired motion to the control disc 160" exactly as does the manually operable control knob 139 previously described herein and the spring 173. When it is desired to make use of the electrically controlled mechanism, this knob may be latched in an inoperative position in any desired way, such, for example, as the one shown in the said patent. The circuits of the said solenoids are operated by the film exactly in accordance with the said co-pending application, now Patent Number 1,943,033.

Carried by the frame F and positioned in line between the filament of the light source L and the aperture 44 of the gate is a condensing lens 264' carried by the lens casing 264. This condensing lens as is usual in the art concentrates the light upon the aperture. Forward of the gate the objective lens O may be positioned as previously described, for example, within the holder 282.

The combined lighting resistance and ventilating unit may be contained within the housing H. Within this housing may be mounted in any desired manner a lamp L and a reflector, not shown. If desired, a variable resistance or rheostat may be provided for the motor circuit, in order to operate the apparatus at varying speeds.

A fan V may be attached to the rearward end of the armature shaft of the motor. It will be understood that such fan will be in operation concurrently with the operation of the light source.

Preferably the motor is of a constant speed type or any desired form of voltage regulator may be placed in circuit with the motor, to prevent current fluctuations and consequent variations in speed.

Under certain conditions, it may be desirable initially to position the film according to a modified form of our invention. By actuating the feeding members, certain of the guiding members, the gate, and the shielding members in modified sequences from that described above—such first described sequence being designated for convenience as form "A"—automatic operation of the apparatus can be accomplished in a manner which for certain purposes has many advantages.

Such sequences when arranged according to the form of our invention known for convenience as form "B" are made clear by the diagram of Figure 19 and by Figures 20 to 24 inclusive.

In apparatus constructed according to such modification "B", the user places the full reel of film upon the supply spindle, and moves the control button from station S3 to station 0. Substantially simultaneously with the first gate closing movement, the spindle guides are made operative, and the shielding members retracted from the supply sprocket and the take-up sprocket only. Thereupon the film retaining members or idlers are brought into relation with such sprockets. In zone A, the mechanism actuates the supply spindle whereby the end of the film is propelled therefrom to the supply sprocket; the supply sprocket whereby the film is engaged thereby and propelled therefrom past the intermittent sprocket, which remains completely shielded from the film, to the take-up sprocket; the take-up sprocket whereby the film is engaged thereby and delivered to the take-up spindle; and the take-up spindle whereby the film is wrapped thereabout. At this point, with all feeding members inoperative, the gate closing is completed, the shielding member withdrawn from in intermittent sprocket, and the loop guides retracted. In zone B, the mechanism momentarily operates the take-up sprocket whereby the film is pulled slightly in the feeding direction so that the teeth of the intermittent sprocket engage with the appropriate perforations. After such engagement the film is completely positioned in relation to the three toothed feeding members. Thereupon the supply sprocket is operated alone whereby a loop of slack is produced in the film between such sprocket and the intermittent sprocket. In zone C, the supply sprocket continues to operate and the intermittent sprocket is also actuated whereby the loop previously produced is maintained and an additional loop is produced between the intermittent sprocket and the take-up sprocket. In zone D, the take-up sprocket and the take-up spindle are also actuated the supply sprocket and intermittent sprocket maintained in operation, and the movement of the spindle guides to inoperative position is begun. The withdrawal of the spindle guides is gradual, as the mass of film builds up upon the take-up carrier.

It is obvious also that if desired the retraction of the spindle guides may be begun after the first positioning movement of the film, but under many conditions it is preferable not to withdraw such guides until after a further operation of all of the feeding elements in order to minimize the time required for placing a picture upon the screen.

For purposes of simplicity and clarity, in the following description we designate parts which are the same or similar to those previously described by the reference characters which were originally applied to such parts followed by the letter B.

Mechanism for sequentially operating the stripping and shielding members is to a large extent shown in Figure 36.

Cooperating with the intermittent sprocket 50B is the stripping and shielding member 71B mounted as previously described upon the shaft 53B. Attached to such shield is a relatively small pinion 73B which meshes with the mutilated arcuate rack 74B which is attached to and moves with the mutilated arcuate rack 74'B, both of such racks being operated by the arm 79B pivoted upon the post 75B. The elongated slot 78B of such arm cooperates with the pin 77B attached to the gate opening rod 48B. Such arcuate rack 74'B engages with the gear 73'B which is loosely mounted upon the shaft 53B. To the gear 73'B is attached the gear 119B which is adapted to operate the rack bars 117B and 121B which in the manner previously described through the gears 116'B and 120B operate the shields 115B and 116B cooperating respectively with the sprocket 89B and 90B. By reason of this construction, it will be evident that the initial rightward movement of the gate opening rod 48B, as viewed in Figure 36 or 39, will be effective through the mutilated arcuate rack 74'B for rotating the gear 73'B and moving the shields 115B and 116B immediately to the inoperative position as shown in full line in Figure 36. Such initial movement, however, will be without effect upon the small pinion 73B since the teeth of the mutilated rack 74'B will not engage therewith until after such rack has been rotated approximately one-half the distance from the position shown in dotted line in Figure 36 to the position shown in full line. The final closing or rightward movement of the rod 48B will bring the teeth of the mutilated rack 74B in engagement with the teeth of the gear 73B and will quickly rotate such gear and consequently move the shield 71B from the position shown in dotted line in Figure 36 to that shown in full line.

Figure 39:
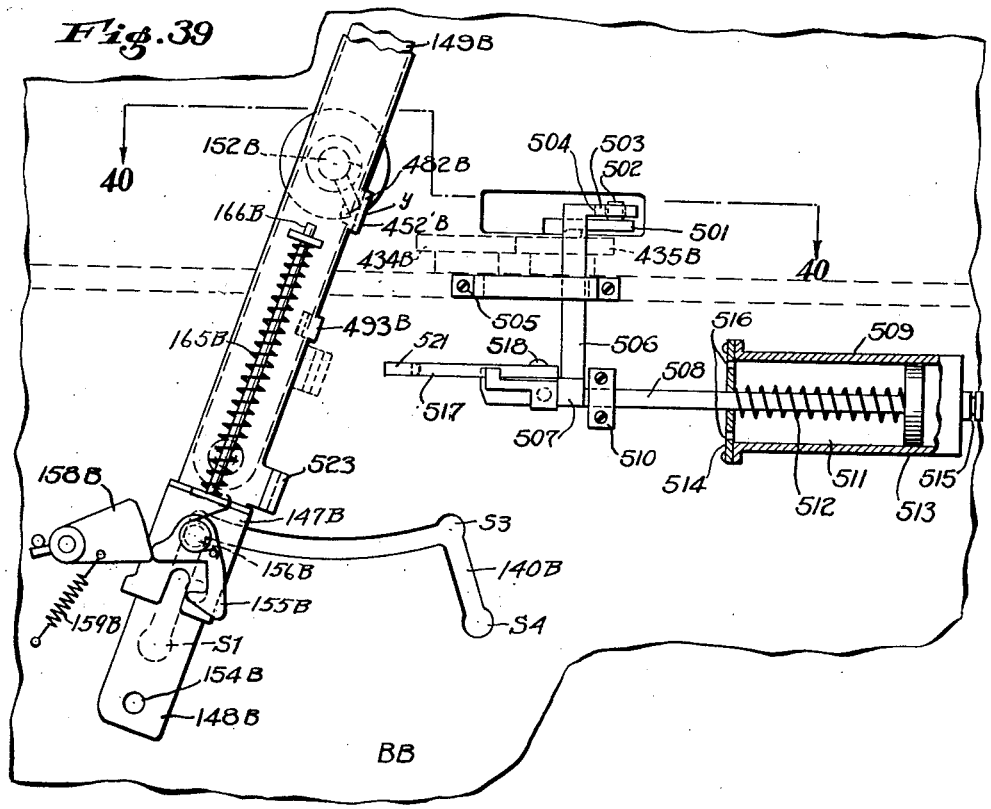
Figure 39 is an enlarged detail view of the operating mechanism for the guiding mechanism associated with the spindles constructed according to form "B" of the invention and also of the means for actuating such mechanism.
Figure 40:
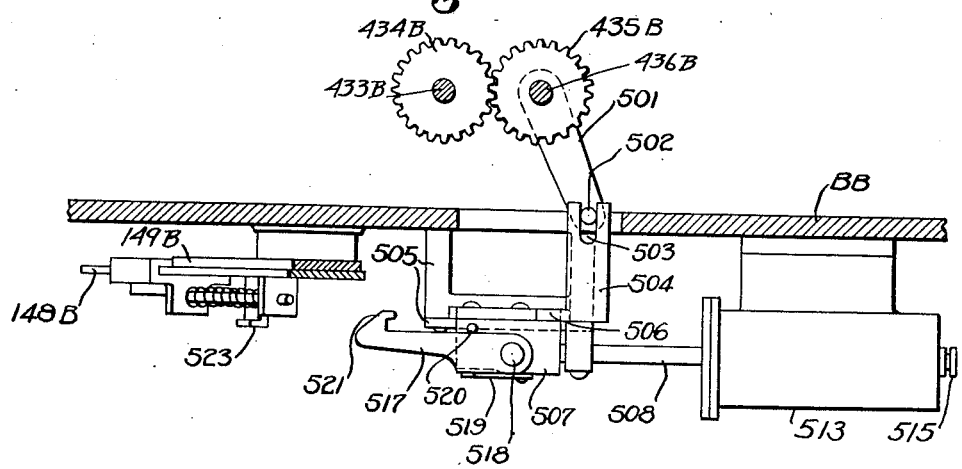
Figure 40 is a view taken on the line 40—40 of Figure 39 looking in the direction of the arrows.
Figure 55:
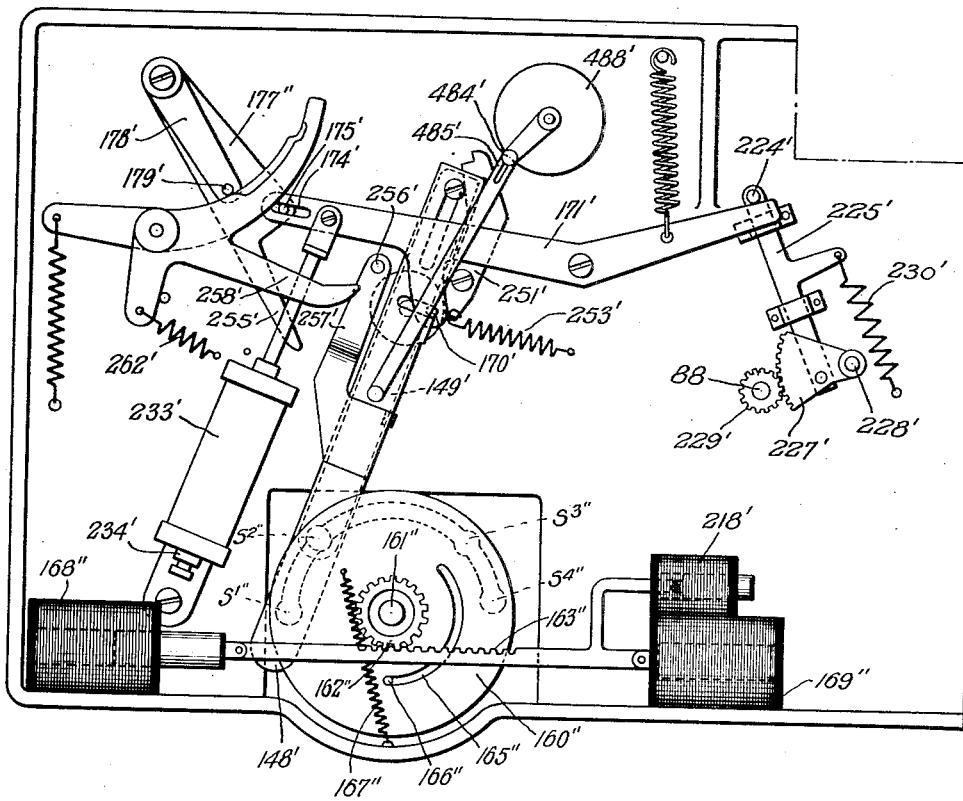

The mechanism for actuating the spindle guides, according to modification "B", is shown in Figures 36, 39 and 40. In certain cases, the character "B" has been added to previously described parts which are employed in apparatus built according to this modification, such parts being formed as previously described.

The gear 434B is fixed to the shaft 433B, which is supported by the main frame, and to such shaft is attached the arm 445B which carries the guiding element 446B which terminates in the curved plate 447B. Meshing with the gear 434B is the gear 435B which is fixed to the shaft 436B, which is supported by the main frame, and to such shaft is attached the arm 437B which carries the guiding plate 440B which terminates in the curved plate 441B. Likewise fixed to the shaft 433B is the arm 430B which through the link 451B, the arm 452B and the gear 453B and 455B operates the guiding members, including the members 458B and 459B, previously described, which cooperate with the supply spindle and the supply sprocket.

To operate such mechanism, an arm 501 is pinned to the gear 435B and by means of the pin 502 working in the slot 503 of the arm 504, supported by the bracket 505, is connected to the arm 506 which is attached to the plate 507 attached to the head of the plunger arm 508 of the dash-pot 509 conveniently positioned under the base BB. Such plunger arm is carried in the bearing 510. Within the cylinder 511 of such dash-pot and about the plunger arm is positioned a relatively heavy compression spring 512 one end of which bears against the head 513 of the plunger and the other end of which bears against the inward end of the wall 514 of the cylinder. The escape of the air from the dash-pot is regulated by the adjustable vent 515, and the usual exhaust openings 516 are provided. The latch 517 is attached to the plate 507 by the pin 518 and urged upwardly by the spring 519 against the pin 520. The forward end of the latch terminates in a head 521. To set and control the above described mechanism, an angular plate 523 is attached to the combined sliding and rotating lever 149B.

By reason of such construction, it will be evident that when the combined rotating and sliding lever structure is moved from station S0 to station S3 the angular plate 523 will be brought into operative relation with the hook 521 of the latch 517. As such combined sliding and rotating lever structure is moved from station S3 to station S0, the spring within the dash-pot will be placed under tension and the spindle guiding members will be moved into operative position. As is clearly shown in Figure 39, the nose piece of the latch 155B and the pawl 158B are so constructed that the relation between the control button carried by the pin 156B and the control mechanism is not destroyed until the user has moved the button downwardly to a distance approximately equal to the diameter of the pin 156B thus preventing interference by the spring 512 with the action of the actuating spring 173. As the sliding lever 149B is moved downwardly under the influence of the spring 173, the operative connection between the angular plate 523 and the latch 517 will be destroyed, the plate moving from the position shown in dotted line in Figure 39 to that shown in full line, thereby permitting the spring 512 to operate the plunger 508 until it assumes the position shown in Figure 39 and gradually moves the spindle guiding elements to inoperative position.

Under many conditions, it is preferable to provide a relatively small vent 515 whereby the dash-pot permits only a slow movement toward inoperative position of the spindle guiding elements, this movement taking place substantially in direct relation to the building up of the mass of film upon the take-up reel and the change in the angular position between the film and the supply spindle. This relatively slow removal of the spindle guides is an added safeguard, since the guides are retained in guiding relation until all possibility of slippage between the film and the take-up spindle has been passed.

The construction of the control mechanism for the feeding members will be apparent from the foregoing portion of this specification, and by reference to the diagram comprising Figure 19, and Figures 20 to 24 both inclusive.

As the post 179B, following the rotation of the arm 178B, moves into the depression 258'B, the spring 262 will move the arm 258B to the left as viewed in Figure 20 and will operate the supply spindle clutch in a feeding direction until the post has moved beyond such depression.

The movement of the post 179B over the protuberance 209B will move the arm 180B downwardly as viewed in Figure 21 and so operate the supply sprocket clutch, such operation being interrupted as such post moves opposite the depression between 209B and 209'B and being resumed when it moves over such protuberance 209'B.

The movement of the post 179B will have no effect upon the intermittent sprocket clutch, shown in Figure 22, until it passes over the protuberance 214B, from which point onwardly such clutch will be operative.

As shown in Figure 23, the take-up sprocket clutch will be operative as post 179B moves over the protuberances 223B and 223'B in the arm 183B and inoperative therebetween and again operative as it moves upon protuberance 223"B.

As shown in Figure 24, the takeup spindle clutch will be operative as the post 179B moves over the protuberance 199B of the arm 182B and upon the protuberance 199'B and the clutch will be inoperative when the post is between these protuberances.

Contrary or counter clockwise movement of the arm 178B will have an obvious effect.

The extensions 482B and 493B are so placed upon the lever 149B as to rotate the rod 152B so as to complete the gate closing movement in the beginning of zone B, as described above.

Many of the advantages of this preferred modification of our invention are evident from the foregoing portion of this specification. Among other advantages is the provision of definite independent timing means for the removal of the spindle guides, such timing means being operated in direct relation to the building up of the mass of the film upon the take-up reel, and actuated in definite timed relation to the actuation of the other guiding members, feeding members, and the gate. Other advantages arise from the provision of separate motive means for the operating mechanism for the spindle guides. By those skilled in the art, it will also be recognized that the above method of initially positioning the film is particularly valuable when an intermittent feeding member of the intermittent grip type is used, since both the feeding member and the film are motionless when the shielding member is withdrawn and since the take-up sprocket is momentarily operated to complete such initial positioning by a pulling movement.

Under certain other conditions, it may be desirable initially to position the film according to a second modification of our invention— designated for convenience as form "C".

The diagram designated as Figure 25 will make clear the operation of apparatus constructed according to such modification.

The user places the full reel of film upon the supply spindle and moves the control button from station S3 to station S0. The first gate closing movement has no effect upon any member other than the movable section of the gate and the shoe carried thereby. In zone A, the mechanism operates the supply spindle whereby the film is propelled therefrom to the take-up spindle, all intervening feeding members being shielded and all guiding members being in guiding position, and operates the take-up spindle whereby the film is wound upon the carrier positioned thereupon. In zone B, the operation of both spindles is stopped. The shielding members are then removed, the film retaining members made operative, the loop guides retracted, the spindle guides moved to inoperative position, and the gate closing completed. Thereupon, the take-up spindle, take-up sprocket and intermittent member are each successively operated for a very brief period whereby the film is successively moved into full operative relation with each such member. Thereupon the supply sprocket is alone actuated whereby the upper loop is formed. In zone C, the supply sprocket is maintained in operation and the intermittent member operated also whereby the upper loop is maintained and the lower loop produced. In zone D, all members are operated whereby the film is subjected to a normal feeding movement.

In the following description, we designate parts which are the same or similar to those previously described by the reference characters previously applied thereto followed by the letter C.

Figures 41 and 43 show the construction which may be employed to actuate the stripping shields in the timed relation made desirable by modification "C".

As previously described in connection with form "A" of our invention, the stripping shields 115C and 116C associated with the continuous sprockets 89C and 90C may be operated through the gears 116'C and 120C, the rack bars 117C and 121C, and the gear 73C which likewise operates the shield 71C associated with the intermittent sprocket 50C. Cooperating with the gear 73C is the mutilated arcuate rack 74C pivoted upon the stud 75C and through its upward extension 79C operated by the gate control rod 48C, the pin 77C affixed thereto working in the slot 78C of such extension 79C. During the first portion of the gate closing movement, the flat portion of the rack 74C slides over the face of the teeth of the gear 73C, holding the shields locked in shielding position. During the final gate closing movement, the teeth of the rack engage with those of the gear, and quickly rotate all the shields to inoperative position.

According to the method of operation which has been described above and, under certain other circumstances, it is desirable to operate the upper and lower loop guides 127C and 134C by means of the movable section of the gate, and to provide a period of dwell whereby the first portion of the gate closing movement is without effect upon such guides and the later portion of such gate closing movement is effective to move such guides from the guiding position.

As is clearly shown in Figure 44 (Sheet 14), a plate 530 may be attached to the upper portion of the movable gate section 46C, such plate including the L shaped slot 531 in which works the pin 532 attached to the arm 129C which operates the upper loop guide 127C. It will be evident that the movement of the gate control rod 48C and the gate section 46C will be without effect upon the pin 532 until such pin reaches the termination of the longer portion of the L shaped slot 531. Further movement of the plate 530 to the right as viewed in Figure 44 will be effective quickly to rotate the shield 127C from the position shown in full line to that shown in dotted line.

To an extension 533 attached to the movable gate section 46C, there may be pivotally attached the link 137C, as shown also in Figure 1. The operation of such guide 134C through the arm 136C and the link 137C obviously will be similar to that previously described for the guide 127C.

In order properly to time the movement of the film retaining idlers to operative position, delayed actuation with rapid operation is desirable. Such movement may readily be secured by making use of the construction shown in Figure 41 in which the slot 127cC in the right angled portion of the spring 127dC is so shaped as to operate the arm 125C after a further movement of the rod 152 than that previously described.

When use is made of the modified method "C" of initially positioning the film, and under certain other circumstances, it may be desirable to operate the spindle guides directly by the mechanism which operates the gate and the other guiding elements, such mechanism being manually actuated but mechanically operated and timed.

As is clearly shown in Figure 41, the gears 434C and 435C are mounted upon the shafts 433C and 436C affixed to the main frame and meshing with each other. As previously described, to the shaft 436C is fixed the arm 437C which carries the guiding element 440C terminating in the curved plate 441C. The shaft 433C carries the arm 445C which supports the guiding element 446C terminating in a plate (not shown) which may be constructed substantially like the plate 447B. Attached to and extending from the shaft 436C in the arm 540 which through the link 541 is attached to the plate 542. Such plate is attached to a collar 543 which is freely mounted upon the gate control rod 152C. Such collar is constructed with slots 544 which engage with the pin 545 in the control rod 152C and with the groove 546 with which engage forked arms cut in the upper end of the right angled plate 547, which plate is supported in the bracket 548 and normally urged downwardly by the spring 549'. Likewise mounted upon such bracket is the manual control button 549 to which is attached the pin 550 which works within an opening in the plate 547. By reason of such construction, it will be evident that when the button 549 is rotated in an anti-clockwise direction as viewed in Figure 41 it will be effective for moving the collar 543 and the plate 542 upwardly out of operative engagement with the pin 545 and hence the gate control rod 152C thus permitting the manual operation of the spindle guides. Such manual operation can be accomplished by the use of the control button 552 attached to the gear 434C. In order to hold the guides against accidental movement, the arm 445C may be formed with a detent slot 553 with which cooperates a pin 554 pressed upwardly by the spring 555 in the cylinder 556 supported upon the bracket 557 attached to the main frame FC.

It will be evident that when the gate control rod 152C is rotated so that the slot 543 and the pin 544 coincide, the automatically operative control mechanism will again become effective. If desired, a detent may be applied to button 549 whereby the link 541 may be maintained out of possible contact with the pin 545 until the operator moves such button in a clockwise direction.

Such manually operative mechanism will be useful in case the operator wishes to re-wind and then re-project a portion only of the film and under other circumstances.

The construction of the control mechanism for the feeding members will be apparent from the foregoing portion of this specification, and by reference to the diagram comprising Figure 25, and Figures 26 to 30 both inclusive.

As the post 179C, following the rotation of the arm 178C, moves into the depression 258'C, the spring 262 will move the arm 258C to the left, as viewed in Figure 26, and will operate the supply spindle clutch in a feeding direction until the post has moved beyond such depression.

As shown in Figure 27, the movement of the post 179C will be ineffective upon the arm 180C until it reaches the protuberance 209'C, at which point it will operate the supply sprocket clutch, such operation being continued indefinitely.

As shown in Figure 28, the movement of the post 179C will depress the arm 181C momentarily as it passes over the protuberance 214'C and so momentarily operate the intermittent sprocket clutch and will again depress such arm and operate such clutch as it passes over and beyond the proturberance 214C.

As shown in Figure 29, the movement of the post 179C will depress the arm 183C momentarily as it passes over the protuberance 223'C and so momentarily operate the take-up sprocket clutch and will again depress such arm, and operate such clutch indefinitely, as it passes over and beyond the protuberance 223''C.

As shown in Figure 30, the movement of the post 179C will depress the arm 182C as it passes over the protuberances 199C, 199'C, and 199''C, and so render the take-up spindle clutch operative, such clutch being rendered inoperative as the arm passes between such protuberances.

Contrary or counter clockwise movement of the arm 178C and the post 179C will have an obvious effect.

Certain of the advantages of the above described form of our invention have been stated above. Those skilled in the art will realize that other advantages arise from the provision of a method for initially positioning the film which, while entirely automatic, does not depend upon propelling the film into engagement with a toothed member. When engagement is attempted by means which include the pushing of the free end of the film against a toothed member, difficulties arise, particularly if the film is at all worn or the end is not cut carefully at right angles to the edge. No such difficulties occur, however, when the film is propelled through a smooth, clear, fully enclosed track to a winding member, wound thereupon, and thereafter, by the operation of such member in a feeding direction, positioned in operative contact with the teeth of an intervening toothed member, such member then being maintained stationary. Such method of initial positioning is certain in operation and does not damage the film. The above described form of our invention also makes possible the use of a simplified, relatively inexpensive, and automatically operable apparatus.

For use with the above form of our invention, or with other forms thereof, or otherwise, we are describing an improved form of lateral positioning and locking member.

Under certain conditions, when the film is initially positioned by the method of propelling its free end through a partially open gate, it may be desirable to substitute for the positioning and locking fingers described above, a single solid plate. The use of such plate prevents the possibility of the free end or a ragged edge of the film catching upon one of the locking fingers.

As is clearly shown in Figure 45, we mount such plate 301C upon the shaft 303C for rotation therewith. Such shaft is mounted as previously described in the fixed gate section 42C. The guide member 80C is formed with a recess into which such plate, when in the inoperative position, fits snugly. To the shaft 303C is affixed the arm 304C which by means of the link 306C is operated by the link 307C which is pivoted upon the pin 308C suported by the bracket 309C. Such link 307C is actuated by the pin 77C in the shaft 48C which works in an elongated slot in the arcuate upturned extension 310C and is operated by the spring 313C which extends from the outer end of such link to the main frame FC.

By reason of such construction, it will be evident that the movement of the gate control rod 48C to the right as viewed in Figure 45 will be effective quickly to move the link 307C past its center whereat the spring 313C will snap the link and through it and its associated parts the plate 301C into positioning and locking position. Thus, until the conclusion of the period of dwell previously described, the gate will form a completely enclosed channel or tube through which the film may be propelled. At any time, through the movement of the button 139, the feeding members may be stopped, the gate opened, and the positioning and locking plate retracted and the film removed by a manual movement lateral to the path of the film through the gate. Similarly, the film may be inserted in the gate, the guide 83C cooperating with the guide 80C, and the positioning plate 301C serving to sweep the film into the gate and into proper relation with the feeding members.

Under certain conditions, it may be desirable to employ a slightly modified gate structure. The movable section 46 may extend less far upwardly, terminating below the guiding roller or idler 127h, which is attached to the upper loop guide 127, the right angled portion of the extension 127g of such guide which carries the roller being lengthened so that when the gate is closed such roller guides the film below the upper loop.

If desired, such roller 127h may be omitted, and the upper and lower loop guides operated sequentially. As is clearly shown in Figures 49, 49a, and 49b, the lower loop guide 134 may be mounted upon the pin 135 to which is attached the arm 136, as previously described, such arm, however, being directly operated by the gate control shaft 152 through the link 565, an end of which works in the elongated slot 566 of the arm 567 attached to such shaft 152, as is shown in Figure 49b.

The rods 48 and 130 are attached to the control shaft 152 by control saddles which permit further operation of such shaft 152 after the rods 48 and 130 have been fully operated.

To the right hand end of the gate rod 48, as viewed in Figure 49, there is fixed the pin 568 through an opening in which passes the rod 569 on which are mounted the springs 570 and 571, such rod being supported by the right angled lips 572 and 573 turned in the control plate 574, such lips also serving to confine such springs. The plate 574 is pinned to the shaft 152.

Similar mechanism is provided for the rod 130. The right hand end of such rod, as viewed in Figure 49, is turned at right angles, and through an opening therein, the rod 575 is passed, upon which are mounted the springs 576 and 577, such rod being supported by the right angled lips 578 and 579 turned in the control plate 580, such lips also serving to confine such springs.

By reason of such construction, it will be evident that the rotation of the rod 152 will first move the rods 48 and 130 whereby the gate is completely closed and the upper loop guide retracted and that such continued rotation will retract the lower loop guide but merely compress the springs in the control saddles which operate the rods 48 and 130.

Certain of the advantages of our invention have been stated in the above portion of this specification. Other advantages include the provision of methods and means whereby a film or other material may be automatically positioned and handled with no requirement whatever of skill or experience on the part of the operator and with no danger of injury to the material.

We claim:

1. In a film handling apparatus, a supply spindle, a first continuously operable feeding member, an intermittently operable feeding member, a second continuously operable feeding member, a take-up spindle, a source of power for both of said spindles and all of said members, and sequential control mechanism operatively interconnecting said spindles and all of said members and including devices effective to apply said power first to said spindles concurrently and second to each of said members successively.

2. In a film handling apparatus, an operable supply spindle, an apertured gate, a feeding member, disposed between said spindle and said gate, film guiding surfaces disposed between the aperture of said gate and said spindle adapted to engage film fed thereto by said spindle and to feed it in relation to the aperture of said gate, a source of power, means for operatively connecting said source of power and said spindle for the purpose of operating said spindle to propel the free end of a film supported thereupon therefrom to said member, separate means for operatively connecting said source of power and said member for the purpose of operating said member to draw film from the mass thereof supported by said spindle, and sequential interlocked mechanism for actuating each of said means in predetermined relation one to the other.

3. In a film handling apparatus, a supply spindle, a feeding member, an apertured gate, a first mechanism for driving said spindle in a feeding direction for the purpose of propelling the free end of a film supported thereupon to said feeding member, guiding surfaces for directing the film from said spindle to said feeding member, a second mechanism for driving said member for feeding the film in relation to the aperture of said gate, a source of power, a first clutch for applying power from said source to said first mechanism, a second clutch for applying power from said source to said second mechanism, and interlocked actuating mechanism for said clutches.

4. In a film handling apparatus, a supply spindle, a feeding member, guiding surfaces for directing the film from said spindle to said feeding member, an apertured gate, a first mechanism for driving said spindle in a feeding direction for the purpose of propelling the free end of a film supported thereupon to said feeding member, a second mechanism for driving said feeding member for the purpose of moving the film in relation to the aperture of said gate, a source of power, a first clutch for applying power from said source to said first mechanism, a second clutch for applying power from said source to said second mechanism, sequential interlocked actuating mechanism for said clutches, and timing means governing said actuating means for moving said second clutch to operative position a pre-determined period after the actuation of said first clutch.

5. In a film handling apparatus, a supply spindle, a feeding member, guiding surfaces for directing the film from said spindle to said feeding member, an apertured gate, a first mechanism for driving said spindle in a feeding direction for the purpose of propelling the free end of a film supported thereupon to said feeding member, a second mechanism for driving said feeding member for the purpose of moving the film in relation to the aperture of said gate, a source of power, a first clutch for applying power from said source to said first mechanism, a second clutch for applying power from said source to said second mechanism, sequential interlocked actuating mechanism for rendering said first clutch inoperative and thereafter rendering said second clutch inoperative, and timing means governing said actuating mechanism for rendering said first clutch inoperative a predetermined time after the actuation of said second clutch.

6. In a film handling apparatus, a supply spindle, a feeding member, means for guiding said film from said spindle to said feeding member, an apertured gate, a first mechanism for driving said spindle in a feeding direction for the purpose of propelling the free end of a film supported thereupon to said feeding member, a second mechanism for driving said feeding member for the purpose of moving the film in relation to the aperture of said gate, a source of power, a first clutch for applying power from said source to said first mechanism, a second clutch for applying power from said source to said second mechanism, interlocked actuating mechanism for said clutches, and timing means governing said actuating means for operating said first clutch for a brief predetermined period only and for operating said second clutch indefinitely.

7. In a film handling apparatus, a supply spindle, an apertured gate a continuously operable feeding member cooperating with said spindle and with said gate, a source of power, and sequential control mechanism connecting said spindle, said member and said source first for applying power from said source to both said spindle and said member for initially advancing and positioning the film in reference to said member and thereafter for applying such power only to said member for the purpose of carrying out the regular operation of feeding the film in relation to the aperture of said gate.

8. In a film handling apparatus, a first spindle, a second spindle, means for guiding a film from said first spindle to said second spindle, an apertured gate between said spindles, means for revolving said first spindle in one direction for propelling the free end of a film supported thereby therefrom to said second spindle to assist in the preliminary positioning of the film in said apparatus, means for feeding the film from said first spindle to said second spindle through said gate past the aperture thereof for carrying out the regular feeding operation thereupon, means for revolving said first spindle in the other direction for moving the film from said second spindle to said first spindle and wound thereupon for the purpose of rewinding the film, and actuating mechanism interlocking both of said means and effective for operating the same successively.

9. In a film handling apparatus, a first carrier and a second carrier, an apertured gate therebetween, guiding members movable to cooperative positions wherein they form a complete and unimpeded channel through which the free end of a film supported by said first carrier may be propelled to said second carrier, means for moving said members from and to such position, means for operating said first carrier for propelling the film through such channel for the purpose of initially positioning the same upon said second carrier, separate means for feeding the film between said carriers for the purpose of carrying out the regular feeding of the film past the aperture of said gate, and threading control mechanism interlocking all of said means.

10. In a film handling apparatus, a first spindle and a second spindle, an apertured gate therebetween, guiding members movable to cooperative position wherein they form a complete and unimpeded channel through which the free end of a film supported by said first spindle may be propelled toward said second spindle, means for moving said members from and to such position, means for operating said first spindle for propelling the film through such channel for the purpose of initially positioning the film in relation to said second spindle, and separate means for feeding the film between said spindles for the purpose of carrying out the regular feeding of the film past the aperture of said gate.

11. In a film handling apparatus, two carriers, an apertured gate therebetween, guiding members movable to cooperative position wherein they form a complete and unimpeded channel through which the free end of a film supported by one of said carriers may be propelled to the other of said carriers, means for moving said members from and to such position, means for propelling the film through such channel for the purpose of initially positioning the same upon said second carrier, means for rendering said propelling means inoperative, and separate means for feeding the film from one of said carriers to the other thereof for the purpose of carrying out the regular feeding of the film between said carriers.

12. In a film handling apparatus having an apertured gate, feeding mechanism and threading mechanism separate therefrom; said feeding mechanism comprising two spaced carriers between which said apertured gate is disposed, toothed means for feeding a film from one of said carriers toward the other thereof past the aperture of said gate, and means for driving said toothed means and one of said carriers; and said threading means comprising guiding means establishing a clear and unimpeded channel through said apparatus from one of said carriers to the other thereof past the teeth of said feeding means free from interference from said teeth, and means for propelling the free end of said film through said channel, said propelling means being separate from said feeding mechanism, and control means operatively interconnecting said feeding mechanism and said threading mechanism and including means for rendering said propelling and guiding means of said threading mechanism inoperative in preparation for the carrying out of the regular feeding operation and thereafter rendering operative said driving means of said feeding mechanism for carrying out said regular feeding operation.

13. In a film handling apparatus, a first and second carrier, an apertured gate therebetween, guiding members movable to cooperative positions wherein they form a complete and unimpeded channel through which the free end of a film supported by said first carrier may be propelled to said second carrier, means for moving said members from such position, means for operating said first carrier for propelling the film through such channel for the purpose of initially positioning the same upon said second carrier, separate means for feeding the film between said carriers for the purpose of carrying out the regular feeding of the film past the aperture of said gate, and sequential control mechanism interlocking all of said means and effective for operating each of the same in sequential relation.

14. In a film handling apparatus, two carriers, an apertured gate therebetween, guiding members movable to cooperative position wherein they form a complete and unimpeded channel through which the free end of a film supported by one of said carriers may be propelled to the other of said carriers, means for moving said members to such guiding position whereby such channel is formed, means for propelling the film through said channel past the aperture of said gate, means for moving such guiding members away from such guiding position whereby such channel is destro...d, and film threading control mechanism interlocking all of said means.

15. In a film handling apparatus, two carriers, a toothed film feeding member positioned therebetween and adapted to move a film in a feeding direction from one of said carriers toward the other, means for rendering the teeth of said member inaccessible by the film, means other than said member for propelling the free end of the film wound upon one of said carriers to the other of said carriers in such feeding direction, and sequential operating mechanism interlocking both of said means for necessarily starting the operation of the same successively.

16. In a film handling apparatus, two spindles, means for propelling the free end of a film supported by one of said spindles toward the other of said spindles for the purpose of initially positioning the film in said apparatus, a toothed member positioned between said spindles and adapted to feed a film from one of said spindles to the other for the purpose of carrying out the regular feeding operation, means for driving said member, means for rendering the teeth of said member inaccessible by the film, and actuating means interlocking all of said means.

17. In a film handling apparatus, two carriers, a toothed film feeding member positioned therebetween and adapted to move a film in a feeding direction, means for rendering the teeth of said member inaccessible by the film, means other than said member for moving the leading end of the film from one of said carriers toward the other in such feeding direction while the teeth of said feeding member are inaccessible to the film, and sequential control mechanism interlocking both of said means for necessarily rendering said first mentioned means inoperative a pre-determined period after the actuation of said second mentioned means.

18. In a film handling apparatus, two carriers, a toothed film feeding member positioned therebetween and adapted to move a film in a feeding direction, means for rendering the teeth of said member inaccessible by the film, means other than said previously mentioned toothed film feeding member for moving the film from one of said carriers toward the other in such feeding direction, and sequential control mechanism interlocking said means for necessarily rendering said moving means inoperative before said first mentioned means can be moved to inoperative position.

19. In a film handling apparatus, two carriers, a toothed film feeding member positioned therebetween for feeding the film in a feeding direction, a member for shielding the film from the teeth of said feeding member, means other than said previously mentioned feeding member for moving the leading end of the film from one of said carriers to the other in said feeding direction while said shielding member is in shielding relation to said toothed feeding member, means for retracting said shielding member from shielding position, means for operating said feeding member whereby the film is fed from said first mentioned carrier toward said second mentioned carrier in a feeding direction, and actuating mechanism interlocking all of said means.

20. In a film handling apparatus, two carriers, a toothed film feeding member positioned therebetween for feeding a film in a feeding direction, a member for shielding a film from the teeth of said feeding member, means other than said previously mentioned feeding member for moving the leading end of the film from one of said carriers to the other in said feeding direction while said shielding member is in shielding relation to said toothed feeding member, means for retracting said shielding member from shielding position, means for operating said feeding member for feeding the film from said first mentioned carrier toward said second mentioned carrier in a feeding direction, and sequential actuating mechanism interlocking all of said means and effective for operating each of the same in sequential relation.

21. In a film handling apparatus, a film supporting spindle, a toothed member adapted to feed the film delivered thereto by said spindle, film guiding means between said spindle and said toothed member, means for applying power to said spindle for revolving said spindle in a feeding direction for propelling the free end of the film supported thereby therefrom toward said toothed member, shielding means for rendering the teeth of said member inaccessible by the film, means for rendering said shielding means inoperative, and sequential control mechanism interlocking said means for rendering said shielding means inoperative and said means for applying power to said spindle and necessarily effective for operating the same in sequential relation.

22. In a film handling apparatus, two spindles, means for propelling the free end of a film supported by one of said spindles toward the other of said spindles for the purpose of initially positioning the film in said apparatus, a toothed member adapted to feed a film from one of said spindles to the other for the purpose of carrying out the regular feeding operation, means for driving said member, means for rendering the teeth of said member inaccessible by the film, means for moving said last mentioned means to inoperative position, and sequential actuating means interlocking said driving means, said moving means, and said propelling means and effective for actuating each of the same in sequential relation to the actuation of each of the others thereof.

23. In a film handling apparatus, two spindles, film guiding means between said spindles for establishing a film threading path between said spindles, means for applying power to one of said spindles for propelling the free end of a film supported thereby therefrom along said threading path in a feeding direction toward the other of said spindles for the purpose of initially positioning the film in said apparatus, a toothed member disposed between said spindles for feeding the film from one of said spindles toward the other for the purpose of carrying out the regular feeding operation upon the film, means for driving said member, means for rendering the teeth of said member inaccessible by the film, and sequential actuating means interlocking all of said means for actuating the same sequentially.

24. In a film handling apparatus, two spindles, film guiding means between said spindles for establishing a film threading path between said spindles, means for applying power to one of said spindles for propelling the free end of a film supported thereby along said path in a feeding direction toward the other of said spindles for the purpose of initially positioning the film in said apparatus, a toothed member disposed between said spindles for feeding the film from one of said spindles toward the other for the purpose of carrying out the regular feeding operation upon the film, means for driving said member, and means for rendering the teeth of said member inaccessible by the film during the operation of said power applying means.

25. In a film handling apparatus, two spindles, film guiding means between said spindles, establishing a film threading path, means for applying power to one of said spindles for propelling the free end of a film supported thereby therefrom along said path toward the other of said spindles for the purpose of initially positioning the film in said apparatus, a toothed member disposed between said spindles for feeding the film from one of said spindles toward the other for the purpose of carrying out the regular film feeding operation, means for rendering the teeth of said member inaccessible by the film, and sequential actuating means interlocking said means for automatically withdrawing said last mentioned means from operative position after the conclusion of operation of said first mentioned means.

26. In a film handling apparatus, two spindles, film guiding means between said spindles, means for applying power to one of said spindles for propelling the free end of a film supported thereupon toward the other of said spindles for the purpose of initially positioning the film, a member disposed between said spindles for feeding the film from one of said spindles to the other for the purpose of carrying out the regular feeding operation upon the film, means for shielding the film from said member during such initial positioning, and sequential actuating means interlocking both of said means and necessarily effective for actuating the same in sequential relation.

27. In a film handling apparatus, two film carriers, film guiding means between said carriers, means for applying power to one of said carriers for propelling the free end of a film supported thereupon toward the other of said carriers for the purpose of initially positioning the film, a toothed member disposed between said carriers for feeding the film from one of said carriers toward the other for the purpose of carrying out the regular feeding operation upon the film, means for rendering the teeth of said member inaccessible by the film during such initial positioning, and control mechanism interlocking said means, said control mechanism including timing means necessarily maintaining said second mentioned means in operative position until said first mentioned means has propelled such free end from said first carrier to said second carrier.

28. In a film handling apparatus, a take-up spindle, a toothed feeding member, means for operating said take-up spindle for winding up the film fed thereto by said feeding member, protective means for rendering the teeth of said member inaccessible by the film, means other than said feeding member for delivering the free end of the film to said take-up spindle while said protective means maintains said feeding member inaccessible by the film, guiding means for directing said free end between said feeding member and said take-up spindle, a source of power, and sequential operating mechanism interlocking said source of power, said spindle and said protective means for maintaining said means for rendering the teeth of said member inaccessible by the film in operative position until after the initiation of operation of said spindle by said source of power.

29. In a film handling apparatus, a take-up spindle, a toothed feeding member, operable loop forming mechanism, protective means for rendering the teeth of said member inaccessible by the film, a source of power connectible to said spindle, and sequential operating mechanism interlocking said source of power, said spindle, said loop forming mechanism, and said protective means for moving said means to operative position a definite predetermined period after said spindle has been initially operated and before said loop forming mechanism is operated by said source of power.

30. In a film handling apparatus, two spindles, film guiding means between said spindles, means for applying power to one of said spindles for propelling the free end of a film supported thereby therefrom toward the other of said spindles for the purpose of initially positioning the film in said apparatus, a toothed member positioned between said spindles for feeding the film from one of said spindles toward the other for the purpose of carrying out the regular feeding operation upon the film, means for driving said member, mechanism for rendering the teeth of said member inaccessible by the film, means for withdrawing said mechanism from operative relation with the film, and sequential actuating means interlocking all of said means for maintaining said driving means inoperative until after the conclusion of the operation of said propelling means and said withdrawing means.

31. In a film handling apparatus, two carriers, a toothed feeding member positioned therebetween, shielding means for rendering the teeth of said member inaccessible by the film, means other than said member for moving the leading end of the film from one of said carriers to the other, guiding means for conducting said leading end between said carriers, mechanism for connecting said moving means to a source of power, and sequential operating means interlocking said mechanism and said shielding means for maintaining said connecting mechanism in inoperative position while said shielding means is disposed other than in shielding position.

32. In a film handling apparatus, two carriers, a toothed film feeding member for moving the film between said carriers in a feeding direction, a member adapted to shield the film from the teeth of said feeding member, means for moving said member to operative position, means other than said previously mentioned feeding member engaging the film between said carriers for moving the film from one of said carriers toward the other in a feeding direction, means for retracting said shielding member from operative position, means for operating said feeding member whereby the film is fed from said first mentioned carrier toward said second mentioned carrier, and sequential actuating mechanism interlocking all of said means for operating each of the same in the sequence in which it is herein mentioned.

33. In a film handling apparatus, a film supporting spindle, a film feeding member, means adapted to guide the free end of a film to said feeding member from said spindle, means for applying power to said spindle for propelling the free end of a film supported thereby therefrom toward said feeding member in a feeding direction, means for shielding the film from the teeth of said member, means for withdrawing said shielding member from shielding position, and sequential control mechanism interlocking said withdrawing means and said means for applying power to said spindle and necessarily effective for maintaining said withdrawing means inoperative until after said means for applying power to said spindle has been operated.

34. In a film handling apparatus, a film supporting spindle, a film feeding member, means adapted to guide the free end of a film to said feeding member from said spindle, means for applying power to said spindle for propelling the free end of a film supported thereby therefrom toward said member, means for shielding the film from the teeth of said member, means for withdrawing said shielding member from shielding position, and sequential control mechanism interlocking said withdrawing means and said means for applying power to said spindle and necessarily effective for first operating said means for applying power to said spindle for a pre-determined period and then operating said withdrawing means.

35. In a film handling apparatus, a film supporting spindle, a member for feeding the film supported by said spindle, means for applying power to said spindle for propelling the free end of a film supported thereby therefrom toward said member, means for guiding said free end of the film as it is so propelled from said spindle to said feeding member, means for shielding the film from the teeth of said member, means for withdrawing said shielding member from shielding position, and sequential control mechanism interlocking said withdrawing means and said means for applying power to said spindle and necessarily effective for rendering said means for applying power to said spindle inoperative before operating said withdrawing means.

36. In a film handling apparatus, two continuously operable toothed feeding members engaging the same film for moving it in a feeding direction, a source of power, operable means for operatively connecting and disconnecting said continuous members and said source of power, an intermittently operable feeding member disposed between said continuous members and engaging the same film for moving it in said feeding direction, means for rendering the teeth of said intermittent member inaccessible by the film, and threading control mechanism interlocking said means and effective for actuating both of the same.

37. In a film handling apparatus, a first continuously operable toothed feeding member, a second continuously operable toothed feeding member, a source of power, means for operatively connecting said first continuous member with said source of power, an intermittently operable toothed member disposed between said continuous members, means for rendering the teeth of said intermittent member inaccessible by the film, and threading control mechanism interlocking both of said means and including devices for operating the first of said continuous members to feed the film therefrom toward the second of said continuous members and for necessarily maintaining said means for rendering the teeth of said intermittent member inaccessible by the film in operative position during such operation.

38. In a film handling apparatus, two continuously operable toothed feeding members engaging the same film for moving it in a feeding direction, means for driving the first of said continuous members, means for rendering said driving means effective and ineffective upon said first of said continuous members, an intermittently operable toothed feeding member disposed between said continuous members, means for rendering the teeth of said intermittent member inaccessible by the film, and threading control means interlocking said means for rendering said driving means effective and ineffective and said means for rendering the teeth of said intermittent member inaccessible for operating both of the same.

39. In a film handling apparatus, a first and second continuously operable toothed feeding members engaging the same film for moving it in a feeding direction, means for driving the first of said continuous members, an intermittently operable toothed feeding member disposed between said continuous members, means for rendering the teeth of said intermittent member inaccessible by the film, and sequential actuating means interlocking said means and including timing devices for holding said means for rendering the teeth of said intermittent members inaccessible by the film inoperative a predetermined interval after the actuation of said driving means.

40. In a film handling apparatus, a first toothed feeding member for moving a film in a feeding direction, means for driving said member, a second toothed feeding member engaging said film for feeding it in said direction, means for rendering the teeth of said second feeding member inaccessible by the film, and sequential control mechanism interlocking both of said means for necessarily maintaining said means for rendering the teeth of said second member inaccessible by the film in shielding position during the operation of said driving means.

41. In a film handling apparatus, a first toothed feeding member for moving a film in a feeding direction, means for driving said first member, a second toothed feeding member engaging said film for feeding it in said direction, means for rendering the teeth of said second member inaccessible by the film, and control mechanism interlocking both of said means for rendering said driving means inoperative before said means for rendering the teeth of said feeding means inaccessible by the film has been rendered inoperative.

42. In a film handling apparatus, a supply spindle, a first continuously operable feeding member associated therewith, a second continuously operable feeding member to which film is delivered by said first continuous feeding member, an intermittently operable feeding member disposed between said continuous members, film guiding means between said spindle and each of said feeding members, means for rendering the teeth of said intermittent member inaccessible by the film, a source of power for said spindle and said members, and sequential control mechanism interlocking said source of power, said spindle, said members and said means for first applying power from said source to said spindle and said continuous feeding member whereby the free end of a film supported by said spindle is initially propelled therefrom and to said continuous members and engaged thereby and second for rendering said means inoperative and third for applying such power to said second continuous member alone whereby the film is initially engaged by said intermittent member and fourth for operating said first continuous member in a feeding direction while maintaining said other members motionless whereby a loop of slack is produced in that section of the film between said first continuous member and said intermittent member.

43. In a film handling apparatus, a spindle, a member adapted to feed a film supported by said spindle, a source of power, mechanism for positively applying power from said source to said spindle, said mechanism comprising a first power transmitting train for applying such power to such spindle for revolving said spindle in one direction and a second power transmitting train for applying power from said source to said spindle for revolving said spindle in the opposite direction, a member operable for shielding the film from the teeth of said feeding member, and control means interlocking said mechanism and said member for operating said mechanism and said member.

44. In a film handling apparatus, a spindle, a member adapted to feed a film supported by said spindle, film guiding means between said spindle and said member, means independent of the film for applying power to said spindle for operating said spindle in one direction for moving the free end of a film supported by said spindle therefrom to said member, means for applying power thereto for operating said spindle in the other direction for rewinding a film supported by said spindle thereupon, means for shielding the film from the teeth of said member, and sequential control mechanism interlocking all of said means for rendering said shielding means operative during the operation of either of said means for applying power to said spindle.

45. In a film handling apparatus, a spindle, a member adapted to feed a film supported by said spindle, film guiding means between said spindle and said member, means independent of the film for applying power to said spindle for operating said spindle in one direction for moving the free end of a film supported by said spindle therefrom to said member, means for applying power thereto for operating said spindle in the other direction for rewinding a film supported by said spindle thereupon, means for shielding the film from the teeth of said member, and sequential control mechanism interlocking all of said means for positioning said shielding means in shielding position during the operation of one of said other mentioned means and for positioning said shielding means in inoperative position during the operation of the other of said other mentioned means.

46. In a film handling apparatus, a continuously operable member, means for rendering the teeth of said continuous member inaccessible by the film, an intermittently operable feeding member, means for rendering the teeth of said intermittent member inaccessible by the film, and sequential control mechanism interlocking said means for effecting the successive operation of each of the same.

47. In a film handling apparatus, a continuous toothed feeding member, means for rendering the teeth of said continuous member inaccessible by the film, an intermittent toothed feeding member, means for rendering the teeth of said intermittent member inaccessible by the film, and sequential control means interlocking said means for rendering said means associated with said continuous feeding member inoperative prior to rendering inoperative said means associated with said intermittent member.

48. In a film handling apparatus, a plurality of toothed feeding members, separate means associated with each of said feeding members for rendering the teeth thereof inaccessible by the film, and actuating mechanism interlocking said means, said mechanism including timing means for providing a predetermined interval between the operation of each of said means.

49. In a film handling apparatus, two carriers, film guiding members movable to pre-determined positions wherein they form a channel between said carriers through which the free end of a film may be propelled, means for moving such members from such position whereby such channel is destroyed, means for initially producing slack in the film between said carriers, and sequential operating mechanism interlocking said means for first operating said moving means and thereafter for operating said slack producing means.

50. In a film handling apparatus, two film supporting members, film guiding members movable to predetermined positions wherein they form a channel between said film supporting members through which the free end of a film may be propelled, means for moving said film guiding members from such positions whereby said channel is destroyed, and means separate from said guiding members for initially producing an unsupported loop of slack in the film between said film supporting members.

51. In a film handling apparatus, two carriers, film guiding members movable to pre-determined positions wherein they form a channel between said carriers through which the free end of a film may be propelled, means for moving such members from such position whereby such channel is destroyed, means for initially producing slack in the film between said carriers, and sequential operating mechanism interlocking said means for preventing the operation of said slack producing means until after the operation of said moving means.

52. In a film handling apparatus, two carriers, film guiding surfaces between said carriers, operable means for applying power to one of said carriers for propelling the free end of a film supported thereby to the other of said carriers, means operable thereafter for producing a loop of slack in the film between said carriers, and sequential operating mechanism interlocking said means for operating each of said means in sequential relation to the operation of the other thereof.

53. In a film handling apparatus, two spindles, an apertured gate disposed therebetween, a plurality of toothed feeding members disposed between said spindles and so positioned as successively to engage the free end of a film propelled from one of said spindles to the other and to feed the film to and from the aperture of said gate, means for guiding the end of the film between said spindles, from and to said members, and from and to said gate, a source of power, and sequential operating mechanism connecting said source of power with both of said spindles and all of said members and including devices for applying power from said source in pre-determined succession to each of said spindles and to each of said members.

54. In a film handling apparatus, a supply spindle and a take-up spindle, an apertured gate disposed therebetween, a plurality of toothed feeding members disposed between said spindles for feeding the film to and from the aperture of said gate, means for driving both of said members in the said spindles and all of said members in the same direction, and sequential control mechanism operatively connecting said means with both of said spindles and all of said members, said mechanism including devices for applying the driving power of said means to each of said spindles and to each of said members in a pre-determined sequence.

55. In a film handling apparatus, a supply spindle, a take-up spindle, an apertured gate disposed therebetween a plurality of toothed feeding members disposed between said spindles for feeding the film to and from the aperture of said gate, means for driving both of said spindles and all of said members in the same direction, and sequential control mechanism operatively connecting said means with both of said spindles and all of said members, said mechanism including devices for automatically applying the driving power of said means to each of said spindles and to each of said members selectively.

56. In a film handling apparatus, two spindles, an apertured gate disposed therebetween, a plurality of toothed feeding members disposed between said spindles and so positioned as successively to engage the free end of a film propelled from one of said spindles to the other and to feed the film to and from the aperture of said gate, a source of power, and sequential operating mechanism connecting said source of power with both of said spindles and all of said members and including devices for applying power from said source in pre-determined succession to each of said spindles and each of said members and for pre-determinedly timing the intervals between each such successive actuation.

57. In a film handling apparatus, two spindles, an apertured gate disposed therebetween a plurality of toothed feeding members disposed between said spindles and so positioned as successively to engage the free end of a film propelled from one of said spindles to the other and to feed the film to and from the aperture of said gate, a source of power, and sequential operating mechanism connecting said source of power with both of said spindles and all of said members and including devices for operating each of said spindles and each of said members for periods each of which is distinct and successive in relation to those for which said other spindles or members are so operated thereby.

58. In a film handling apparatus, a supply spindle, a take-up spindle, an apertured gate disposed therebetween, a plurality of toothed feeding members disposed between said spindles for feeding the film to and from the aperture of said gate, means for driving both of said spindles and all of said members in the same direction, mechanism operatively connecting said means with both of said spindles and all of said members, said mechanism including devices for applying the driving power of said means to each of said spindles and to each of said members in a pre-determined succession, and timing means governing such mechanism and definitely determining the intervals which elapse between each such successive application of such driving power.

59. In a film handling apparatus, a supply spindle, a first feeding member adapted to engage film fed thereto by said spindle, an apertured gate, a second feeding member disposed upon the side of said gate opposite that upon which said first feeding member is disposed and adapted to engage film fed thereto by said first member and to move the film past the aperture of said gate, a source of power, and sequential control mechanism interlocking said source of power, said members and said spindle and including devices necessarily effective to apply power from said source first to said spindle and to both of said members, second to said first member alone, and third to both of said members while maintaining said spindle inoperative.

60. In a film handling apparatus, a supply spindle, a continuously operable feeding member associated therewith, an intermittently operable feeding member to which a film is delivered by said continuous feeding member, a source of power for said spindle and said members, and sequential control mechanism interlocking said source of power, said spindle and said members and necessarily effective first to apply such power from said source to said spindle and both of said feeding members whereby the free end of the film supported upon said spindle is delivered to said members and initially engaged thereby, and second to apply such power to said continuous member alone while maintaining said spindle and said intermittent members motionless whereby a loop of slack is produced in that section of the film between said members.

61. In a film handling apparatus, a supply spindle, a continuously operable feeding member associated therewith, an intermittently operable feeding member to which a film is delivered by said continuous feeding member, a source of power for said spindle and said members, film guiding means between said spindle and said feeding members, and sequential control mechanism interlocking said source of power, said spindle and said members and necessarily effective first to apply such power from said source to said spindle and said feeding members whereby the free end of the film supported upon said spindle is delivered to said members and initially engaged thereby, and second to apply such power to said continuous feeding member alone whereby a loop of slack film is produced in that section of the film between said continuous member and said intermittent member, and third to apply such power to said continuous member and said intermittent member concurrently while maintaining said spindle disconnected from said source of power whereby the film is subjected to normal feeding movement.

62. In a film handling apparatus, an operable supply spindle, a first feeding member adapted to engage a film fed thereto by said spindle, an apertured gate, a second feeding member adapted to engage the film fed thereto by said first member and to advance the film in relation to the aperture of said gate, a source of power, and sequential control mechanism interlocking said source of power, said spindle, and said members and including devices for applying the power of said source first to said spindle and to both of said members and thereafter to said members only.

63. In a film handling apparatus, an operable supply spindle, a continuously operable feeding member adapted to engage a film fed thereto by said spindle, an intermittently operable feeding member to which the film is delivered by said continuous member, a source of power, and sequential control mechanism interlocking said source of power, said spindle, and said members and including devices for applying power from said source first to said spindle and said continuously operable feeding member only and second to said continuously operable feeding member and said intermittently operable feeding member only.

64. In a film handling apparatus, a supply spindle, a continuously operable supply feeding member, an intermittently operable feeding member, a continuously operable take-up feeding member, a take-up spindle, a source of power for both of said spindles and all of said members, and sequential control mechanism interlocking all of said members and both of said spindles and necessarily effective for first applying power from said source to said supply spindle, said supply feeding member, said take-up feeding member, and said take-up spindle while maintaining said intermittent feeding member inoperative, and thereafter for applying such power to said intermittent feeding member.

65. In a film handling apparatus, a supply spindle, a continuously operable supply feeding member, an intermittently operable feeding member, a continuously operable take-up feeding member, a take-up spindle, a source of power for both of said spindles and all of said members, and sequential control mechanism interlocking said source of power, both of said spindles, and all of said members and including devices for first applying such power from said source concurrently to said supply spindle, said supply feeding member, said take-up feeding member and said take-up spindle, and thereafter for applying such power solely to said supply feeding member.

66. In a film handling apparatus, a supply spindle, a continuously operable supply feeding member, an intermittently operable feeding member, a continuously operable take-up feeding member, a take-up spindle, a source of power for both of said spindles and all of said members, and sequential control mechanism interlocking said source of power, both of said spindles, and all of said members and including devices for applying power from said source first concurrently to said supply spindle, said supply feeding member, said take-up member and said take-up spindle, and second for applying power to said supply feeding member only, and third for applying such power to said supply feeding member and to said intermittent feeding member only.

67. In a film handling apparatus, a supply spindle, a continuously operable supply feeding member, an intermittently operable feeding member, a continuously operable take-up feeding member, a take-up spindle, a source of power for both of said spindles and all of said members, and sequential control mechanism interlocking said source of power, both of said spindles, and all of said members and including devices for applying said power first concurrently to said supply spindle, said supply feeding member, said take-up feeding member and said take-up spindle, and second for applying such power to said supply feeding member only, and third for applying such power to said supply feeding member and to said intermittent feeding member only, and fourth for applying such power concurrently to all of said members and to said take-up spindle while maintaining said supply spindle inoperative.

68. In a film handling apparatus, a supply spindle, a continuously operable supply feeding member, an intermittently operable feeding member, continuously operable take-up feeding member, a take-up spindle, a source of power for both of said spindles and all of said members, and sequential control mechanism interlocking said source of power, both of said spindles, and all of said members and including devices for applying said power first concurrently to said supply spindle, said supply feeding member, said take-up feeding member and said take-up spindle, second for maintaining both of said spindles and all of said members inoperative for a predetermined interval, and third for applying such power to said supply feeding member only whereby a loop of slack is created in that section of the film between said supply feeding member and said intermittent feeding member.

69. In a film handling apparatus, a supply spindle, a continuously operable supply feeding member, an intermittently operable toothed feeding member, a continuously operable take-up feeding member, a take-up spindle, a source of power for both of said spindles and all of said members, and sequential control mechanism interlocking said source of power, both of said spindles, and all of said members and including devices for applying power from said source first concurrently to said supply spindle, said supply feeding member, said take-up feeding member and said take-up spindle, second, for maintaining both of said spindles and all of said members inoperative for a predetermined interval, and third for applying such power to said take-up feeding member only whereby the film is drawn into operative relation with a tooth of said intermittent member.

70. In a film handling apparatus, a supply spindle, a first continuously operable feeding member, an intermittently operable feeding member, a second continuously operable feeding member, a take-up spindle, a source of power for both of said spindles and all of said members, and sequential operating mechanism connecting said source of power with both of said spindles and all of said members and including devices for applying said power first to said spindles and second to said members.

71. In a film handling apparatus, a supply spindle, a first continuously operable feeding member, an intermittently operable feeding member, a second continuously operable feeding member, a take-up spindle, a source of power for both of said spindles and all of said members, and sequential operating mechanism connecting said source of power with both of said spindles and all of said members and including devices for applying said power first to said spindles, second to said members, and third to said members and one of said spindles.

72. In a film handling apparatus, a supply spindle, a first continuously operable feeding member, an intermittently operable feeding member, a second continuously operable feeding member, a take-up spindle, a source of power for both of said spindles and all of said members, and sequential control mechanism interlocking said source of power, both of said spindles and all of said members and including devices for applying power from said source first to both of said spindles and second to said first continuous feeding member only.

73. In a film handling apparatus, a supply spindle, a first continuously operable feeding member, an intermittently operable feeding member, a second continuously operable feeding member, a take-up spindle, a source of power for both of said spindles and all of said members, and sequential control mechanism interlocking said source of power, both of said spindles and all of said members and including devices for applying power from said source first to both of said spindles, second to said first continuous feeding member only and third to said first continuous member and said intermittent member while maintaining said second continuous member and both of said spindles inoperative.

74. In a film handling apparatus, a supply spindle, a first continuously operable feeding member, an intermittently operable feeding member, a second continuously operable feeding member, a take-up spindle, a source of power for both of said spindles and all of said members, and sequential control mechanism interlocking said source of power, both of said spindles and all of said members and including devices for applying power from said source first to both of said spindles, second to said first continuous feeding member only, third to said first continuous member and said intermittent member while maintaining said second continuous member and both of said spindles inoperative, and fourth to all of said members and said take-up spindle only.

75. In a film handling apparatus, a first spindle, a second spindle, an apertured gate positioned between said spindles a plurality of toothed feeding members positioned between said spindles for moving the film to the aperture of said gate and drawing it away therefrom, and operating mechanism interlocking said spindles and said members, said mechanism including means effective to operate both of said spindles while maintaining said toothed members inoperative and means effective to operate said toothed members while maintaining said spindles inoperative.

76. In a film handling apparatus, a first spindle, a second spindle, an apertured gate positioned between said spindles a plurality of toothed feeding members positioned between said spindles for moving the film to the aperture of said gate and drawing it away therefrom, and operating mechanism interlocking said spindles and said members, said mechanism including means effective to operate both of said spindles concurrently while maintaining said toothed members inoperative and means effective to operate said toothed members successively while maintaining said spindles inoperative.

77. In a film handling apparatus, a first spindle, a second spindle, an apertured gate positioned between said spindles a plurality of toothed feeding members positioned between said spindles for moving the film to the aperture of said gate and drawing it away therefrom, and sequential operating mechanism interlocking said spindles and said members, said mechanism including devices for first operating both of said spindles concurrently while maintaining said toothed members inoperative, second operating said toothed members successively while maintaining said spindles inoperative, and third operating concurrently one of said spindles and all of said members.

78. In a film handling apparatus, two spindles operable in the same direction, an apertured gate disposed between said spindles, an operable toothed feeding member positioned therebetween and adapted to engage a film supported by said spindles and extending therebetween for the purpose of moving the film in relation to the aperture of said gate, and control mechanism interlocking said spindles and said member including devices for rendering both of said spindles inoperative for a pre-determined period during which said toothed member is being operated in engagement with the film to move the same.

79. In a film handling apparatus, a supply spindle, a first continuously operable feeding member, an intermittently operable feeding member, a second continuously operable feeding member, a take-up spindle, a source of power for both of said spindles and all of said members, and sequential operating mechanism interlocking said source of power, both of said spindles, and all of said members, and including devices for applying power from said source first to both of said spindles concurrently, second to said second continuous feeding member only, third to said intermittent feeding member only, and fourth to said first continuous member only.

80. In a film handling apparatus, a supply spindle, a first continuously operable feeding member, an intermittently operable feeding member, a second continuously operable feeding member, a take-up spindle, a source of power for both of said spindles and all of said members, and sequential operating mechanism interlocking said source of power, both of said spindles, and all of said members and including devices for first applying power from said source first to both of said spindles concurrently, second to said second continuous feeding member only, third to said intermittent feeding member only, fourth to said first continuous member only, fifth to said first continuous and said intermittent members only, sixth to all of said members, and seventh to all of said members and said take-up spindle.

81. In a film handling apparatus, a supply feeding member, an intermittent feeding member, a take-up feeding member, and sequential operating mechanism interlocking all of said members for first operating said take-up member only, second said intermittent member only, and third said supply member only.

82. In a film handling apparatus, a supply feeding member, an intermittent feeding member, a take-up feeding member, and sequential operating mechanism interlocking said members including devices for operating first said take-up member only, second said intermittent member only, third said supply member only and thereafter for operating all of said members concurrently.

83. In a film handling apparatus, a supply feeding member, an intermittent feeding member, a take-up feeding member, and sequential operating mechanism interlocking all of said members, and including devices for first operating each of said members for successive periods, said mechanism also including timing means governing the operation of each of said members pre-determinedly to control the period of operation of each of the same.

84. In a film handling apparatus, a take-up spindle, a continuously operable takeup feeding member for delivering film thereto, an apertured gate, a member for intermittently drawing film through said gate past the aperture thereof and delivering it to said continuously operable take-up feeding member, a source of power, and sequential control mechanism interlocking said source of power, said spindle, and said take-up member and including devices for applying said power first to said spindle and second to said take-up member.

85. In a film handling apparatus, an intermittent feeding member, a source of power, means for operatively connecting said intermittent member and said source of power, a take-up feeding member, means for operatively connecting said take-up feeding member and said source of power whereby said take-up feeding member is operated and the film is moved away from said intermittent member, and sequential actuating mechanism interlocking both of said connecting means and including devices for necessarily actuating said means connecting said take-up member and said source of power a pre-determined period before actuating said means for connecting said intermittent member and said source of power.

86. In a film handling apparatus, an intermittent feeding member, a source of power, means for operatively connecting said intermittent member and said source of power, a take-up feeding member, means for operatively connecting said take-up member and said source of power whereby said take-up member is operated for the purpose of moving the film away from said intermittent member, and an actuating mechanism interlocking both of said connecting means and including devices for rendering operative said means for connecting take-up member with said source of power for a pre-determined period and thereafter for rendering operative both of said connecting means for an indefinite period.

87. In a film handling apparatus, an apertured gate a first film moving member, a second film moving member, said members being adapted to engage a film and advance it relatively to the aperture of said gate, a source of power for said members, film guiding means between said members, and sequential control mechanism interlocking said source of power and said members and including devices for operating said first member for propelling the free end of a film in engagement therewith to said second member and for operating said second member for a relatively short pre-determined period only for engaging said second member with the film so propelled thereto but after such engagement does not then further advance the film.

88. In a film handling apparatus, a first film moving member, a second film moving member, film guiding means between said members, a sequential control mechanism interlocking said source of power and said members and including devices for operating said first member for propelling a film in engagement therewith to said second member and for operating said second member for a relatively short predetermined period for engaging said second member with the film so propelled and for operating said first member while maintaining said second member inoperative for a pre-determined period whereby slack is produced in that section of the film between said members.

89. In a film handling apparatus, a continuously operable feeding member, an intermittently operable feeding member, a second continuously operable feeding member, film guiding means between said intermittent member and each of said continuous members, a source of power for all of said members, and sequential control mechanism interlocking said source of power and said members and including devices first for applying said power to said first continuous member and said intermittent member for propelling the film from said first member to said intermittent member and brought into engagement therewith, second for applying said power to said first continuous member alone while maintaining said intermittent member inoperative for a pre-determined period whereby slack is produced in that section of the film between said continuous member and said intermittent member and third for continuing to apply said power to said first continuous member and again for applying said power to said intermittent member and said continuous member for maintaining the loop previously produced and for propelling the film from said intermittent member to said second continuous member and into engagement therewith.

90. In a film handling apparatus, a first continuously operable feeding member, an intermittently operable feeding member, a second continuously operable feeding member, film guiding means between said members, a source of power for all of said members, and sequential control mechanism interlocking said source of power and said members and including devices first to apply said power to said first continuous member and said intermittent member for propelling the film from said first member to said intermittent member and brought into engagement therewith, second to apply said power to said first continuous member alone while maintaining said intermittent member inoperative for a pre-determined period for producing slack in that section of the film between said continuous member and said intermittent member, third to apply said power to said first continuous member and again to said intermittent member and to said second continuous member for propelling the film from said intermittent member to said second continuous member and into engagement therewith and for maintaining the loop of slack film previously produced, and fourth to continue the application of said power to said first continuous member and said intermittent feeding member while maintaining said second continuous member inoperative for producing slack in the film between said intermittent member and said continuous member and for maintaining the loop of slack film previously produced between said first continuous member and said intermittent member.

91. In a film handling apparatus, a continuously operable feeding member, means for bodily moving a film into operative relation therewith, an intermittently operable feeding member, separate means for bodily moving the film into operative relation therewith, and sequential actuating mechanism including timing means, said mechanism interlocking said previously recited means for actuating said means for moving the film into operative relation with said continuous member a predetermined period before said means for moving the film into operative relation with said intermittent member.

92. In a film handling apparatus, an apertured gate, a plurality of feeding members for moving a film to and from the aperture of said gate, a presser member associated with each of said feeding members and adapted for moving a film into operative relation therewith, and sequential control mechanism interlocking all of said presser members and including timing means for rendering one of said presser members inoperative a predetermined period after the operation of another thereof.

93. In a film handling apparatus, an apertured gate, a plurality of film feeding members for moving a film to and from the aperture of said gate, a presser member associated with each of said feeding members for moving the film into operative relation therewith, and operating mechanism interlocking said presser members, said mechanism including timing means effective to provide a predetermined interval between the movement to operative position of each of said presser members.

94. In a film handling apparatus, an apertured gate, a first feeding member, a second feeding member, said first and said second feeding members being so disposed that they engage the same film for advancing it in relation to the aperture of said gate, a presser member for said second feeding member, means for moving said presser member from and to operative relation with said second feeding member, a source of power for driving both of said feeding members, means for connecting said first feeding member with said source of power and for maintaining said source of power inoperative upon said second feeding member, and control mechanism interlocking said connecting means and said moving means.

95. In a film handling apparatus, an apertured gate, a first feeding member, a second feeding member, said feeding members being so disposed as to advance a film in relation to the aperture of said gate, a presser member for said second feeding member, film guiding means between said feeding members means for moving said presser member from a first position wherein it is disposed in opposite and spaced relation to said second feeding member to a second position wherein it is disposed in cooperative relation therewith, means for applying power to said first member for propelling the free end of a film in engagement therewith to a position between such first and second positions, and control mechanism interlocking said means and including devices for operating said means successively.

96. In a film handling apparatus, an apertured gate, a first feeding member, a second feeding member, said first and second feeding members being so disposed that they engage and advance the same film, an operable presser member for said second feeding member, means for connecting said first feeding member with a source of power, film guiding means between said members, and operating mechanism interlocking said connecting means and said presser member, said operating mechanism including devices for positioning said presser member relatively remotely from said second feeding member until after said connecting means has been rendered operative whereby the free end of a film in engagement with said first member may be propelled therefrom and to said second member without being subjected to said presser member.

97. In a film handling apparatus, two toothed feeding members, an openable gate disposed therebetween, a source of power for said members, means for operatively connecting said members and said source of power for driving said feeding members in feeding direction, and sequential control mechanism interlocking said connecting means and said gate and including devices to prevent the closing of said gate until after said connective means has been rendered operative.

98. In a film handling apparatus, two toothed feeding members, an openable gate disposed therebetween, a source of power for said members, means for operatively connecting said members and said source of power for driving said feeding members in feeding direction, and sequential control mechanism interlocking said connecting means and said gate and including devices necessarily effective first for rendering said connecting means operative and thereafter for closing said gate.

99. In a film handling apparatus, two toothed feeding members, an openable gate disposed therebetween, a source of power for said members, means for operatively connecting said members and said source of power for driving said feeding members in feeding direction, and sequential control mechanism interlocking said gate and said connecting means and including devices for preventing the operation of said connecting means until after said gate has been disposed in open position.

100. In a film handling apparatus, a gate, said gate comprising a fixed section and a section movable relatively to said fixed section, means for operating said movable section, said means including time controlled mechanism effective to move said movable section toward said fixed section, maintain said movable section motionless after such movement, and complete the movement of said movable section toward said fixed section, means for feeding a film between said sections, means for producing a loop of slack in the film for cooperation with said feeding means, and sequential control mechanism interlocking all of said means and effective for operating the same in sequential relation.

101. In a film handling apparatus, a live supply spindle, a gate, a feeding member disposed between said spindle and said gate, operable means movable to a position for guiding the free end of a film propelled therefrom by the revolution of said spindle from said spindle to said feeding means, operable means movable to a position for guiding such free end from said feeding member to said gate, operable means for producing a loop of slack in that section of the film between said feeding member and said gate, and threading mechanism for operatively interconnecting said loop producing means and both of said guiding means for operating said loop producing means and for moving said guiding means to guiding position.

102. In a film handling apparatus, a live supply spindle, an openable gate, means for closing said gate, a feeding member disposed between said spindle and said gate, means for guiding the free end of a propelled film from said spindle to said feeding member, means for moving said guiding means from guiding position, means for guiding such free end from said feeding member to said gate, means for moving said last previously mentioned guiding means from guiding position, means for producing a loop of slack in that section of the film between said feeding member and said gate, and threading control mechanism interlocking both of said guiding means, said loop producing means, and said gate closing means for predeterminedly moving both of said guiding means and operating said loop producing means and said gate closing means.

103. In a film handling apparatus, a first carrier, a second carrier, guiding means therebetween adapted to form an enclosed channel through which the free end of a film may be propelled from one of said carriers to the other, means to produce a loop of slack in the film between said carriers, means to move said guiding means to inoperative position, and a single sequential control means interlocking said other mentioned means and necessarily effective first to move said guiding means to inoperative position and thereafter to actuate said loop producing means.

104. In a film handling apparatus, an openable gate, a member for feeding the free end of a film in engagement therewith toward said gate for threading the film in said apparatus, approximately continuous film guiding surfaces between said feeding member and said gate for conducting said free end therebetween, means for connecting said member with a source of power, and operating mechanism interlocking said gate and said connecting means and including devices for necessarily opening said gate before rendering said connecting means operative.

105. In a film handling apparatus, an openable gate, means for opening said gate, operable means including a film engaging member for propelling the free end of a film in engagement therewith toward said gate in a feeding direction, approximately continuous film guiding surfaces between said film engaging member of said propelling means and said gate for conducting said free end therebetween, control means for rendering said propelling means operative upon the film, and operating mechanism interlocking said gate opening means and said control means for operating both of said means.

106. In a film handling apparatus, an openable gate, means for closing said gate, operable means including a film engaging member for propelling the free end of a film in engagement therewith toward said gate in a feeding direction, approximately continuous film guiding surfaces between said film engaging member of said propelling means and said gate for conducting said free end therebetween, control means for rendering said propelling means operative upon the film, and operating mechanism interlocking said gate closing means and said control means for operating both of said means.

107. In a film handling apparatus, a gate, means for opening or closing said gate, a feeding member, approximately continuous film guiding means between said gate and said feeding member for conducting said free end therebetween, means for applying power to said feeding member for propelling the free end of a film in engagement therewith to said gate, and sequential control mechanism interlocking said power-applying means and said gate closing means and necessarily effective for operating each of the same in timed relation to the operation of the other thereof.

108. In a film handling apparatus, an openable gate, means for closing said gate, a spindle for supporting a film, approximately continuous film guiding means between said spindle and said gate, a source of power, a clutch for applying such power to said spindle for revolving said spindle in a feeding direction for propelling the free end of a film supported thereby to said gate for threading the film in said apparatus and time controlled mechanism interlocking said clutch and said gate-closing means and necessarily effective for operating each of the same in timed relation.

109. In a film handling apparatus, an openable gate, means for opening said gate, a spindle for supporting a film, approximately continuous film guiding means between said spindle and said gate, a source of power, a clutch for applying such power to said spindle for revolving said spindle in a feeding direction for propelling the free end of a film supported thereby to said gate for threading the film in said apparatus and sequential control mechanism interlocking said clutch and said gate-opening means and necessarily effective for operating each of the same in timed relation.

110. In a film handling apparatus, an openable gate, means for opening said gate, a spindle for supporting a film, approximately continuous film guiding means between said spindle and said gate, a source of power, a clutch for applying such power to said spindle for revolving said spindle in a feeding direction for propelling the free end of a film supported thereby to said gate, for threading the film in said appartus and sequential control mechanism interlocking said clutch and said gate-opening means for first operating said gate-opening means and thereafter operating said clutch.

111. In a film handling apparatus, an openable gate, means for closing said gate, a feeding member, film guiding means between said feeding member and said gate, means for applying power to said feeding member for propelling the free end of a film in engagement therewith to said gate, and sequential operating mechanism interlocking both of said means for first operating said means for applying power to said member and second for operating said means for closing said gate.

112. In a film handling apparatus, an openable gate, means for closing said gate, a revolvable feeding member, film guiding means between said feeding member and said gate, means for applying power to said feeding member for revolving said member in a feeding direction for propelling the free end of a film in engagement therewith to said gate, and operating mechanism interlocking said power applying means and said gate closing means, said mechanism including timing means effective to operate said means for closing said gate a predetermined period after the operation of said means for applying power to said member.

113. In a film handling apparatus, an openable gate, means for opening said gate, a revolvable feeding member approximately continuous, film guiding means between said gate and said feeding member, means for applying power to said feeding member for revolving said feeding member in a feeding direction for propelling the free end of a film in engagement therewith to said gate, and sequential operating mechanism interlocking said means for rendering impossible the operation of said power applying means until after the operation of said means for opening said gate.

114. In a film handling apparatus, a spindle adapted for the removable mounting of a carrier thereupon, channel-forming members immediately associated with said carrier for guiding the free end of a film from or to such carrier, means for moving said guiding members to and from operative position relative to such carrier, a gate through which the film supported by such carrier may be fed, means for closing and opening said gate, and operating mechanism interlocking both of said means.

115. In a film handling apparatus, a spindle adapted for the removable mounting of a carrier thereupon, complementary members movable from and to a position wherein they guide the free end of a film from or to such carrier, means for moving said members from such position, an openable gate through which a film supported by such carrier may be fed, means for closing said gate, and sequential operating mechanism interlocking both of said means and including devices for operating said first mentioned means for moving said guide means from such guiding position a pre-determined time after the operation of said means for closing said gate.

116. In a film handling apparatus, a spindle adapted for the removable mounting of a carrier thereupon, complementary members movable from or to a position wherein they guide the free end of a film from or to such carrier, means for moving said members from such position, an openable gate through which a film supported by such carrier may be fed, said gate comprising a fixed section and a section movable relatively thereto, means for moving said movable section toward said fixed section and into cooperative relation thereto, and sequential control mechanism interlocking both of said means and including devices for operating said means for moving said guiding members from such position a pre-determined period after the movement of said movable section into such cooperative relation.

117. In a film handling apparatus, a spindle adapted for the removable mounting of a carrier thereupon, members movable to or from a position wherein they guide the free end of a film from or to such carrier, means for moving said members to such guiding position, a gate through which a film supported by such carrier may be fed, means for closing said gate, and control mechanism interlocking said means and including devices for first operating said means for moving said members to such position and second for operating said gate.

118. In a film handling apparatus, a spindle adapted for the removable mounting of a carrier thereupon, members movable to or from a position wherein they guide the free end of a film from or to such carrier, a gate through which a film supported by such carrier may be fed, and sequential operating mechanism inter- 119. In a film handling apparatus, a spindle upon which a film winding core may be mounted, complementary members for establishing a path through which a film may be guided relatively to said core, a spring for separating said members and moving said members away from the film and each other, a latch for said spring, a gate through which a film supported by such core may be fed, means for opening or closing said gate, and control mechanism operatively interconnecting said latch and said means for opening or closing said gate for operating both of the same.

120. In a film handling apparatus, a spindle upon which a film winding core may be mounted, complementary members for establishing a path through which a film may be guided relatively to said core, a spring for separating said members and moving said members away from the film and each other, a latch for said spring, a gate through which a film supported by such core may be fed, said gate comprising a fixed section and a section movable relatively thereto, and an operating connection between said latch and said movable section including devices for releasing said latch in timed relation to the movement of said movable section.

121. In a film handling apparatus, a spindle upon which a film winding core may be mounted, complementary members for establishing a path through which a film may be guided relatively to said core, a spring for separating said members and moving said members away from the film, a latch for said spring, a gate through which a film supported by such core may be fed, said gate comprising a fixed section and a section movable relatively thereto, and sequential operating mechanism operatively interconnecting said latch and said movable section for releasing said latch a pre-determined time after the movement of said movable section into cooperative relation with said fixed section.

122. In a film handling apparatus, a spindle upon which a film winding core may be mounted, complementary members for establishing a path through which a film may be guided relatively to said core, a spring for separating said members and moving said members away from the film, a latch for said spring, a gate through which the film supported by such core may be fed, said gate comprising a fixed section and a section movable relatively thereto, means for moving said movable section into completely cooperative position with said fixed section, and sequential control mechanism operatively interconnecting said latch and said means for releasing said latch and second for operating said means.

123. In a film handling apparatus, a spindle upon which a film winding core may be mounted, complementary members for establishing a path through which a film may be guided relatively to said core, a spring for separating said members and moving said members away from the film, a latch for said spring, a gate through which the film supported by such core may be fed, an actuating member movable to either of two positions, and operating connections between said member, said gate, said spring and said latch for closing said gate and releasing said latch upon the movement of said member to one of such positions and for opening said gate and compressing said spring under the holding influence of said latch upon the movement of said member to the other of such positions.

124. In a film handling apparatus, a spindle adapted for the removable mounting of a film supporting core thereupon, complementary members movable to a position wherein they guide the free end of a film from or to said core, a gate through which a film supported upon such core may be fed, said gate comprising a fixed section and a section movable relatively thereto, an actuating member movable to either of two positions, and sequential operating connections between said actuating member and said guiding members and said movable gate section effective, when said actuating member is disposed in one of such positions, said movable member is moved a pre-determined distance toward said fixed member and said guiding members are moved to operative position and after a pre-determined period thereafter said movable section is moved into completely cooperative relation with said fixed section and said guiding members are moved from such guiding position, and, when said actuating member is disposed in the other of said positions, said movable section is moved away from said fixed section and said guiding members are maintained away from such guiding position.

125. In a film handling apparatus, a spindle adapted for the removable mounting of a carrier thereupon, means movable to a pre-determined position for guiding the free end of a film from or to such carrier, a first mechanism for moving said means to such position, a second mechanism for moving said means from such position, a gate through which the film supported upon such carrier may be fed, and sequential operating mechanism operatively interconnecting said gate and said first and second mechanism including devices for operating said first mechanism and thereafter said second mechanism in timed relation to the closing of said gate and for maintaining both of said mechanisms inoperative upon the opening of said gate.

126. In a film handling apparatus, an openable gate through which a film passes, a film carrier, operable members movable to a position wherein they form a guiding channel between said gate and said carrier, and operating mechanism interlocking said gate and said members and including devices for first moving said guiding members to inoperative position and thereafter for opening said gate.

127. In a film handling apparatus, an openable gate through which a film passes, a film carrier, operable members movable to a position wherein they form a guiding channel between said gate and said carrier, and operating mechanism interlocking said gate and said members and including devices for necessarily moving said guiding members to operative position before said gate can be closed.

128. In a film handling apparatus, two film feeding members, a gate disposed therebetween, film guiding means between said gate and said feeding members, said gate including a fixed support, which defines one edge of the film track through said gate, a first section, which is fixed at right angles to said support and extends therefrom, a second section, which is disposed at right angles to said support and extends therefrom in the same direction as that in which said first section extends and is movable from a distant to a cooperative relation to said first section, a third section, which is pivoted adjacent the edge of said first section other than that edge thereof which is adjacent said fixed support and is movable from a first position at right angles to said fixed support whereby access is afforded to the space which intervenes between said first and second sections when said second section is disposed in such distant relation to a second position wherein it is disposed at right angles to both said first and second sections and in cooperative relation therewith whereby access to the space therebetween is prevented and a channel completely closed on all four sides is provided, means for applying power to the first of said members whereby the free end of a film in engagement therewith is propelled through said gate, and operating mechanism interlocking said means and said second and third sections for first moving said third section from such first to such second position, second for operating said means for applying power to the first of said members, and third for moving said second section from such distant to such cooperative relation to said first section.

129. In a film handling apparatus, two film feeding members, a gate disposed therebetween, film guiding means between said gate and said feeding members, said gate including a fixed support, which defines one edge of the film track through said gate, a first section, which is fixed at right angles to said support and extends therefrom, a second section, which is disposed at right angles to said support and extends therefrom in the same direction as that in which said first section extends and is movable from a distant to a cooperative relation to said first section, a third section, which is pivoted adjacent the edge of said first section other than that edge thereof which is adjacent said fixed support and is movable from a first position at right angles to said fixed support whereby access is afforded to the space which intervenes between said first and second sections when said second section is disposed in such distant relation to a second position wherein it is disposed at right angles to both said first and second sections and in cooperative relation therewith whereby access to the space therebetween is prevented and a channel completely closed on all four sides is provided, means for applying power to the first of said members whereby the free end of a film in engagement therewith is propelled through said gate, and sequential operating mechanism interlocking said means and said second and third sections for operating said means and said sections in a pre-determined sequential relation, said mechanism including timing means which determines the intervals between each such successive operation.

130. In a film handling apparatus, a source of power, a spindle, a feeding member, mechanism for connecting said spindle with said source of power for propelling the free end of a film supported upon said spindle therefrom by the revolution of said spindle and to said feeding member, means for connecting said feeding member with said source of power, an openable gate, operable means for guiding such free end of the film from said spindle to said feeding member, operable means for guiding such free end from said feeding member to said openable gate, and control mechanism interlocking all of said means and effective for operating the same.

131. In a film handling apparatus, a source of power, a spindle, a feeding member, means for connecting said spindle with said source of power for propelling the free end of a film supported upon said spindle therefrom by the revolution of said spindle and to said feeding member, means for connecting said feeding member with said source of power, an openable gate, means for closing said gate, operable means for guiding the free end of the film from said spindle to said feeding member, operable means for guiding such free end from said feeding member to said openable gate, and control mechanism interlocking all of said means and effective for operating the same.

132. In a film handling apparatus, a gate comprising a fixed section and a section movable relatively thereto, a take-up spindle adapted for the removable mounting of a carrier thereupon, a feeding member disposed between said gate and said spindle, operable means for guiding a film from said gate to said feeding member, operable means for guiding the film from said feeding member to the core of a carrier upon said take-up spindle, and operating mechanism interlocking both of said guiding means and the movable section of said gate and effective for operating the same in a pre-determined timed relation.

133. In a film handling apparatus, a spindle, an openable gate, a feeding member associated therewith for delivering a film thereto, means for guiding a film between said spindle and said feeding member, and control mechanism interlocking said guiding means and said gate, said control mechanism including devices for first partially closing said gate and moving said spindle guide to operative position and thereafter completely closing said gate.

134. In a film handling apparatus, a take-up spindle, an openable gate, means for guiding a film from said gate toward said spindle, and sequential control mechanism interlocking said guiding member and said gate, said control mechanism including devices for first partially closing said gate, second moving said spindle guide to operative position, and third completely closing said gate.

135. In a film handling apparatus, a supply spindle, a feeding member adapted to engage a film delivered thereto from said supply spindle, operable means for guiding the film between said spindle and said feeding member, an openable gate, operable means for directing the film from said feeding member to said gate, and control mechanism interlocking said gate and both of said guiding means, said mechanism including devices for first moving said gate to a partially closed position and both of said guiding means to guiding positions, second moving said second mentioned guiding means to inoperative position, and third completing the closing of said gate.

136. In a film handling apparatus, an apertured gate, a sprocket for feeding a film through said gate past the aperture thereof, film guiding means between said sprocket and said gate, means for operating said sprocket, a film retaining roller therefor, and sequential control mechanism connecting said sprocket operating means and said roller and necessarily successively effective first to actuate said sprocket and thereafter to move said roller into cooperative relation therewith.

137. In a film handling apparatus, an apertured gate, a sprocket for feeding a film through said gate past the aperture thereof, a film retaining roller, a source of power, means for connecting said sprocket with said source of power, means for moving said roller into cooperative relation with said sprocket, and sequential control mechanism interlocking said means and assuring the operation of said moving means before the operation of said connecting means.

138. In a film handling apparatus, an openable gate comprising a fixed section and a section movable relatively thereto between which a film passes, a sprocket, means for connecting said sprocket with a source of power, a member movable relatively to said sprocket and to said movable gate section and adapted to hold the film in engagement with said sprocket, and control mechanism interlocking said movable gate section, said member, and said connecting means and effective separately to operate all of the same.

139. In a film handling apparatus, two feeding members, means for forming a loop in that section of the film which is disposed between said members, a first guiding member so disposed that it defines one side of a direct path of travel between said feeding members through which the free end of a film may be propelled, such path substantially coinciding with the chord of such loop, a second guiding member movable to a first position, wherein it defines the side of such path opposite that defined by said first guiding member, or to a second position, wherein it is disposed outside of the segment formed by the arc of such loop and the chord of such path, means for moving said second guiding member from one of such positions to the other, and sequential control mechanism interlocking said means and effective for successively operating each of the same.

140. In a film handling apparatus, two feeding members, means for forming a loop in that section of the film which is disposed between said members, a first guiding member so disposed that it defines one side of a direct path of travel between said feeding members through which the free end of a film may be propelled, such path substantially coinciding with the chord of such loop, means for applying power to the first of said feeding members whereby the free end of a film in engagement therewith may be propelled through such path, a second guiding member movable to a first position, wherein it defines the side of such path opposite that defined by said first guiding member, or to a second position, wherein it is disposed outside of the segment formed by the arc of such loop and the chord of such path, means for moving said second guiding member from one of such positions to the other, and control mechanism interlocking all of said means.

141. In a film handling apparatus, two feeding members, means for forming a loop in that section of the film which is disposed between said members, a first guiding member so disposed that it defines one side of a direct path of travel between said feeding members through which the free end of a film may be propelled, such path substantially coinciding with the chord of such loop, means for applying power to the first of said feeding members for propelling the free end of a film in engagement therewith through such path, a second guiding member movable to a first position, wherein it defines the side of such path opposite that defined by said first guiding member, or to a second position, wherein it is disposed outside of the segment formed by the arc of such loop and the cord of such path, means for moving said second guiding member from one of such positions to the other, and sequential control mechanism interlocking said means for applying power to said first feeding member and said means for moving said second guiding member and including devices for first operating said power-applying means and predetermined time thereafter for operating said guide-moving means.

142. In a film handling apparatus, three toothed feeding members, a separate shielding member cooperating with each of said feeding members, and sequential actuating mechanism interlocking all of said shielding members and including devices for moving two of said shielding members to inoperative position concurrently and one of said shielding members to inoperative position after such movement of said first two shielding members to inoperative position.

143. In a film handling apparatus, a delivery carrier, a take-up carrier, means operable for moving the free end of a film which is wound upon said delivery carrier from said delivery carrier to said take-up carrier, means separate from said moving means and operable thereafter for producing a loop of slack in the film between said carriers, and sequential control mechanism interlocking and actuating said operable means for first completing the operation of said first mentioned means and thereafter operating said second mentioned means.

144. In a film handling apparatus, a continuously operable feeding member, an intermittently operable feeding member, a second continuously operable feeding member, film guiding means between said members, a source of power for all of said members, and sequential control mechanism interlocking said source of power and said members and effective first to apply said power to said first continuous member and said intermittent member for propelling the film from said first member to said intermittent member and brought into engagement therewith, second to apply said power to said first continuous member for a predetermined period and to disconnect said intermittent member from said power for producing slack in the film between said continuous member and said intermittent member, third to apply said power to said first continuous member and again to said intermittent member and to said take-up member for propelling the film from said intermittent member to said second continuous member and engaged thereby and for maintaining the loop of slack film previously produced, fourth to continue the application of said power to said first continuous member and said intermittent feeding member and to disconnect said second continuous member from power for producing slack in the film between said intermittent member and said second continuous member and for maintaining the loop of slack film previously produced between said first continuous member and said intermittent member, and fifth to apply said power to all of said members for subjecting the film to a normal feeding movement.

145. In a film handling apparatus, a supply spindle, a feeding member, an apertured gate, film guiding means between said spindle and said feeding member and said gate, a first mechanism for driving said spindle in a feeding direction for the purpose of propelling the free end of a film supported thereupon to said feeding member, a second mechanism for driving said feeding member in a feeding direction for the purpose of advancing the film in relation to the aperture of said gate, a source of power, a first clutch for applying power from said source to said first mechanism, a second clutch for applying power from said source to said second mechanism, sequential control mechanism interlocking said clutches, said control mechanism including an actuating member movable to either of two positions, and connections between said actuating member and said clutches for rendering both of said clutches operative upon the disposition of such actuating member in one of such positions and thereafter, upon the disposition of said actuating member in the other of such positions, for rendering the other of said clutches inoperative.

146. In a film handling apparatus, a supply spindle, a continuously operable feeding member associated therewith, an intermittently operable toothed feeding member, means for rendering the teeth of said intermittent member inaccessible by the film, a second continuously operable feeding member, film guiding means between said spindle and said feeding members, a source of power for said spindles and said feeding members, and sequential control mechanism interlocking said source of power, said spindle, said means and said members for first operating said spindle and said continuous feeding members concurrently for initially propelling the free end of a film supported by said spindle therefrom and engaged by said continuous feeding members, second for rendering said means inoperative, third for operating said second continuous member alone and holding said intermittent member disconnected from said power for initially bringing the film into operative engagement with a tooth of said intermittent member while the same remains motionless, fourth for operating said first continuous feeding member alone for producing a loop of slack in that section of the film between said first continuous member and said intermittent member, fifth for operating said first continuous member and said intermittent member for maintaining the loop of slack previously produced and for producing a loop of slack in the film between said intermittent member and said take-up member, and sixth for operating all of said members for subjecting the film to a normal feeding movement.

147. In a film handling apparatus, a gate, said gate comprising a fixed section and a section movable relatively to said fixed section, means, including time control devices, for operating said movable section, said means being effective to move said movable section toward said fixed section and to an intermediate position in relation thereto, to maintain said movable section in such position after such movement, and to complete the movement of said movable section toward said fixed section, means for feeding a film between said sections, means for producing a loop of slack in the film for cooperation with said feeding means, and sequential control mechanism operatively connected with said time control devices and interlocking all of said means for first operating said first mentioned means so that said movable section is moved toward said fixed section and into such intermediate position, second for operating said first and second means so that said second means feeds the film between said sections while said movable section is maintained in such intermediate position, and third for operating said first means so that the gate closing operation is completed and thereafter for operating said third mentioned means a predetermined time whereby such loop is produced.

148. In a film handling apparatus, a gate, said gate including a plurality of sections one of which is movable relatively to another, operable means for guiding a propelled film end between said sections, operating mechanism for said movable section for first moving said movable section to a definite predetermined partially closed position relative to said fixed section, mechanism effective for thereafter moving said movable section into a completely closed position relative to said fixed section, and sequentially operating connecting means between said gate moving mechanisms and said guiding means for rendering said first gate closing movement effective to maintain said guiding means in guiding position and said second gate closing movement effective to move said guiding means to inoperative position.

149. In a film handling apparatus, in combination, a revolvable delivery carrier, a revolvable take-up carrier, film feeding means, operable means for providing an unimpeded channel through said apparatus from said delivery carrier to said take-up carrier, said channel-providing means including means for rendering the film inaccessible by said feeding mechanism and operable means for securing the leading end of the film to said take-up carrier, means for propelling said leading end of a film supported on said delivery carrier through said channel to said take-up carrier, means for destroying such channel, operable means for bringing the film into engagement with said film feeding mechanism, operable means for producing loops of slack in the film adjacent said feeding means, a source of light, operable means for turning said light on and off, operable means for protecting the film from the heat of said light source, means for rewinding the film upon said delivery carrier, and sequential control means operatively interconnecting all of said means for predeterminedly and selectively actuating each of said means.

150. In a film handling apparatus, in combination, a revolvable delivery carrier, a revolvable take-up carrier, means for feeding a film from said delivery carrier toward said take-up carrier, and operable gate having a fixed section and movable sections, operable means for moving said movable gate sections in relation to said fixed gate section, operable means for providing an unimpeded film channel from said delivery carrier through said gate past said feeding means to said take-up carrier, operable means for rendering the film inaccessible by said feeding means, operable means for propelling the leading end of the film supported on said delivery carrier through said channel to said take-up carrier, operable means for securing said leading end of the film to said take-up carrier, operable means for bringing the film into operative engagement with said film moving means, operable means for producing loops of slack in the film adjacent said feeding means, sequential control mechanism interlocking all of said means and said movable gate sections for predeterminedly actuating each of said means and opening and closing said gate, a light source, means actuable by said control mechanism for protecting the film from the heat of said light source, means for removing said film securing means from the proximity of said take-up carrier as the film is wound thereon, operable film rewinding means, means operable by said control mechanism for turning said light source on and off, said control mechanism including devices for opening said gate and operating said means for rendering the film inaccessible by said feeding means preparatory to operating said rewinding means, and an operating connection between said rewinding means and said control mechanism for rendering said rewinding means operative and inoperative.

151. In a film handling apparatus having means operable for alternatively exhibiting motion pictures and still pictures from the said film, said exhibiting means including a delivery feeding member an intermittently operating toothed feeding member and a take-up toothed feeding member, automatic means for forming loops of slack in those sections of the film between said delivery feeding member and said intermittent member and between said intermittent member and said take-up member, a motor for driving said exhibiting means for exhibiting motion pictures, means for disconnecting said motor and said exhibiting means, means manually operable after the disconnection of said motor for driving said exhibiting means without materially changing the size of said loops for exhibiting still pictures, and means for reconnecting said motor and said exhibiting means for again exhibiting motion pictures.

152. In a film handling apparatus having means operable for alternatively exhibiting motion pictures and still pictures from the same film, said exhibiting means including a delivery toothed feeding member an intermittently operating toothed feeding member and a take-up toothed feeding member, automatic means for forming loops of slack in those sections of the film between said delivery member and said intermittent member and between said intermittent member and said take-up member, a source of power for driving said exhibiting means for exhibiting motion pictures, means including a manually operable control member for disconnecting said source of power and said exhibiting means, a separate member manually operable while said source of power is disconnected from said exhibiting means for driving the same without materially changing the size of said loops for showing still pictures and means operable by predetermined movement of said manually operable control member for reconnecting said source of power and said exhibiting means for again exhibiting motion pictures.

153. In a film handling apparatus having means operable for alternatively exhibiting motion pictures and still pictures from the same film, said exhibiting means including a delivery toothed feeding member an intermittently operating toothed feeding member and a take-up toothed feeding member, automatic means for forming loops of slack in those sections of the film between said intermittent and said delivery and take-up members respectively, a source of power for driving said exhibiting means for exhibiting motion pictures, means including a manually operable control member for disconnecting said source of power and said exhibiting means, manual means operable while said source of power is disconnected from said exhibiting means for driving the same without materially changing the size of said loops for showing still pictures, automatic means for disconnecting said manually operable means from said exhibiting means and maintaining said two last named means disconnected, and means operable by predetermined movement of said manually operable control member for reconnecting said source of power and said exhibiting means for again exhibiting motion pictures upon such reconnection.

154. In a film handling apparatus having operable means employing loops of unsupported slack for exhibiting motion pictures said exhibiting means including a delivery toothed feeding member an intermittently operating toothed feeding member and a take-up toothed feeding member, a motor, means for connecting and disconnecting said motor and said exhibiting means, means for latching said connecting and disconnecting means in position so as to maintain said motor and said exhibiting means operatively connected, means for latching said disconnecting means in position to maintain said motor disconnected from said exhibiting means, and means for operating said exhibiting means without changing the size of the loops between said members for showing still pictures, from the said film while said motor is disconnected from said exhibiting means.

155. In a film handling apparatus having operable means employing loops of unsupported slack for exhibiting motion pictures said exhibiting means including a delivery toothed feeding member an intermittently operating toothed feeding member and a take-up toothed feeding member, a motor, means for connecting and disconnecting said motor and said exhibiting means, means for latching said connecting and disconnecting means in position so as to maintain said motor and said exhibiting means oepratively connected, means for latching said connecting and disconnecting means in position to maintain said motor disconnected from said exhibiting means, and means for operating said exhibiting means without materially changing the size of the loops for showing still pictures from the said film while said motor is disconnected from said exhibiting means, said last named means including a manually rotatable member movable to a position for operatively engaging said exhibiting means for driving the same.

156. In a film handling apparatus, a continuously operable film feeding member, a member engaging the film adjacent said feeding member and movable in a direction angular to the line of travel of a film in relation to said feeding member for positioning the film in operative relation therewith, an intermittently operable feeding member, a member engaging the film adjacent said intermittent member and movable in a direction angular to the line of travel of a film in relation to said intermittent feeding member for positioning the film in operative relation therewith, and sequential control mechanism interlocking both of said positioning members and including means for first operating one of said members and means for thereafter operating the other of said members.

157. In a film handling apparatus, a plurality of toother feeding members, a shielding member associated with each of said feeding members movable to a position wherein it shields the film from the teeth of each of said feeding members, separate operating means for moving each of said shielding members from its shielding position thereby rendering the teeth of the feeding member associated therewith accessible by the film, and sequential control means operatively interconnecting all of said operating means and including devices for operating each of said means in successive relation to the operation of the others thereof thereby successively rendering the teeth of each of said feeding members accessible by the film.

158. In a film handling apparatus, two toothed feeding members, means associated with each of said feeding members for rendering the teeth thereof inaccessible by the film, separate means for rendering each of said previously mentioned means inoperative whereby the teeth of the member associated therewith may be engaged by the film, and sequential control means operatively interconnecting each of said separate means and including devices for operating one thereof before the operation of the other thereof thus rendering teeth of one of said toothed members accessible by the film before the other thereof is rendered accessible.

159. In a film handling apparatus, two feeding members, guiding members movable to and from a position wherein they form a relatively narrow channel between said feeding members in which the film may be initially threaded, means separate from said channel forming members for forming a loop in that section of the film between said feeding members, and means for moving said channel forming members away from channel forming position so that space is provided for the formation of said loop.

WARREN DUNHAM FOSTER.
FREDERICK DAVENPORT SWEET.